United States Patent [19]
Taki et al.

[11] Patent Number: 5,665,927
[45] Date of Patent: Sep. 9, 1997

[54] METHOD AND APPARATUS FOR INPUTTING MUSICAL DATA WITHOUT REQUIRING SELECTION OF A DISPLAYED ICON

[75] Inventors: Masahide Taki, Fussa; Hajime Manabe, Higashiyamato, both of Japan

[73] Assignee: Casio Computer Co., Ltd., Tokyo, Japan

[21] Appl. No.: 265,731

[22] Filed: Jun. 24, 1994

[30] Foreign Application Priority Data

Jun. 30, 1993 [JP] Japan ................... 5-189151
Jun. 30, 1993 [JP] Japan ................... 5-189152
Jun. 30, 1993 [JP] Japan ................... 5-189153

[51] Int. Cl.$^6$ ................... G10H 1/00; G06K 9/00; G06K 11/00
[52] U.S. Cl. ................... 84/609; 84/477 R; 84/478; 84/483.2
[58] Field of Search ................... 84/462, 471 R, 84/477 R, 483.1, 483.2, 609, 478

[56] References Cited

U.S. PATENT DOCUMENTS

| | | | |
|---|---|---|---|
| 4,184,147 | 1/1980 | Seelbach . | |
| 4,341,141 | 7/1982 | Deutsch et al. | 84/1.24 |
| 4,422,361 | 12/1983 | Ishii et al. | 84/1.18 |
| 4,464,966 | 8/1984 | Ishida | 84/1.03 |
| 4,484,507 | 11/1984 | Nakada et al. | 84/1.03 |
| 4,546,690 | 10/1985 | Tanaka et al. | 84/477 R |
| 4,866,646 | 9/1989 | Nakamura et al. . | |
| 4,916,996 | 4/1990 | Suzuki et al. | 84/603 |
| 4,980,840 | 12/1990 | Yin et al. . | |
| 5,146,833 | 9/1992 | Lui | 84/462 |
| 5,153,829 | 10/1992 | Furuya et al. | 364/419 |
| 5,247,131 | 9/1993 | Okamoto et al. | 84/658 |
| 5,448,008 | 9/1995 | Okamoto et al. | 84/658 |
| 5,512,707 | 4/1996 | Ohshima | 84/658 |

FOREIGN PATENT DOCUMENTS

| | | |
|---|---|---|
| 0057335 | 8/1982 | European Pat. Off. . |
| 4-161990 | 6/1992 | Japan . |
| 1463560 | 2/1977 | United Kingdom . |

Primary Examiner—William M. Shoop, Jr.
Assistant Examiner—Marlon T. Fletcher
Attorney, Agent, or Firm—Frishauf, Holtz, Goodman, Langer & Chick

[57] ABSTRACT

A musical data inputting apparatus comprising a touch panel for receiving a hand-writing operation thereon detects a figure and/or a symbol drawn on the touch panel by the hand-writing operation, and further recognizes intensity of depression or the number of depressions applied on the touch panel by the hand-writing operation. The apparatus recognizes musical data such as pitches and lengths of notes, a tonality and/or a time of music based on the detected figure and symbol and the recognized intensity and number of depressions of the hand writing operation. Musical data can be input without precisely writing the whole of the musical data themselves on the touch panel.

25 Claims, 55 Drawing Sheets

METHOD AND APPARATUS FOR INPUTTING MUSICAL DATA WITHOUT REQUIRING SELECTION OF A DISPLAYED ICON

BACKGROUND OF THE INVENTION

1. Field of the Invention

The present invention relates to a method of inputting by a manual writing operation such musical data as representing a note pitch, a note length, a music range, music tonality, times, a position, a tempo, a playing method and a music image, and further relates to a musical note displaying apparatus for inputting the musical data.

2. Description of the Related Art

Conventionally, there has been proposed a music data inputting apparatus, which is disclosed, for example, in Japanese Patent Publication Tokkai-Hei 4-161990. In the conventional musical data inputting apparatus, a staff is displayed on a display panel, and notes are manually written on the displayed staff, thereby the notes being input. Pitches and lengths of musical notes input in this manner are confirmed, and corresponding pitches and lengths of musical notes are indicated on the staff displayed on the display unit.

In the conventional musical data inputting apparatus, however, a user or a musician has to precisely hand-write a figure of a musical note to input and indicate them on the display unit. When writing music, the musician is still required to perform the same operation as writing music on conventional sheet of staff. Therefore, the conventional musical data inputting apparatus can not relieve the musician of troublesome work in writing a music. To ensure that a pitch of a hand-written musical note is recognized with certainty, a musical note has to be written precisely between lines or on a line of the staff. Therefore, the conventional apparatus can not free the musician from the difficulty in writing music on a staff on the sheet.

Since the conventional musical data inputting apparatus recognizes hand-writing notes to display them on the display panel, it is almost impossible to change musical notes or to amend music once the hand-written notes have been input and displayed on the display panel.

SUMMARY OF THE INVENTION

The present invention has been made to overcome the above mentioned inconvenience, and has an object to provide a method of precisely inputting musical data with an easy operation.

A further object of the present invention is to provide a musical data inputting apparatus which precisely inputs musical data with an easy operation.

Another object of the present invention is to provide a method of amending musical data previously input with an easy operation.

Still another object of the present invention is to provide a musical data inputting apparatus which amends musical data previously input thereto with an easy operation.

According to one aspect of the present invention, there is provided a musical data inputting apparatus comprise:

operation-receiving means for receiving a hand-writing operation thereon;

position detecting means for detecting a position on said operation-receiving means where the hand-writing operation is performed to obtain pitch data representative of a pitch of a musical note;

operation recognizing means for recognizing the hand-writing operation performed on said operation-receiving means to obtain time data representative of a length of a musical note; and musical-sound recognizing means for recognizing musical-sound data based on the pitch data obtained by said position detecting means and the time data obtained by said operation recognizing means.

In the musical data inputting apparatus with the above mentioned structure, musical data such as pitch data and time data of a musical sound can be easily entered in accordance with intensity of depression and/or number of depressions applied onto the operation receiving means without precisely writing the whole figure of musical data such as musical notes, as required in the conventional musical data inputting apparatus.

According to another aspect of the present invention, there is provided a method of inputting musical data which comprises the steps of:

receiving a hand-writing operation on said operation receiving means;

detecting a position on said operation-receiving means where the hand-writing operation is performed to obtain pitch data representative of a pitch of a musical note;

recognizing the hand-writing operation performed on said operation receiving means; and recognizing musical-sound data based on the obtained pitch data and the obtained time data.

In the method of inputting musical data comprising the above mentioned steps, musical data such as pitch data and time data of a musical sound can be easily entered in accordance with intensity of depression and/or number of depressions applied onto the operation receiving means.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which.

DETAILED DESCRIPTION OF PREFERRED EMBODIMENTS

Now, preferred embodiments of the present invention will be described in detail with reference to the accompanying drawings.

FIRST EMBODIMENT

Figure 1:
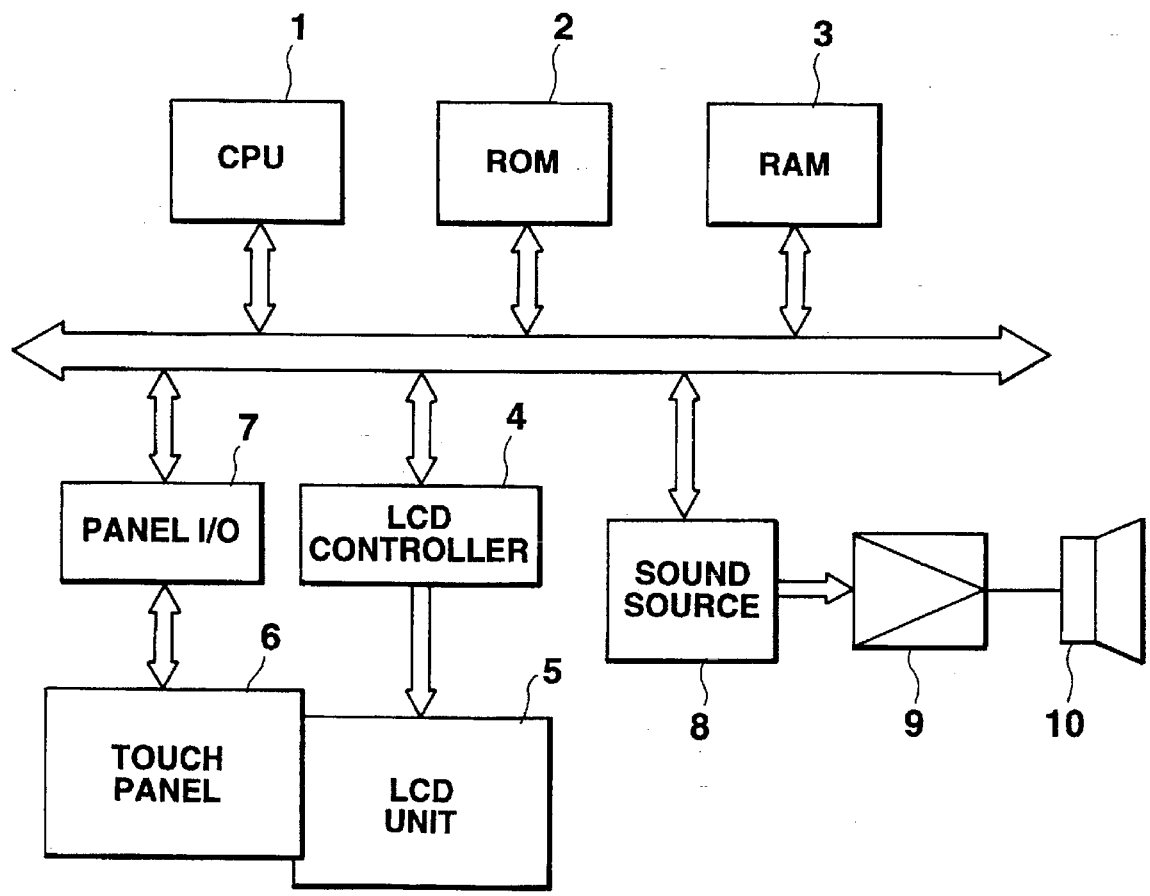
FIG. 1 is a circuit diagram of a first embodiment of a musical data inputting apparatus according to the present invention.

FIG. 1 is a circuit diagram of a first embodiment of the musical data inputting apparatus according to the present invention. A central processing unit (CPU) 1 controls whole operations of the musical data inputting apparatus in accordance with a program previously memorized in a read only memory (ROM) 2 and data temporarily memorized in a random access memory (RAM) 3. In the ROM 2 are memorized the program, predetermined numerals, musical notes of pertinent lengths, and image data representing shapes Of the musical notes, as shown in Table 1.

TABLE 1

| Numerals | Note lengths |
| --- | --- |
| 1 | whole note |
| 2 | half note |
| 4 | quarter note |
| 8 | eighth note |
| 16 | sixteenth note |
| ... | ... |

Further, in the ROM 2 are memorized image data of a staff, a clef, a key signature, a time signature and the like, which are necessary for writing a music. In the RAM 3 are stored input musical data.

An LCD controller 4 drives a liquid crystal display unit (LCD unit) 5 in accordance with an instruction of the CPU 1 to display the staff, musical notes and the like on the LCD unit 5. A touch panel 6 is stacked on the LCD unit 5, and touch data of the touch panel 6 is input through a panel I/O port 7. The CPU 1 successively reads out musical data from the RAM 3, and controls a sound source 8 to perform an automatic performance. The sound source 8 generates musical tone signals (musical tone waveforms) in accordance with instructions of the CPU 1, and the generated musical tone signals are amplified by an amplifier 9 to be audibly output through a speaker 10.

Figure 2:
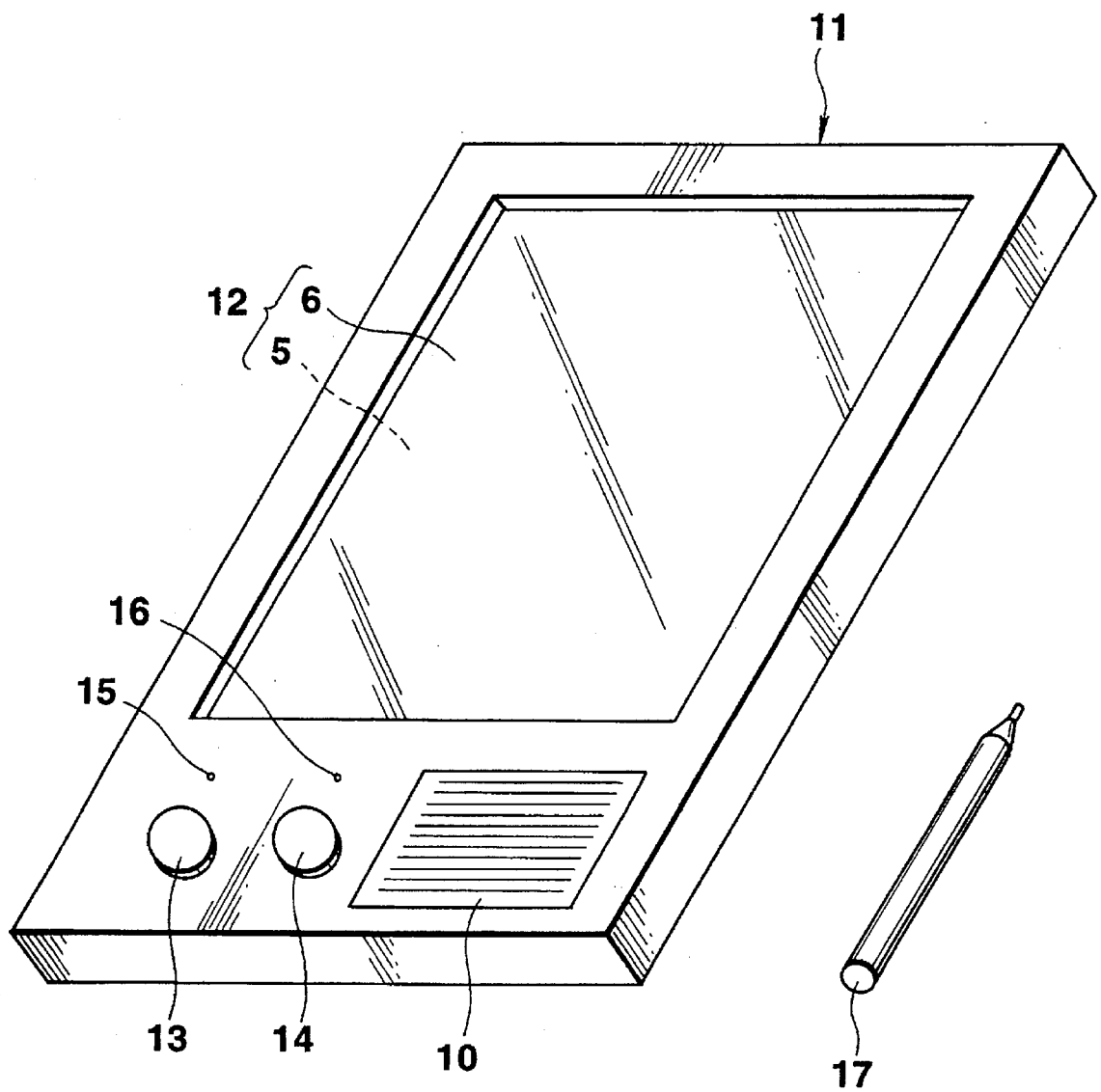
FIG. 2 is an external perspective view of the first embodiment of the musical data inputting apparatus.

FIG. 2 is an external perspective view of the first embodiment of the musical data inputting apparatus. An apparatus body 11 is installed with a display surface 12, which includes the LCD unit 5 and the touch panel 6 stacked on the LCD unit 5. Further, switches 13, 14 and corresponding light emitting diodes (LEDs) 15, 16 are installed below the display surface 12 on the apparatus body 11. The switches 13, 14 are operated to turn on a source power and to control brightness of the LCD unit 5. A speaker 10 is mounted to the right of the switches 13, 14 in the apparatus body 11. A separated pen 17 is prepared for use with the musical data inputting apparatus.

Now, operation of the first embodiment with above structure will be described. Upon on-operation of the switch 13, the CPU 1 starts operation in accordance with a main flow chart of FIG. 3. In step SA1 the CPU 1 reads out image data of a staff from the ROM 2 and controls the LCD controller 4 based on the read out image data to display the staffs on the LCD unit 5, as shown in FIG. 4A.

Figure 4A:
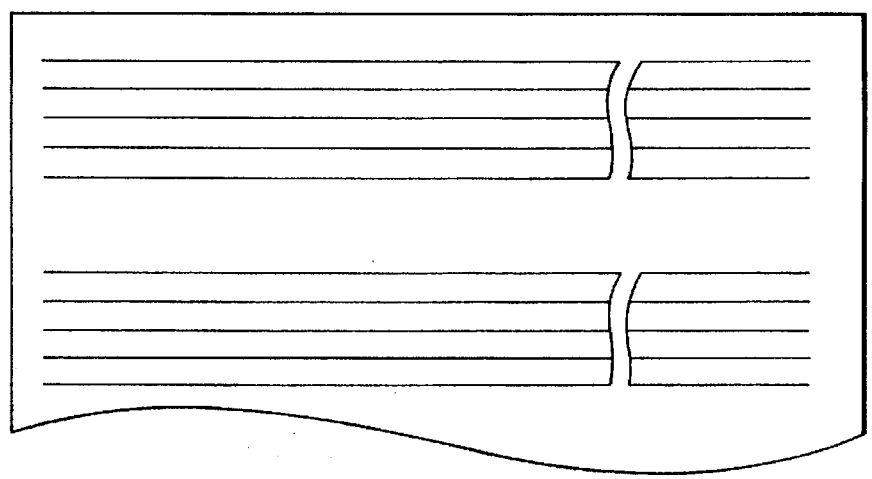
FIGS. 4A-4E are views showing transitional indications in a clef displaying process of the first embodiment.
Figure 4B:
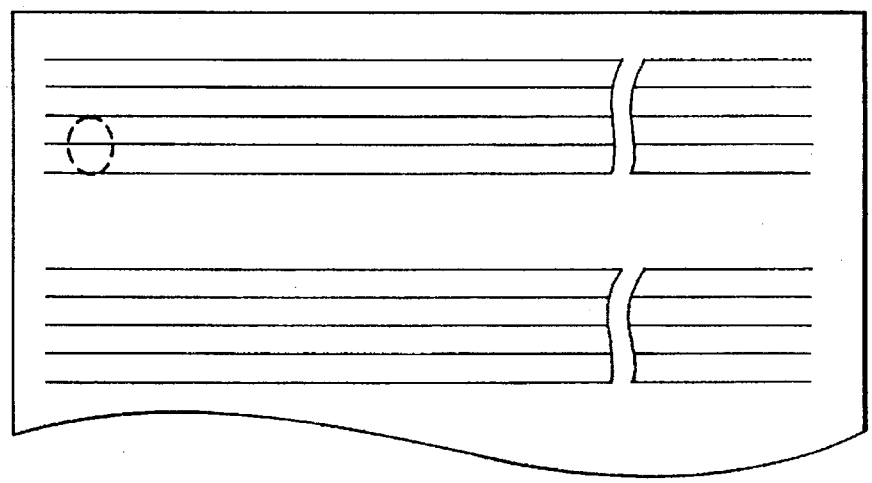
Figure 4C:
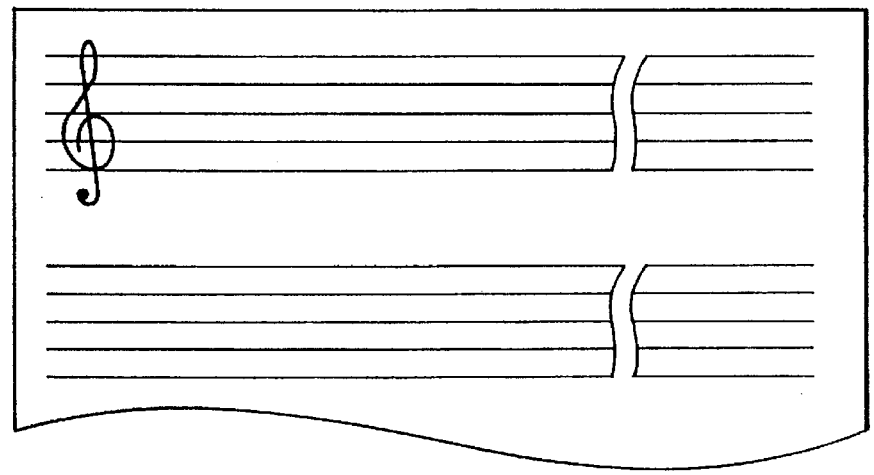

Then, the CPU 1 judges in step SA2 whether an input operation of a clef is performed on the touch panel 6 of the display surface 12. When a user writes a circle with the pen 17 on the touch panel 6, i.e., on the staff displayed on the display surface 12, the CPU 1 determines that the input operation of a clef is performed. In other words, when the input operation of a clef is performed on the touch panel 6, a touch operation with the pen 17 is detected by the touch panel 6, and input to the CPU 1 through the I/O port 7. Determining that the input operation of a clef is performed, the CPU 1 reads out image data of a G clef from the ROM 2 and controls the LCD controller 4 to display a G clef on the display surface 12 in step SA3. In step SA3, the G clef is indicated at a portion where a circle is written on the displayed staff, as shown in FIG. 4C.

Figure 4D:
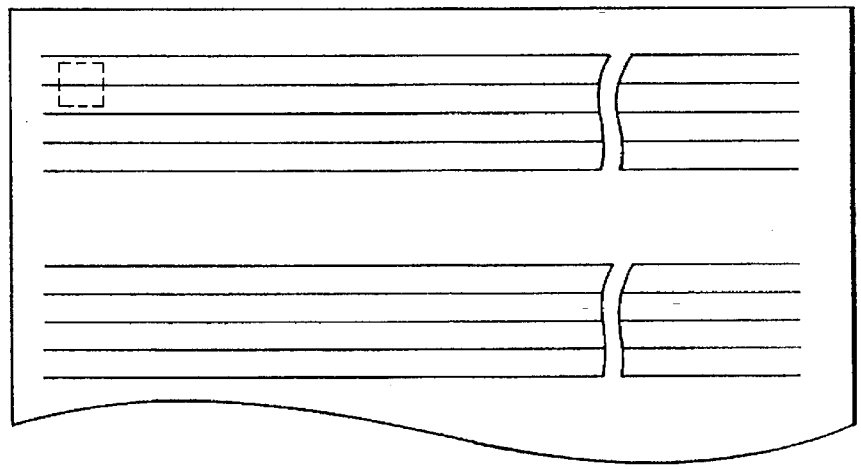
Figure 4E:
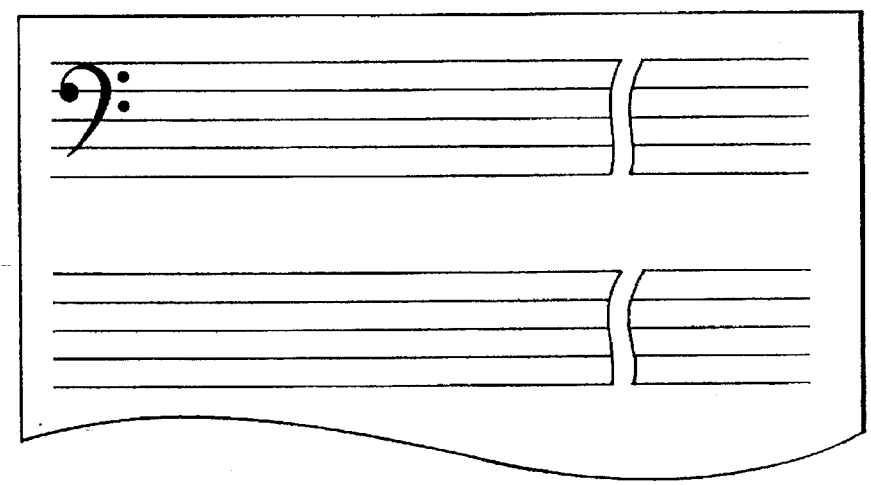

In step SA3, a type of the clef may be selected and displayed based on a figure drawn on the staff. In other words, a figure drawn on the staff is discriminated in step SA3. For example, it is judged in step SA3 which figure has been drawn, a circle of FIG. 4B or a square of FIG. 4D. When the circle has been drawn, the G clef will be indicated as shown in FIG. 4C, and when the square has been drawn, an F clef will be indicated as shown in FIG. 4E. In this case, the CPU 1 memorizes the indicated clef (G clef or F clef) in the RAM 3, and determines a pitch of a musical note which will be entered later, based on a designated position on the staff and the clef memorized in the RAM 3.

Figure 5A:
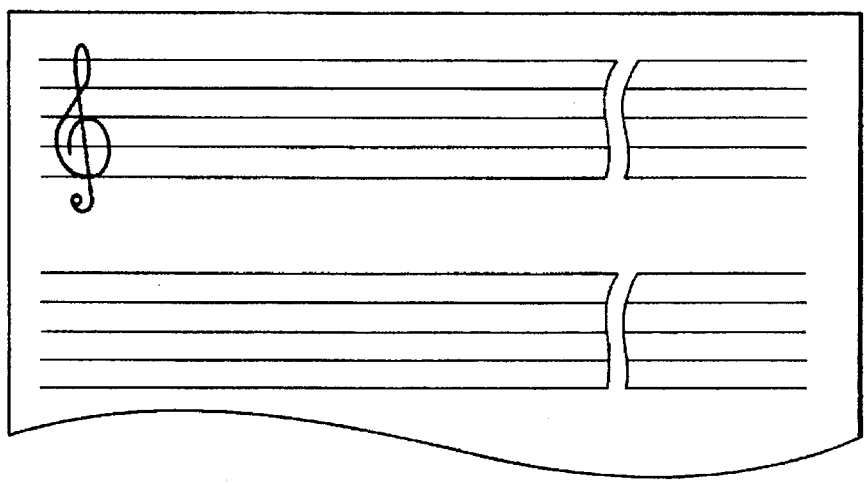
FIGS. 5A-5C are views showing transitional indications in a key-signature displaying process of the first embodiment.
Figure 5B:
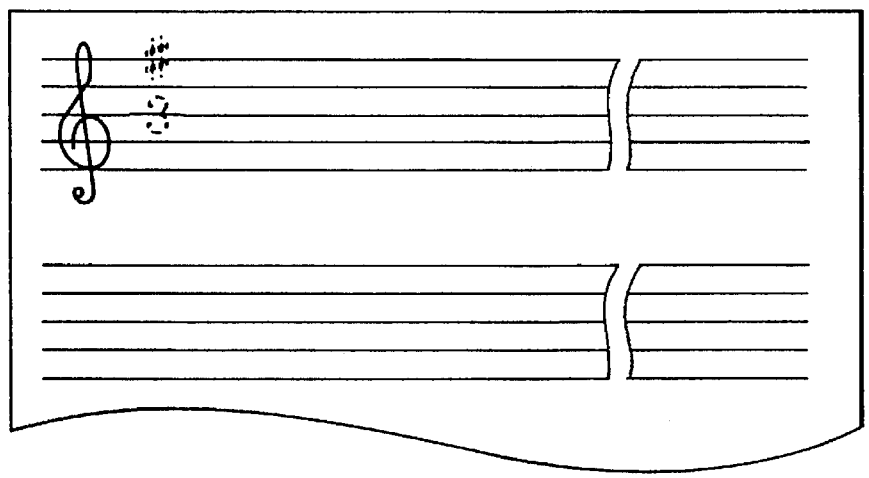

In step SA4, the CPU 1 judges whether an input operation of key signature is performed on the touch panel 6. The input operation of key signature is performed by the user with the pen 17 to write a symbol "#" (sharp) and a numeral or "b" (flat) and a numeral on the staff displayed on the display surface 12. That is, as shown by broken lines in FIG. 5B the symbol "#" (sharp) and a numeral "3" (or "b" (flat) and a numeral) are written with the pen 17 on the staff and G clef indicated on the display surface 12 as shown in FIG. 5A.

Figure 5C:
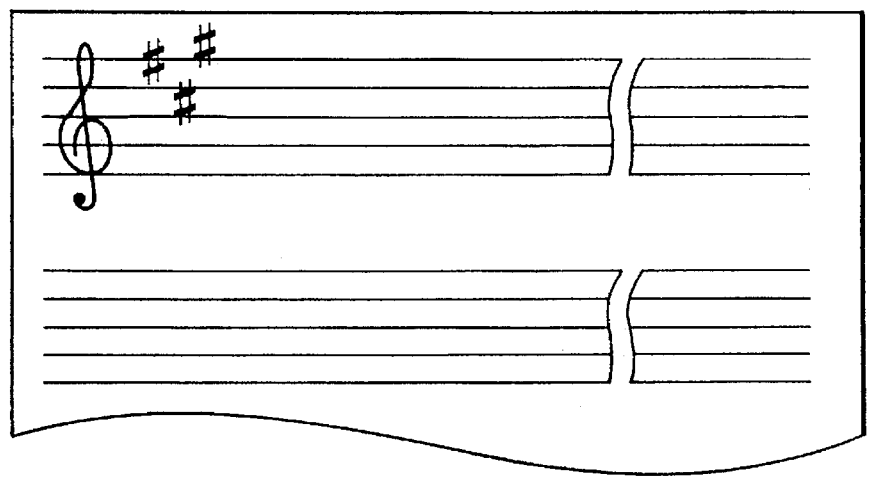

In the case of a key of "A", since the key of "A" is expressed by three sharps, the symbol "#" (sharp) is written on the displayed staff at first and then a number "3" is written. In this way, the input operation of key signature is performed. When the input operation of key signature is finished, the CPU 1 displays the input key signature on the right to the indicated G clef in step SA5, as shown in FIG. 5C.

Figure 3:
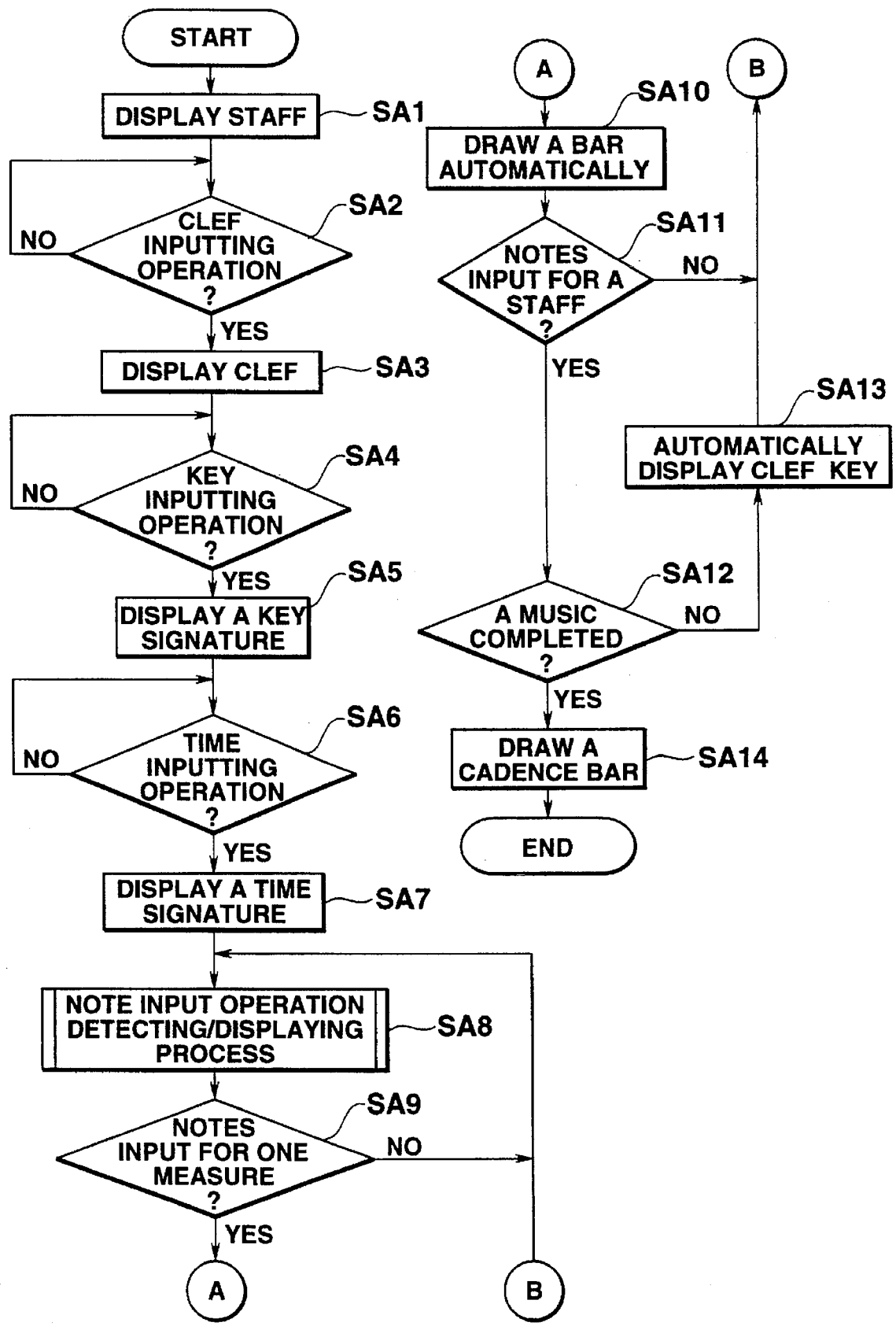
FIG. 3 is a main flow chart of operation of a central processing unit 1 of the first embodiment of the musical data inputting apparatus.
Figure 6A:
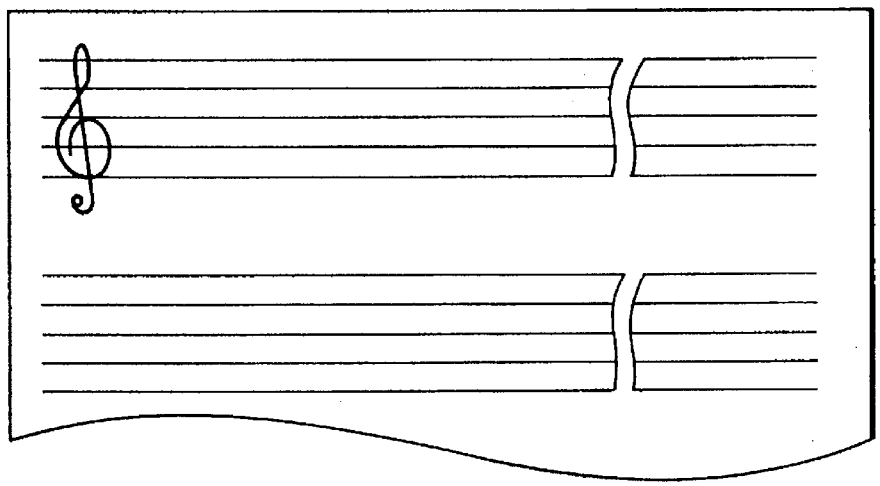
FIGS. 6A-6C are views showing transitional indications in a time-signature displaying process of the first embodiment.
Figure 6B:
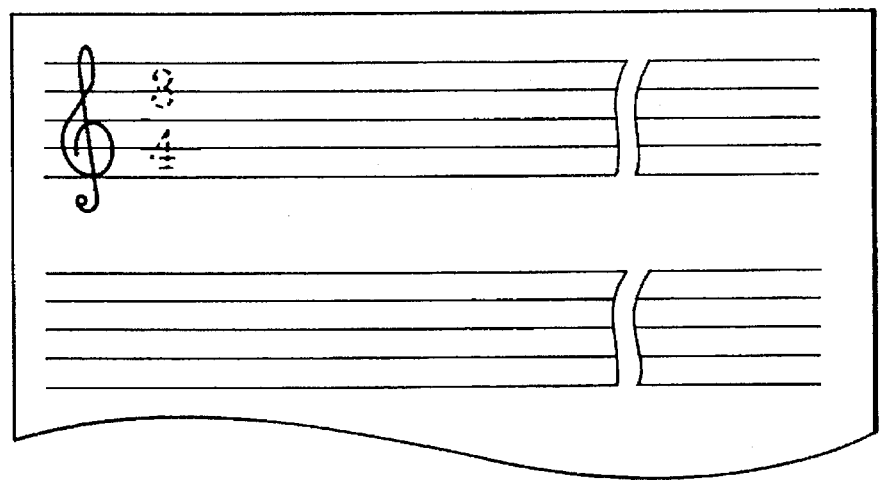
Figure 6C:
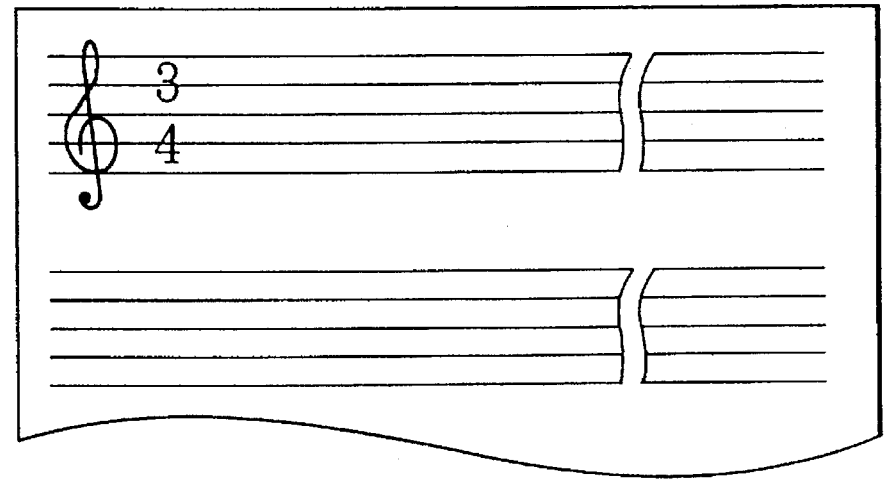

In step SA6 of the main flow of FIG. 3, the CPU 1 judges whether an input operation of time signature is performed on the touch panel 6. Similarly, the input operation of time signature is performed by the user with the pen 17, as shown in FIG. 6B, to write a time i.e., a fraction (a numerator, a denominator) on the staff displayed on the display surface 12. Hereafter, only a staff and G clef will be indicated in the drawings and a key signature will be omitted therefrom only for simplicity, as shown in FIG. 6A. In the case of a time of ¾ as in the present embodiment, a numeral "3" is written above and a numeral "4" is written below. Then, the written numerals are detected by the touch panel 6, and are input to the CPU 1 through the I/O port 7. Recognizing two numerals of the fraction based on numeral data memorized in the ROM 2, the CPU 1 determines that the input operation to time signature has been performed, and performs a displaying process in step SA7 for displaying the time signature. More specifically, corresponding image data of numerals is read out from the ROM 2 and the LCD controller 4 drives the display surface 12 based on the read out image data to display the time signature of "¾" thereon as shown in FIG. 6C.

Figure 7:
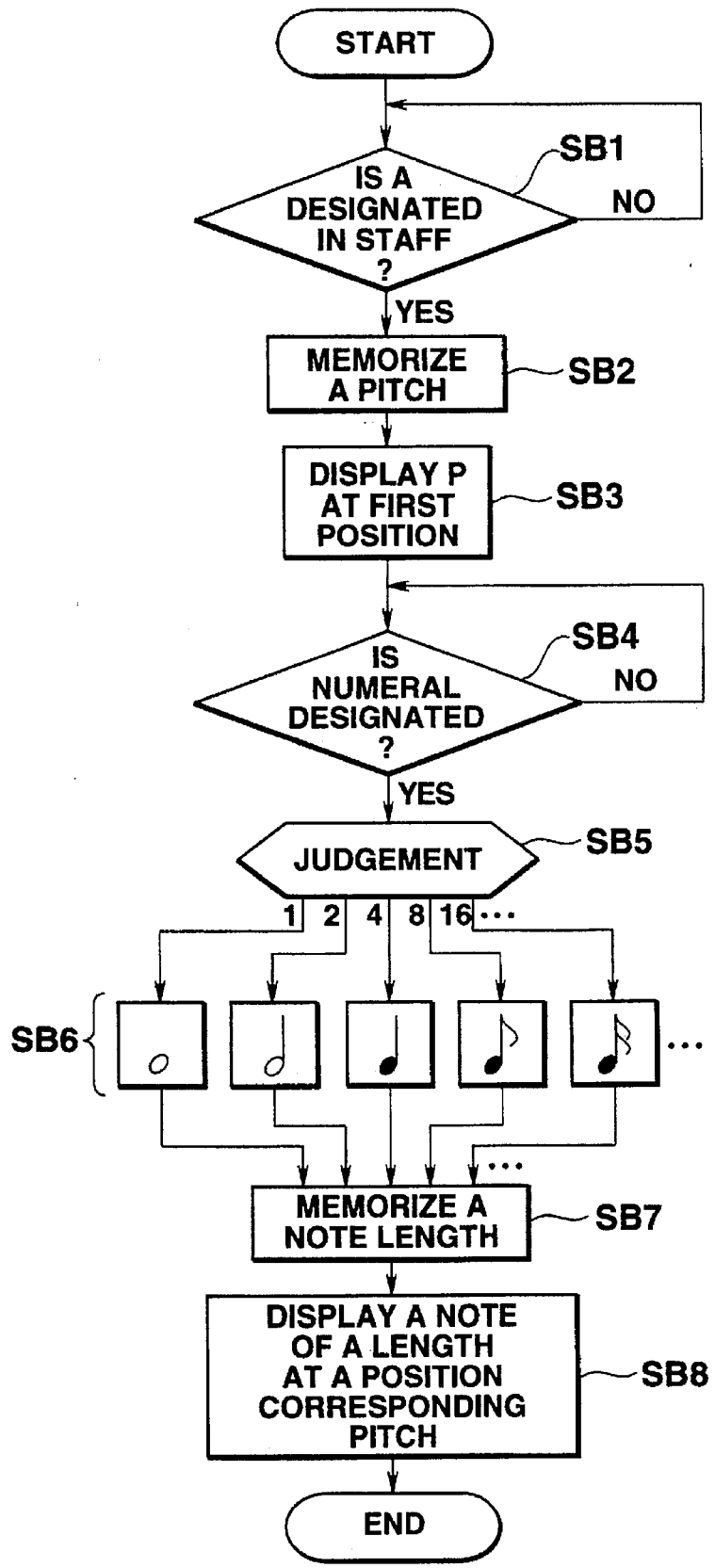
FIG. 7 is a flow chart of a musical note inputting/displaying process in the first embodiment.
Figure 8A:
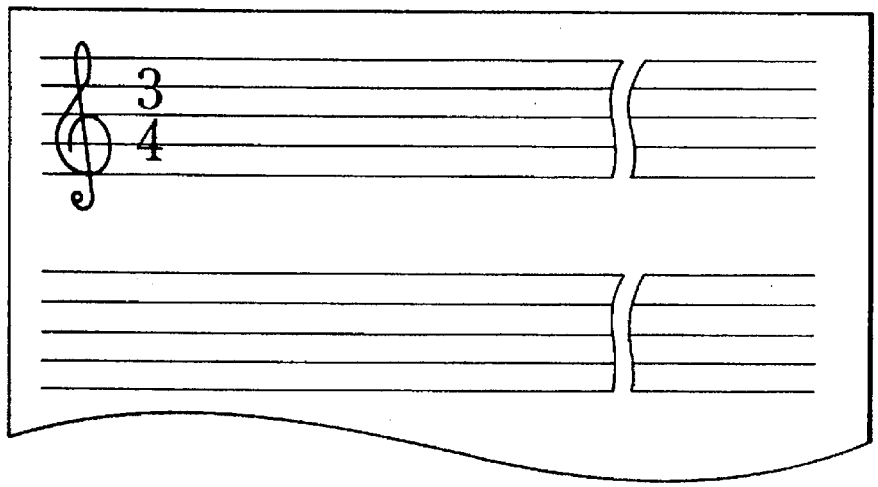
FIGS. 8A-8C are views showing inputting operations of a musical note in the first embodiment.
Figure 8B:
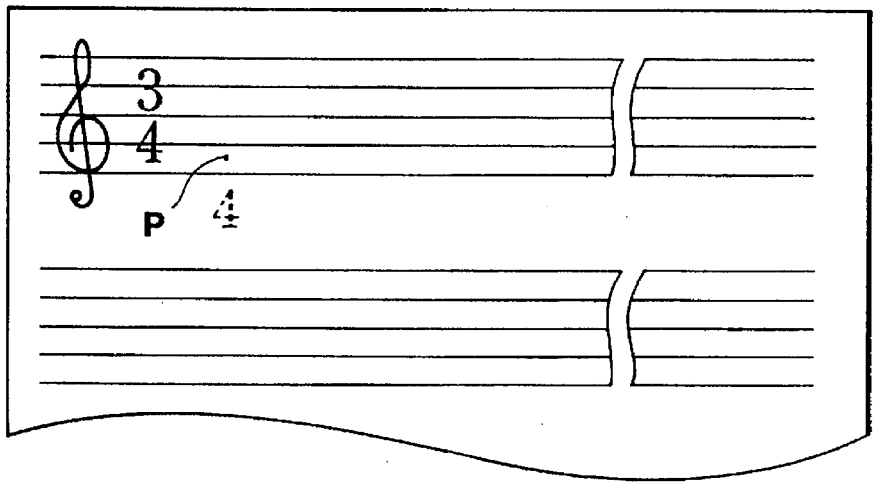

Having performed processes in steps SA1 to SA7, the CPU 1 performs the following note input-operation detecting/displaying process in step SA8. The note input-operation detecting/displaying process is performed in accordance with a flow chart of FIG. 7. In step SB1, the CPU 1 judges whether a pitch is designated in the indicated staff. A pitch is designated by touching a position with a pointed end of the pen 17, where a note is to be written on the staff. When, for example, a quarter note of a pitch F1 is written on the staff with G clef of FIG. 8A, a first space on the staff is touched with the pointed end of the pen 17. Then, the pen touch with the pen 17 is detected by the touch panel 6, and is input to the CPU 1 through the I/O port 7. The CPU 1 stores the designated pitch at a pertinent area in the RAM 3 in step SB2, and displays a point P at the first space in the staff in step SB3, as shown in FIG. 8B.

The CPU 1 judges in step SB4 whether a numeral is designated, i.e., whether a time designating process is executed. As shown with broken lines in FIG. 8B, the time designating process is executed to write below the point P a numeral corresponding to the note to be written. In the case a quarter note of a pitch F4 is written as in the present embodiment, a numeral "4" corresponding to the quarter note is written with the pen 17. When the numeral "4" is written, the CPU 1 determines that the time designating process has been executed, and judges the content based on the designated numeral in step SB5.

Figure 8C:
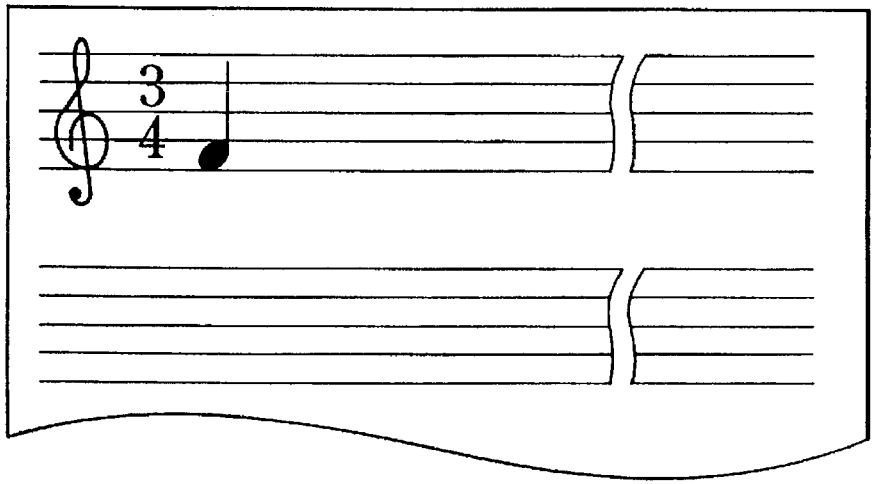

More specifically, notes (whole note, half note, quarter note, eighth note, sixteenth note and so on) of various lengths are previously stored together with numerals 1, 2, 4, 8, 16 and so on in the ROM 2. Recognizing the number written with the pen 17, the CPU 1 determines the note length corresponding to the recognized numeral in step SB6, and stores the determined note length in the RAM 3 in step SB7. Based on the pitch previously memorized in the RAM 3 in step SB2 and the note length stored in the RAM 3 in step SB7, the CPU 1 displays in step SB8 the note (a quarter note of F 1) to be written at a space corresponding to the pitch F1, as shown in FIG. 8C.

Figure 9A:
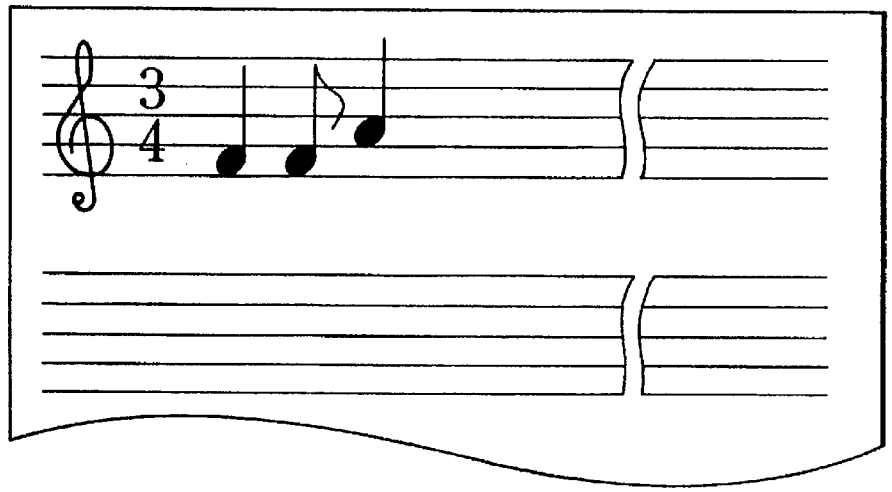
FIGS. 9A-9C are views showing transitional indications in an automatic bar-line writing process of the first embodiment.

Meanwhile, in step SA9 of the main flow chart of FIG. 3, the CPU 1 judges whether notes have been input for one measure at the time, and repeatedly executes processes in steps SA8 to SA9 until notes to be input in one measure have been input. Therefore, when a pitch and numeral of a note are designated on the staff, i.e., when, for example, a pitch F4 is designated and then a numeral "8" is written and further a pitch A4 is designated and then a numeral "4" is written, then an eighth note of F4 and a quarter note of A4 are successively displayed following the previous quarter note of F4, as shown in FIG. 9A. Since notes to be written within one measure at the time of ¾ have not yet been written at this time, the processes at steps SA8 and SA9 are repeatedly executed.

Figure 9B:
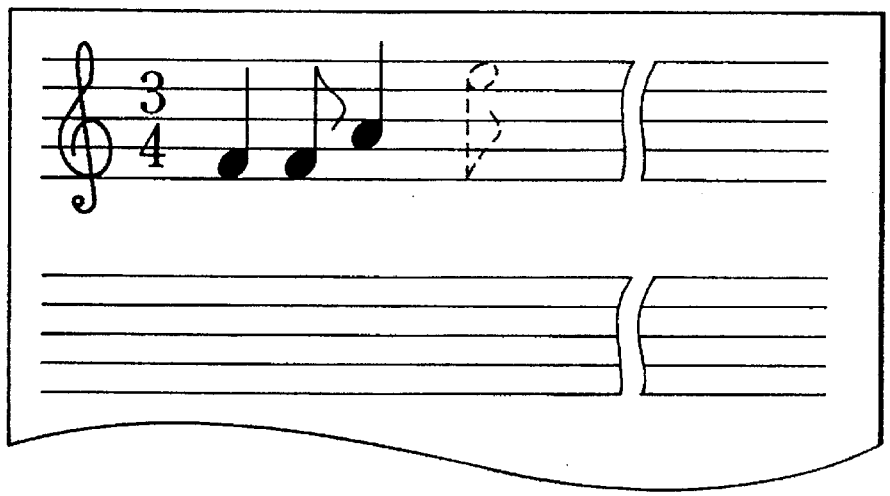
Figure 9C:
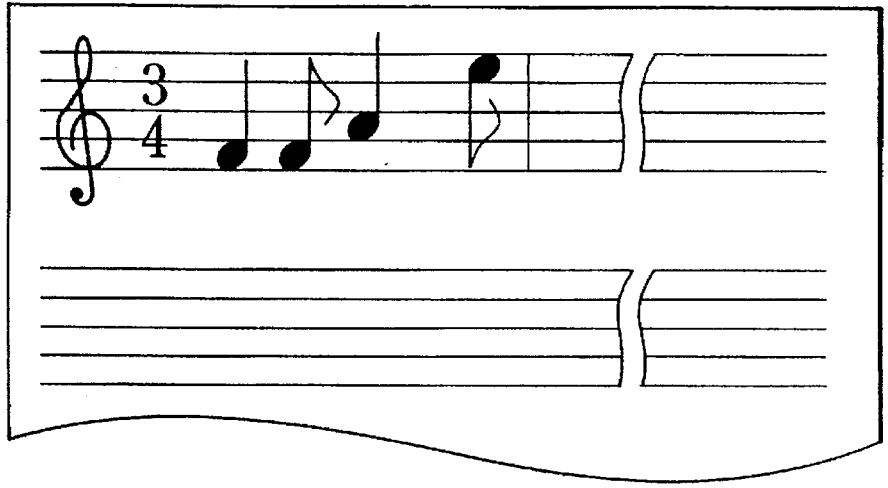

When an input operation of an eighth note of E5 is performed as shown by broken lines in FIG. 9B, notes to be written within one measure have been input (an input process for inputting notes for one measure has been finished), and a bar is automatically drawn in step SA10. In step SA10, a bar is displayed next to the last input eighth note of E5, as shown in FIG. 9C.

Figure 10A:
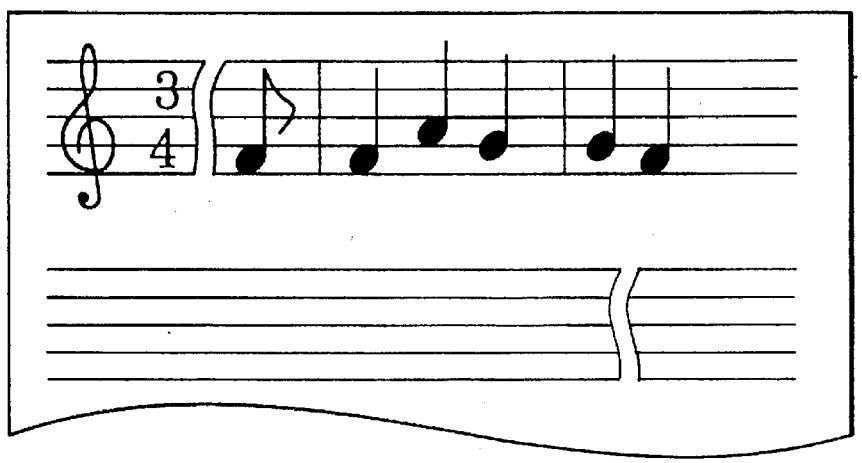
FIGS. 10A–10C are views showing transitional indications in an amending process of a music in the first embodiment.
Figure 10B:
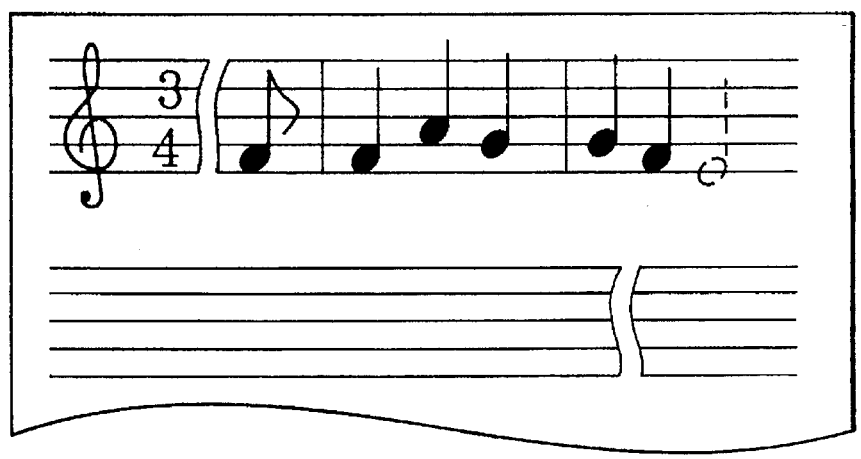

Further, the CPU 1 judges in step SA11 whether all the notes to be written within the first staff have been input completely. The CPU 1 repeatedly executes the processes in step SA8 to SA11 until all the notes to be written on the first staff are input completely. While the processes in step SA8 to SA11 are repeatedly executed, notes are successively input and displayed as shown in FIG. 10A, and at the time all the notes to be written within one measure have been input completely, a bar is automatically displayed. When the input operation of a quarter note of E2 is performed as shown by broken lines in FIG. 10B, notes to be written within one measure have been input and the input process for inputting notes on the first staff has been finished. A bar is automatically drawn in step SA10, and the judgement in step SA11 is "YES" and the operation goes to step SA12, where the CPU 1 judges whether the music has been completed.

Figure 10C:
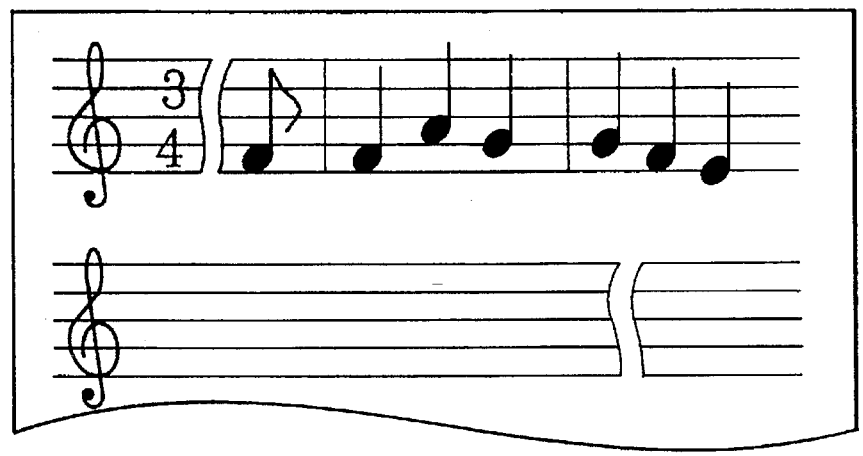
Figure 11A:
FIGS. 11A–11C are views showing transitional indications in a double-bar writing process of the first embodiment.
Figure 11B:

When a bar is drawn with the pen 17 to the left of the last bar drawn automatically and in parallel therewith, as viewed in FIG. 11B, the CPU 1 determines that the music has been completed. When a bar is not drawn with the pen 17, the CPU 1 displays a clef and a key signature in step SA13 and repeatedly executes processes in steps SA8 to SA13. In step SA13, a second staff is selected, and a clef and a key signature are automatically displayed on the second staff, as shown in FIG. 10C (the key signature is omitted as described with respect to FIG. 6A).

Figure 11C:
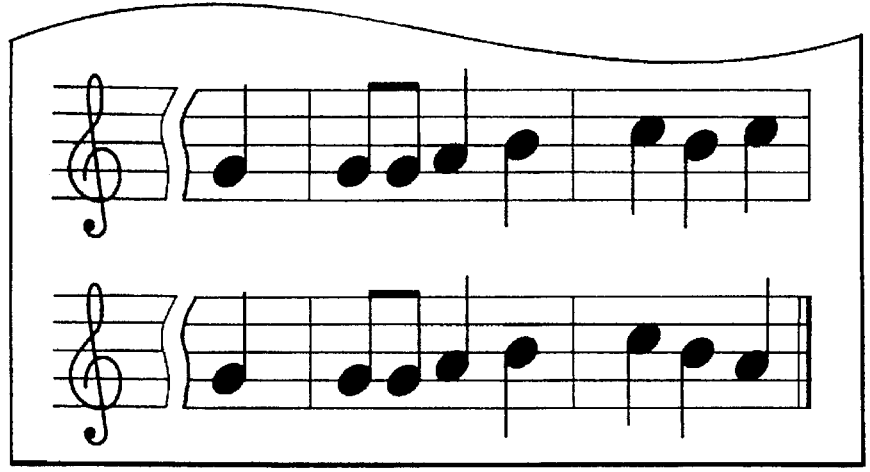

The processes in steps SA8 to SA13 are repeatedly executed until the CPU 1 determines that the music has been completed, and notes are successively input and displayed during the processes in steps SA8 to SA 13, as shown in FIG. 11A. When all the notes to be written within one measure have been written, a bar is automatically indicated, and when all the notes to be written on one staff have been written, a next staff is selected and a clef, a key signature and the like are automatically indicated on the selected staff. When the music has been completed, and a bar is written with the pen 17 to the left of the last bar automatically drawn and in parallel therewith, as shown with a broken line in FIG. 11B, then the CPU 1 determines that a music has been completed. Now, the operation advances from step SA12 to step SA14, where a cadence mark (bar) is drawn at the final portion of the last staff as shown in FIG. 11C.

SECOND EMBODIMENT

Figure 12:
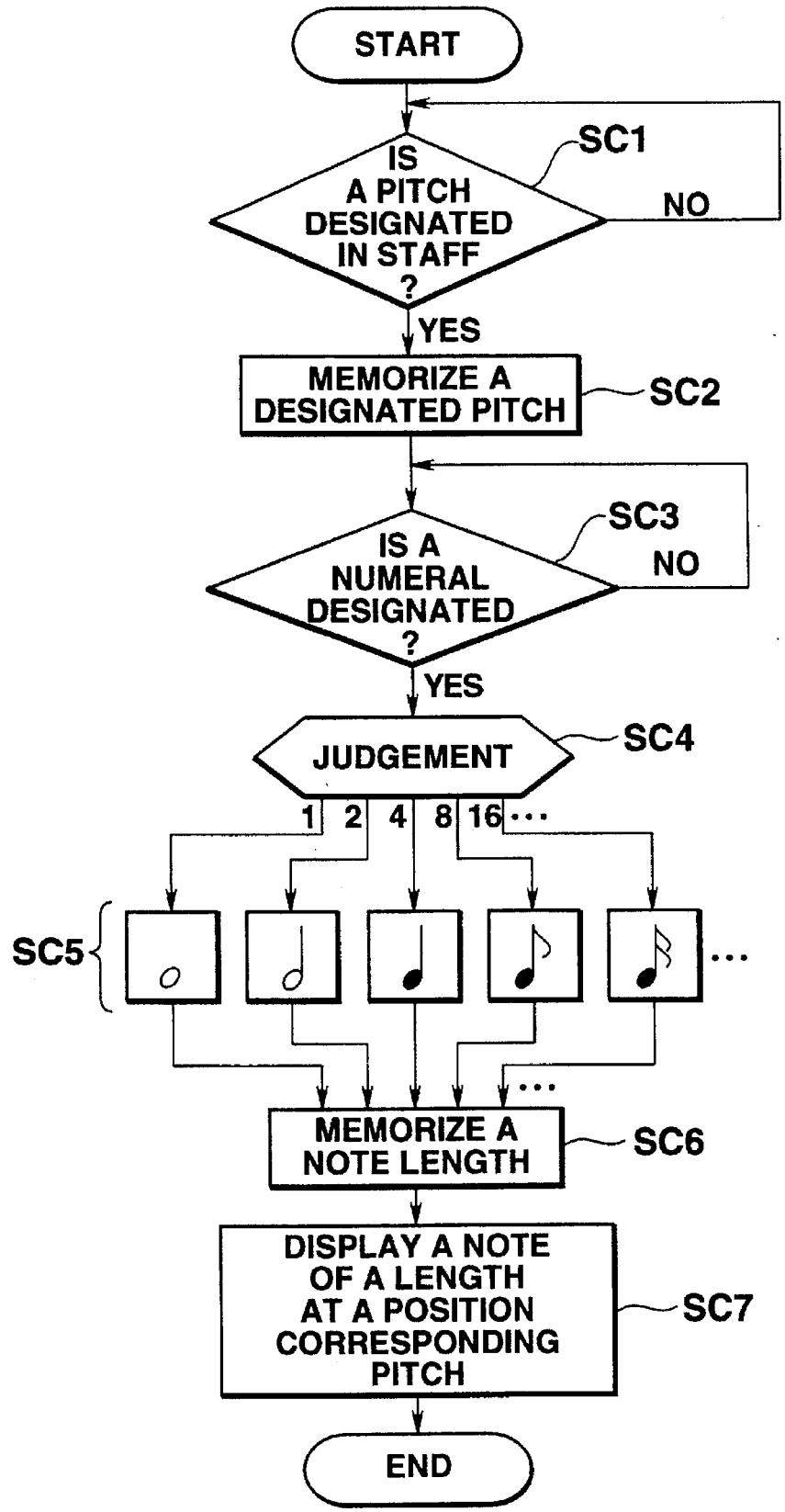
FIG. 12 is a flow chart of a musical note inputting/displaying process in a second embodiment of the present invention.
Figure 13A:
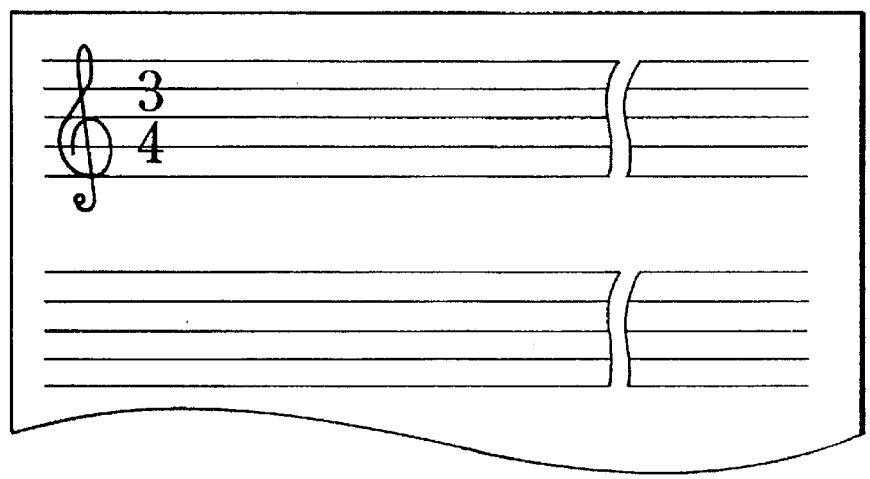
FIGS. 13A–13C are views showing inputting operations of a musical note in the second embodiment.

FIG. 12 is a flow chart of operation of a second embodiment of the present invention. The second embodiment works in accordance with the main flow chart of the first embodiment shown in FIG. 3 except the note input-operation detecting/displaying process in step SA8. FIG. 12 is a flow chart of a note input-operation detecting/displaying process to be executed in step SA8 by the second embodiment. The CPU 1 judges in step SC1 whether a pitch is designated on the indicated staff. Similarly as described in the first embodiment, a pitch is designated by touching a position on the staff shown in FIG. 13A with the pointed end of the pen 17, a position which corresponds to a pitch of a note to be written in the staff. When the pitch of a note is designated, the designated pitch of a note is memorized in a predetermined area in the RAM 3 in step SC2.

Figure 13B:
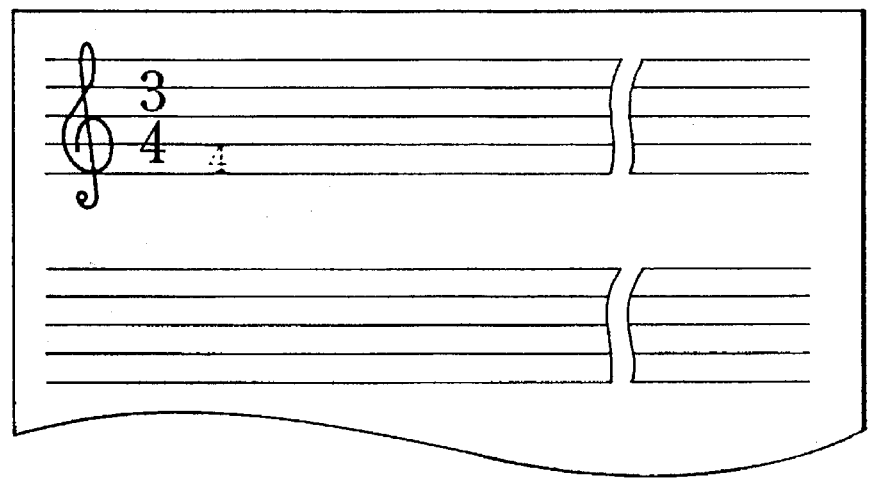
Figure 13C:
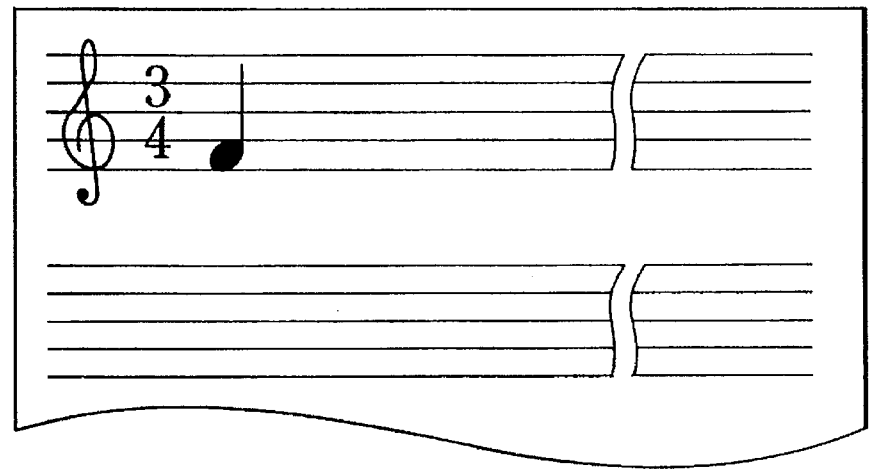

Further, the CPU 1 judges in step SC3 whether a numeral corresponding to a note length given in Table 1 is designated. The numeral is designated by writing a numeral corresponding to a note length given in Table 1 at the position where the pitch is designated. More specifically, when a quarter note of a pitch F1 is written, a numeral "4" representing a quarter note is written at the first space in the indicated staff with the pen 17, as shown by broken lines in FIG. 13B. Then, the CPU 1 judges the content of the input operation based on the designated numeral in step SC4, thereby determining a note length represented by the numeral in step SC5. The CPU 1 stores the determined note length in the RAM 3 in step SC6, and displays in step SC7 a note to be written based on the pitch previously memorized in step SC2 and the note length memorized in step SC7. In step SC7, a quarter note is displayed at a position corresponding to the pitch of F1 as shown in FIG. 13C.

In the second embodiment, when a numeral corresponding to a note length is written at a position on the staff displayed on the display surface 12 with the input pen 17, the CPU 1 judges "YES" in step SC1 at the time to start writing the numeral and judges "YES" in step SC3 at the time when the numeral has been written, and then displays a desired note at an appropriate position in the staff in step SC7. In this manner, a single and simple operation to write a numeral at a position in the staff where a given note to be written allows the note to be indicated at the position in the staff.

THIRD EMBODIMENT

Figure 14:
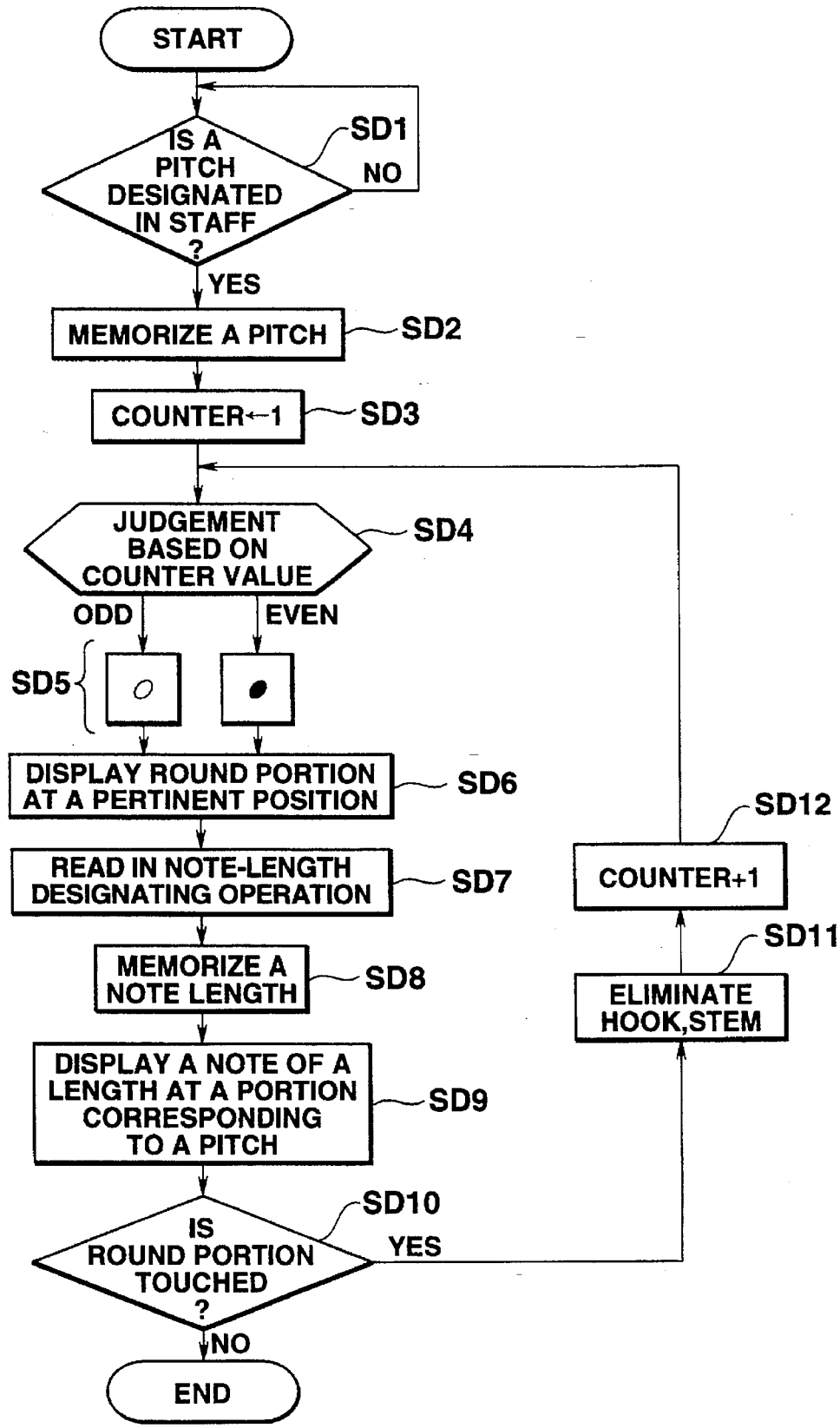
FIG. 14 is a flow chart of a musical note inputting/displaying process in a third embodiment of the present invention.
Figure 15A:
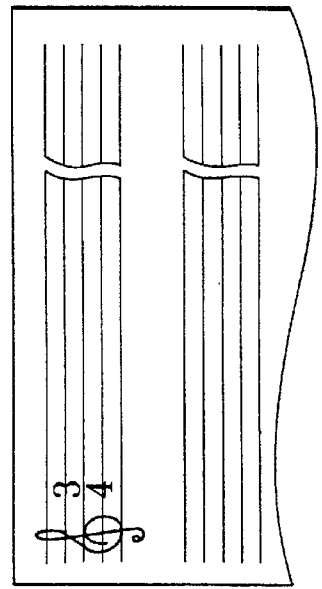
FIGS. 15A–15F are views showing inputting operations of a musical note in the third embodiment.
Figure 15B:
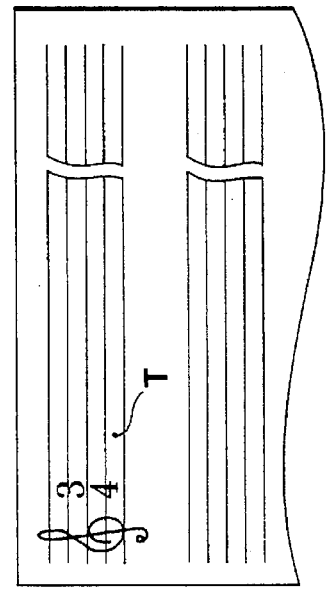

FIG. 14 is a flow chart of operation of a third embodiment of the present invention. The third embodiment works in accordance with the main flow chart of the first embodiment shown in FIG. 3 except for the note input-operation detecting/displaying process in step SA8. FIG. 14 is a flow chart of a note input-operation detecting/displaying process to be executed in step SA8 by the third embodiment. A counter is prepared in the RAM 3 to memorize the number of depressions. The CPU 1 judges in step SD1 whether a pitch is designated on the indicated staff. Similarly as described in the first embodiment, a pitch is designated by touching a position on the staff shown in FIG. 15A with the pointed end of the pen 17, a position which corresponds to a pitch of a note to be written in the staff. When a pitch F1 of a note is written, a numeral "4" representing a quarter note is designated, the first space in the indicated staff is touched with the pen 17, as shown at a point T in FIG. 15B. When the pitch of a note is designated, the designated pitch F1 of a note is memorized in a predetermined area in the RAM3 in step SD2.

Figure 15C:
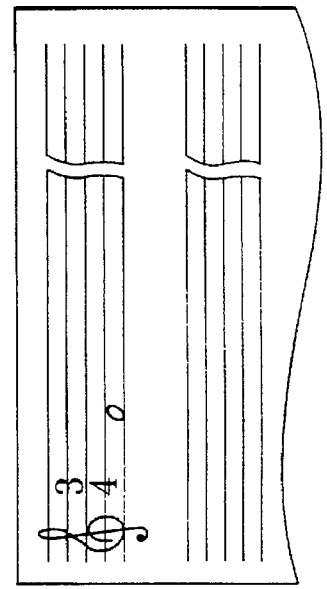

Then, an initial value "1" is set to a counter in step SD3, and the CPU 1 makes judgement based on the value of the counter in step SD4, i.e., the CPU 1 judges whether the value in the counter (a counter value) is an odd number or an even number in step SD4. When the counter value is an odd number, a round portion of a note is made white, and when an even number, the round portion of a note is made black in step SD5, which is indicated at a pertinent position in the staff in step SD6. Now, we presume that a typical note is composed of a round portion and a stem connected to the round portion (black or white) and sometimes hook(s) extending from the stem. Therefore, when a pitch of F4 is designated and the counter value is "1" as described above, a note with a white round portion, i.e., a whole note is displayed at the first space in the staff, as shown in FIG. 15C.

Then, a note-length designating/inputting operation is executed, in which a stem and/or a hook(s) are added by means of the pen 17 to the round portion of a note that is indicated in the staff in step SD6 or in which nothing is added to the indicated round portion of the note. More specifically, in the case that a note such as a half note and a quarter note, which each are composed of a round portion and a stem, is to be indicated, only a stem is added to the previously indicated round portion. In the case when a note such as an eighth note, a sixteenth note and a thirty-second note, which each are composed of a round portion, a stem and a hook(s) quarter note, is to be indicated, a stem and a hook(s) are added to the indicated round portion. Further, in the case a whole note, which is composed of a round portion with nothing, is to be indicated, nothing is added to the indicated round portion.

Figure 15D:
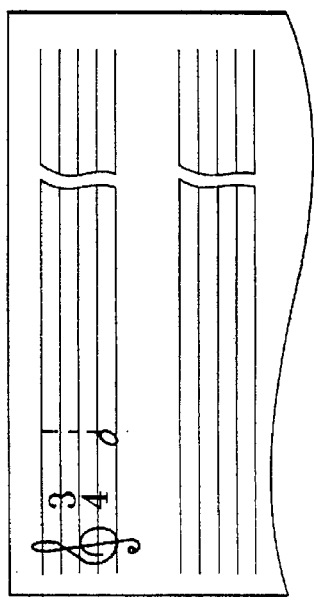
Figure 15E:
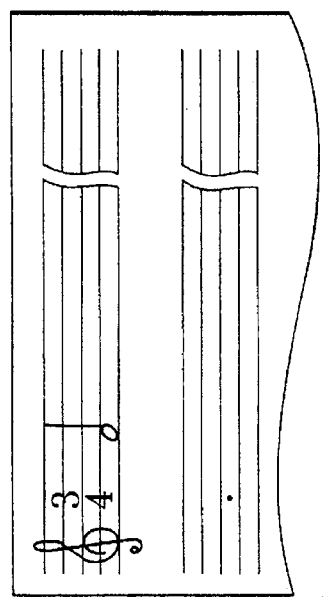

When the note length is designated by adding a stem and a hook(s), the note-length designating/inputting operation is read in in step SD7, and the designated note length is memorized in the RAM 3 in step SD8. When nothing is added to the indicated round portion and a predetermined time is lapsed, as in designating a whole note, the operation advances from step SD7 to step SD8, where the note length of the whole note is memorized. Then a note is displayed in step SD9 in accordance with the note pitch previously memorized in step SD2 and the note length memorized in step SD8. Therefore, when a stem is added to the whole note of a pitch F1 which is previously indicated as shown in FIG. 15D, a half note of a pitch F1 will be indicated as shown in FIG. 15E.

In step SD10, it is judged whether a round portion of a note is touched with the pen 17. When not, the operation is finished and a half note of F1 indicated in step SD9 is decided, and a next note inputting operation starts.

Figure 15F:
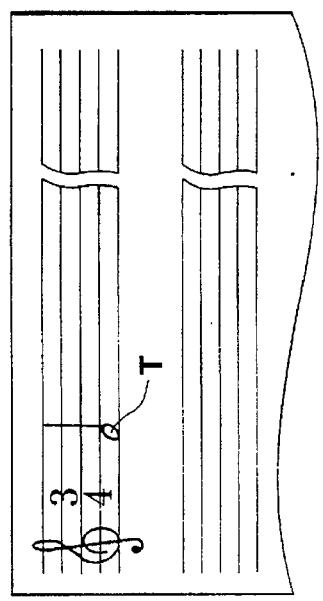
Figure 16A:
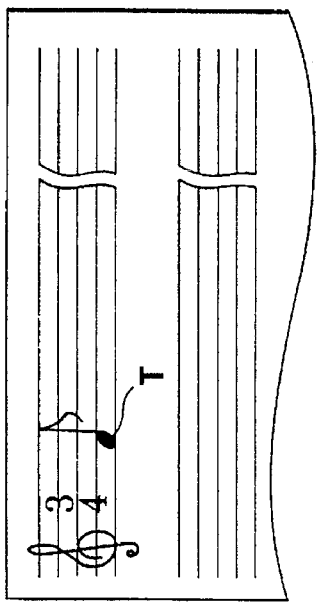
FIGS. 16A–16E are views showing inputting operations of a musical note following the operations of FIGS. 15A–15F in the third embodiment.

When the round portion of a note is touched with the pen 17 as shown by a point T in FIG. 15F, a stem and a hook(s) indicated at that time are eliminated in step SD11. The counter is incremented in step SD12, and judging processes in step SD4 thereafter will be executed again. Therefore, the counter of a value "1" is set to "2", and the round portion of a note is made black in step SD5 because the counter value is an even number. Beside, since a stem and a hook(s) are eliminated in step SD11, a black round of a pitch F1 is indicated in step SD6 as shown in FIG. 16A.

Figure 16D:
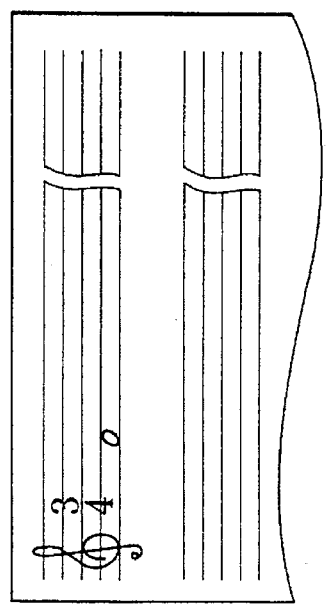
Figure 16B:
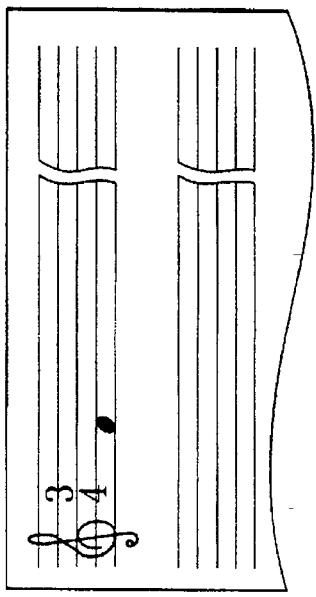
Figure 16E:
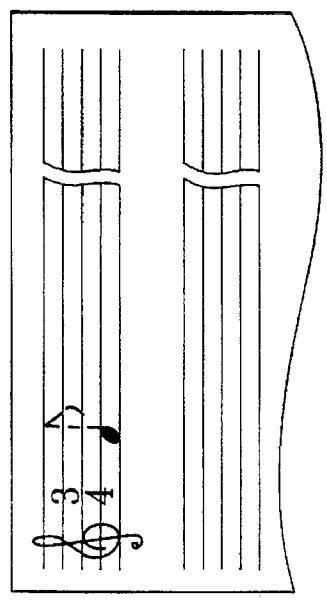
Figure 16C:
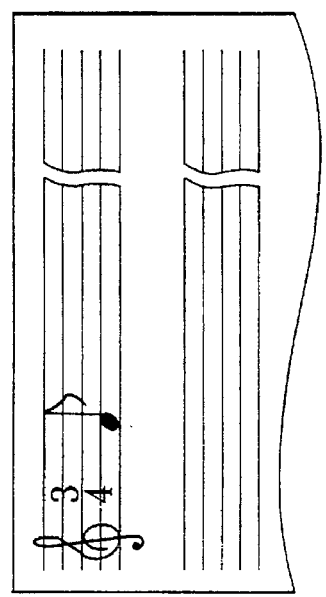

When a stem and a hook(s) are added to the black round portion to input an eighth note as shown by broken lines in FIG. 16B, the added stem and hook(s) are read in in step SD7. Further, the note length is memorized in step SD8 and then the eighth note of a pitch F4 is displayed in step SD9, as shown in FIG. 16C. When the round portion of the eighth note is not touched with the pen 17, the operation goes from step SD10 to end, wherein the eighth note of F1 indicated in step SD9 is decided and a next-note inputting operation starts.

When the black round portion of the eighth note is touched as shown by a point T in FIG. 16D, the stem and the hook are eliminated therefrom in step SD11. The counter is incremented in step SD12, the judging processes in step SD12 thereafter are executed again. The counter value is set to "3", and is an odd number. Then the round portion of a note is made white in step SD6 as shown in FIG. 16E. In addition, since the stem and the hook are eliminated in step SD11, the white round portion is indicated at the first space (a position of F4) as shown in FIG. 16E. When the white round portion is not touched with the pen 17, the operation advances from step SD10 to end, wherein the whole note of a pitch F4 indicated in step SD9 is decided, and a next note input-operation starts. When the round portion is touched, the processes in steps SD4 to SD12 are repeatedly executed to input and display a desired note.

FOURTH EMBODIMENT

Figure 17:
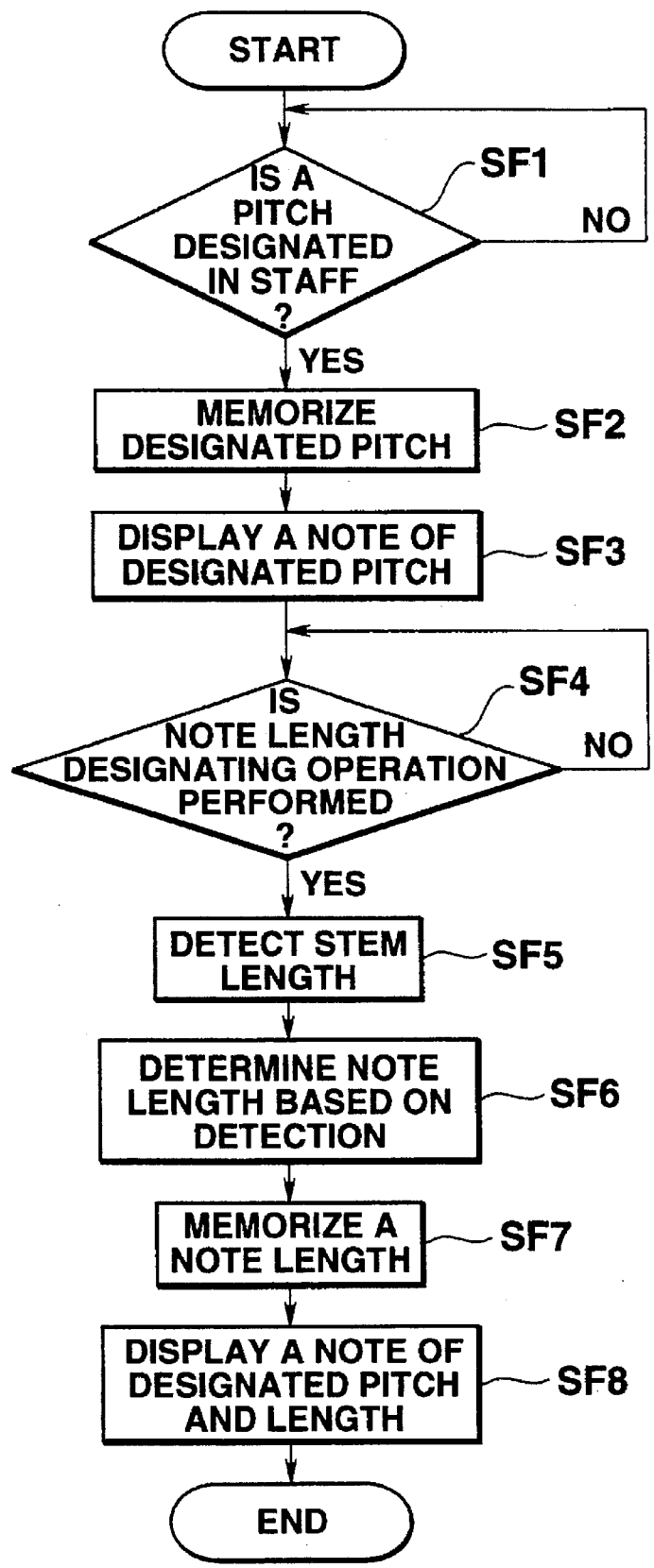
FIG. 17 is a flow chart of a musical note inputting/displaying process in a fourth embodiment of the present invention.
Figure 18A:
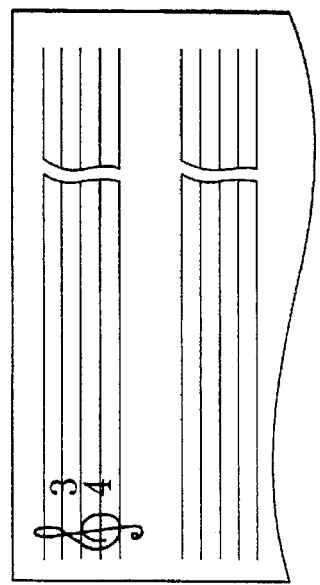
FIGS. 18A–18D are views showing inputting operations of a musical note in the fourth embodiment.
Figure 18B:
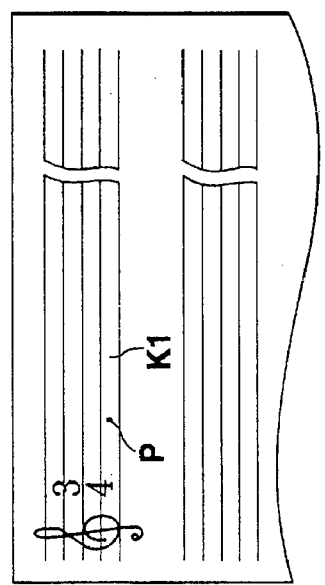

FIG. 17 is a flow chart of operation of a fourth embodiment of the present invention. The fourth embodiment works in accordance with the main flow chart of the first embodiment shown in FIG. 3 except for the note input-operation detecting/displaying process in step SA8. FIG. 17 is a flow chart of a note input-operation detecting/displaying process to be executed in step SA8 by the fourth embodiment. The CPU 1 judges in step SF1 whether a pitch is designated on the indicated staff. Similarly as described in the first embodiment, a pitch is designated by touching a position on the staff shown in FIG. 18A with the pointed end of the pen 17, a position which corresponds to a pitch of a note to be written in the staff. When the pitch of a note is designated, the designated pitch of a note is memorized in a predetermined area in the RAM 3 in step SF2. When a pitch of F4 is designated, a point P is displayed at the first space in the staff in step SF3 as shown in FIG. 18B.

The CPU 1 judges in step SF4 whether a note length is designated. In the fourth embodiment, a note length is designated depending on a length of a stem drawn on the staff with the pen 17. Note lengths and corresponding lengths of the stem which are given in Table 2 are memorized in the ROM 2 of FIG. 1.

TABLE 2

| Lengths of stem | Note lengths |
| --- | --- |
| 0 | whole note |
| 1/2 intervals | half note |
| one interval | quarter note |
| 3/2 intervals | eighth note |
| two interval | sixteenth note |
| ... | ... |

In Table 2, the interval is a distance between two adjacent lines of the staff indicated on the display surface 12.

Figure 18C:
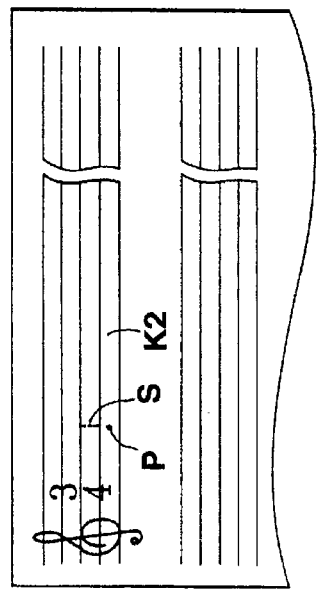
Figure 18D:
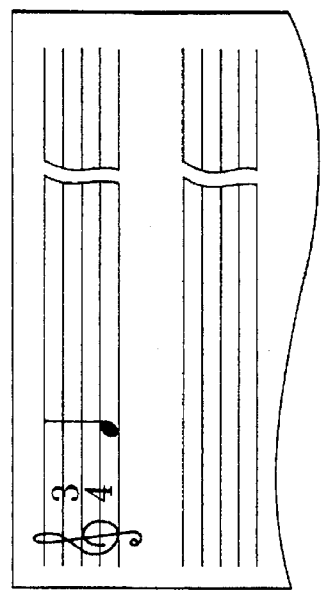

When a stem is drawn in the vicinity of the point P with the pen 17, the CPU 1 determines that a note length has been designated, and detects a length of the stem in step SF5. Further, based on the detected stem length the CPU 1 determines a note length referring the contents memorized in the ROM 2 in step SF6. More specifically, when a stem S of one interval is drawn in the second space K2 between the second line and the third line of the staff as shown in FIG. 18C, the CPU 1 determines that the stem is one interval long and that a note length (a note to be written) is a quarter note, and memorizes the determined note length in a predetermined area in the RAM 3 in step SF7. Then, the CPU 1 displays in step SF8 the note to be written based on the note pitch previously memorized in step SF2 and the note length memorized in step SF7. That is, a quarter note is displayed at the position of F4 in the staff as shown in FIG. 18D. In other words, when a position is designated with the pen 17, which position corresponds to a pitch of the note to be written in the staff displayed on the display surface 12, the CPU 1 judges "YES" in step SF1. And when the step has been drawn, the CPU 1 judges "YES" in step SF4, and therefore the processes in steps SF5 to SF8 are successively executed, whereby a desired note is displayed at a desired position in the displayed staff. Writing a round at a position corresponding to a pitch on the displayed staff and further drawing a stem of a length corresponding to a note length, the user can input and indicate a desired note on the staff. In the case, a whole note is input, the user is not required to draw a stem, and operates nothing.

FIFTH EMBODIMENT

Figure 19:
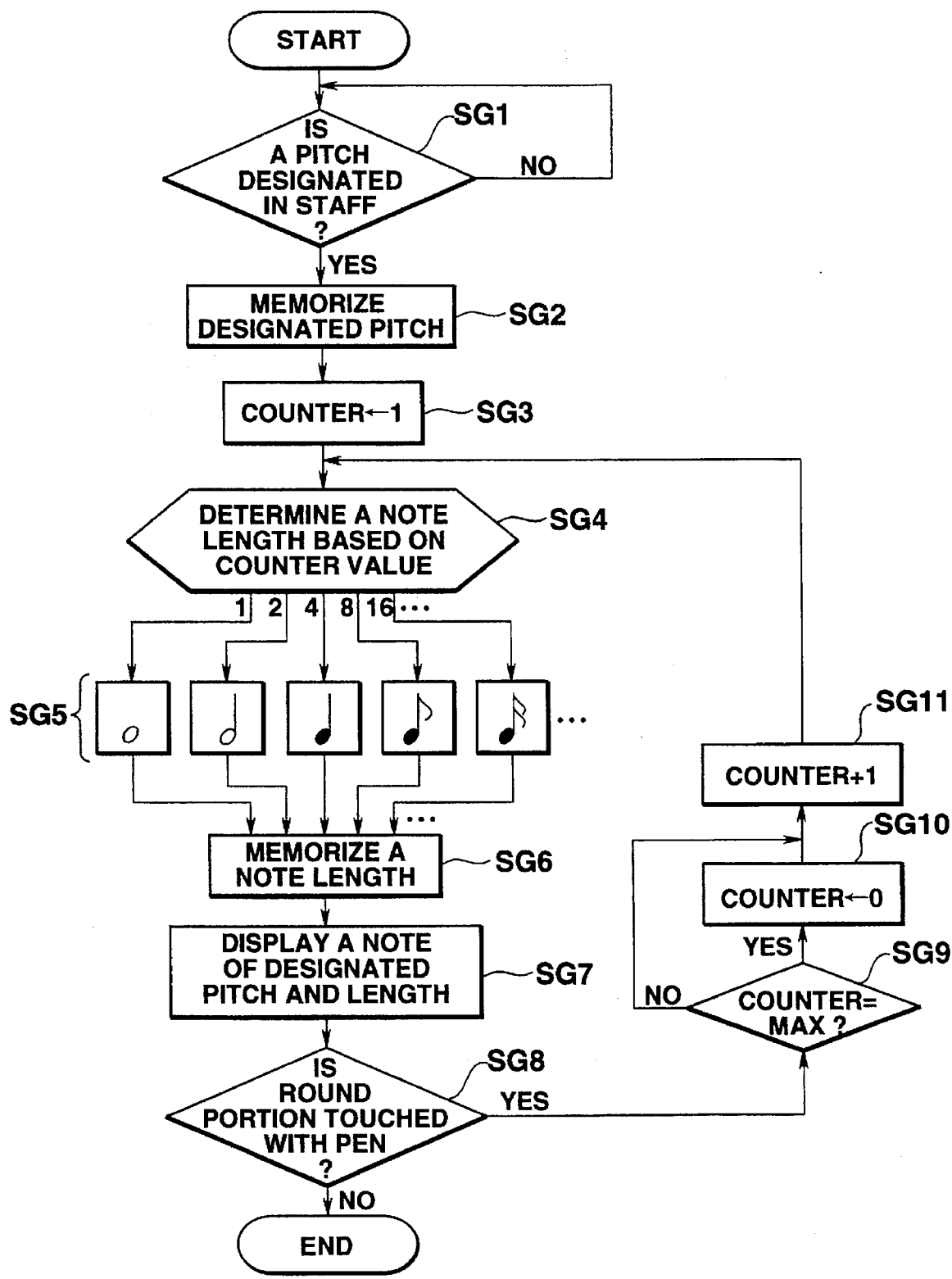
FIG. 19 is a flow chart of a musical note inputting/displaying process in a fifth embodiment of the present invention.

FIG. 19 is a flow chart of operation of a fifth embodiment of the present invention. The fifth embodiment works in accordance with the main flow chart of the first embodiment shown in FIG. 3 except the note input-operation detecting/displaying process in step SA8. FIG. 19 is a flow chart of a note input-operation detecting/displaying process to be executed in step SA8 by the fifth embodiment. In the fifth embodiment, a counter is prepared in the RAM 3 to memorize the number of depressions, and note length data and corresponding numerals memorized in the RAM 3 are memorized in the ROM 2 as indicated in Table 3.

TABLE 3

| Counter value | Notes |
| --- | --- |
| 1 | whole note |
| 2 | half note |
| 3 | quarter note |
| 4 | eighth note |
| 5 | sixteenth note |
| ... | ... |

Figure 20A:
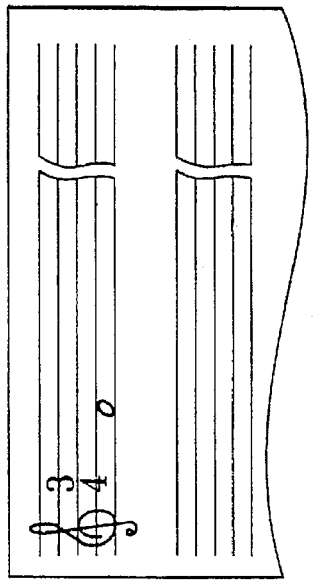
FIGS. 20A–20F are views showing inputting operations of a musical note in the fifth embodiment.

The CPU 1 judges in step SG1 of FIG. 19 whether a pitch is designated on the indicated staff. The pitch is designated by writing a whole note at a position on the staff corresponding to a desired pitch with the pen 17 as shown in FIG. 20A. When, for example, a pitch F4 of a note is designated, a whole note is written at the first space in the indicated staff. Then, the pitch F4 is designated, and the designated pitch F4 is memorized in a predetermined area in the RAM 3 in step SG2.

Then, an initial value "1" is set to a counter in step SG3, and the CPU 1 determines a note length based on the counter value in step SG4, and determines a note corresponding to the counter value in step SG5. The CPU 1 memorizes the determined note length in step SG6, and displays in step SF7 a note based on the pitch memorized in step SG2 and the note length memorized in step SG6. If the pitch F1 is designated as described above, and the counter value is "1", a whole note is displayed at the first space of the staff as shown in FIG. 20A.

Figure 20B:
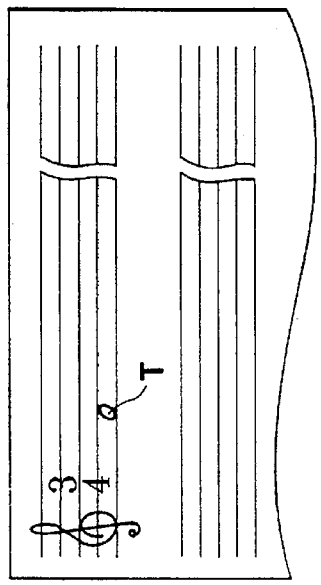

In step SG8, it is judged whether a round portion of a note is touched with the pen 17. When not, touched with the pen 17 the operation is finished. That is, a whole note of F4 indicated in step SG7 is decided, and a next note inputting operation starts. But when the round portion of a note is touched with the pen 17 as shown by a point T in FIG. 20B, it is judged in step SG9 whether the counter has been set to the maximum value (for example, the maximum value=7).

Figure 20C:
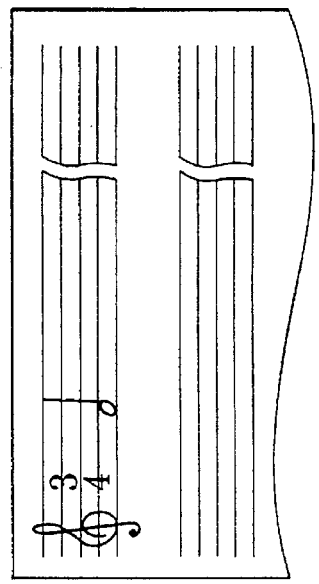

When the counter has reached the maximum value, the counter is reset in step SG10 and is incremented. When the counter has not yet reached the maximum value, the counter is not reset and is incremented in step SG11. Thereafter, the judging process in step SG4 and thereafter are repeatedly executed. Therefore, when the counter which has been set to the initial value "1" is incremented to "2", a half note is selected in step SG5 and the half note of a pitch F4 is displayed in step SG7, as shown in FIG. 20C. While the half note being displayed, the CPU 1 judges in step SG8 whether the round portion of the half note is touched with the pen. When not, the operation goes to end and the half note indicated in step SG7 is finally selected, and a next note inputting operation starts.

Figure 20D:
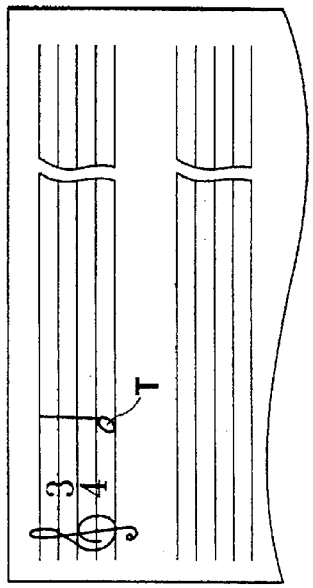
Figure 20E:
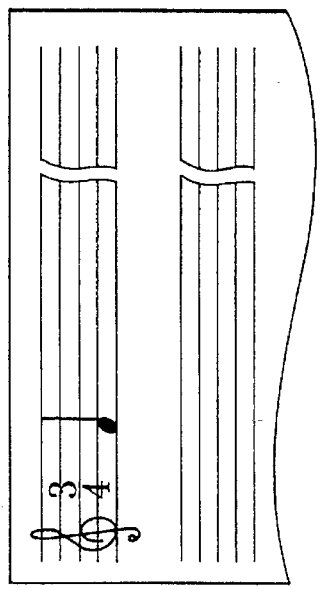

When the round portion of the half note is touched as indicated by a point T in FIG. 20D, the operation advances from step SG8 through steps SG9, SG10, SG11 to step SG4. The counter is incremented to "3" in step SG11, and a quarter note is decided in step SG5. The note displaying process of step SG7 is executed, and thereby the quarter note of F4 is displayed as shown in FIG. 20E. Further, when the round portion of the quarter note is not touched, the operation goes to end and the quarter note of F4 displayed in step SG7 is finally decided, and then a next note inputting operation starts.

Figure 20F:
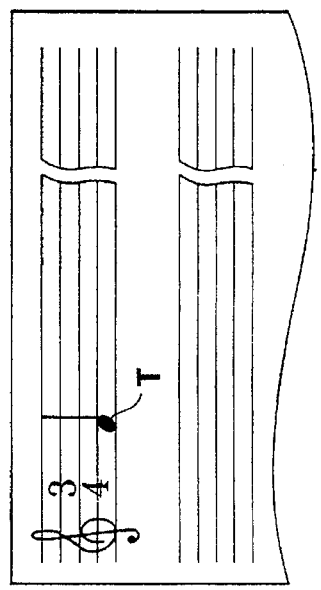
Figure 21A:
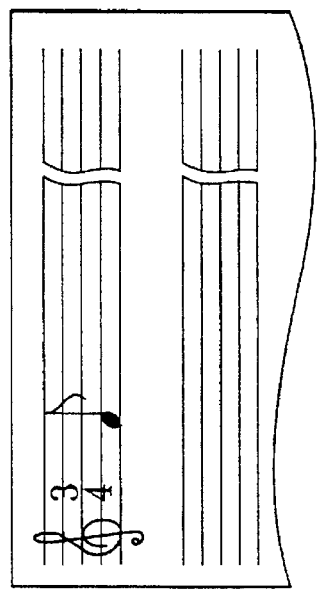
FIGS. 21A–21F are views showing inputting operations of a musical note following the operations of FIGS. 20A–20F in the third embodiment.

When the round portion of the half note is touched as indicated by a point T in FIG. 20F, the operation advances from step SG8 through steps SG9, SG10, SG11 to step SG4. The counter is incremented to "4" in step SG11, and an eighth note is decided in step SG5. The note displaying process of step SG7 is executed, and thereby the eighth note of F1 is displayed as shown in FIG. 21A. Further, when the round portion of the eighth note is not touched, the operation goes to end and the eighth note of F1 displayed in step SG7 is finally decided, and then a next note inputting operation starts.

Figure 21B:
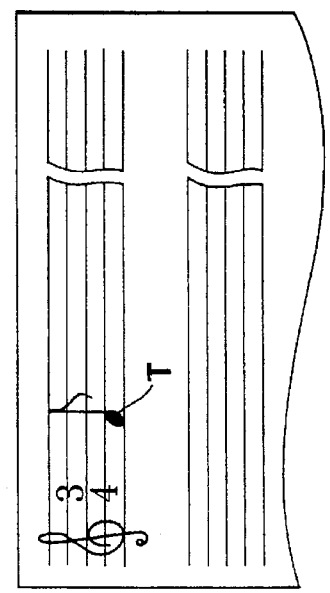
Figure 21C:
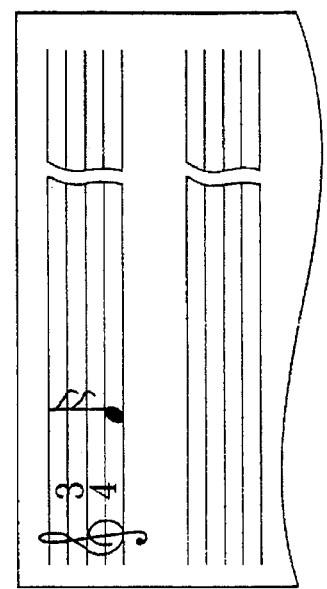
Figure 21D:
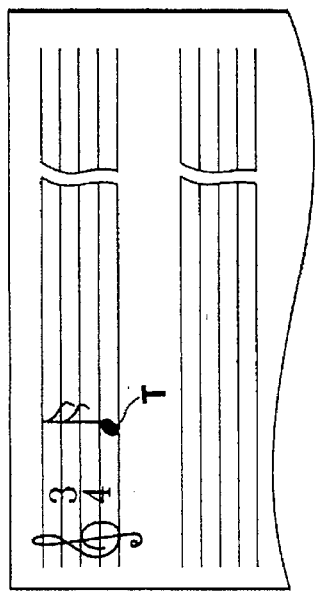
Figure 21E:
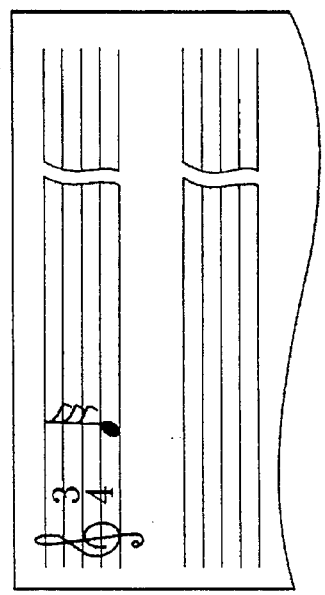
Figure 21F:
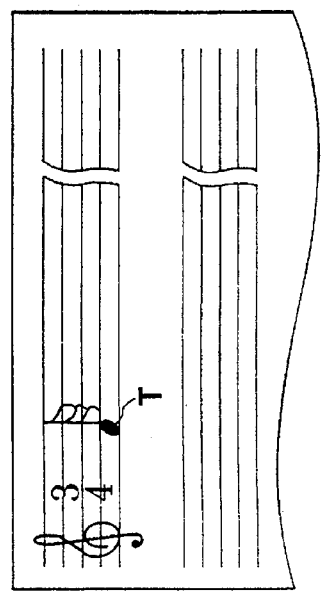

Similarly, when the round portion of the eighth note is touched as shown in FIG. 21B, a sixteenth note is displayed as shown in FIG. 21C. When the round portion of the sixteenth note is touched as shown in FIG. 21D, a thirty-second note is displayed as shown in FIG. 21E. When the round portion of the thirty-second note is touched as shown in FIG. 21F, a sixty-fourth note (not shown) is displayed. When the round portion of the sixty-fourth note is touched, the counter reaches the maximum value. Then, the counter is reset to the initial value "1", and a whole note is displayed again. In this manner, a desired note of a desired pitch may be indicated with simple touching operations to a note displayed on the display surface 12.

SIXTH EMBODIMENT

Figure 22:
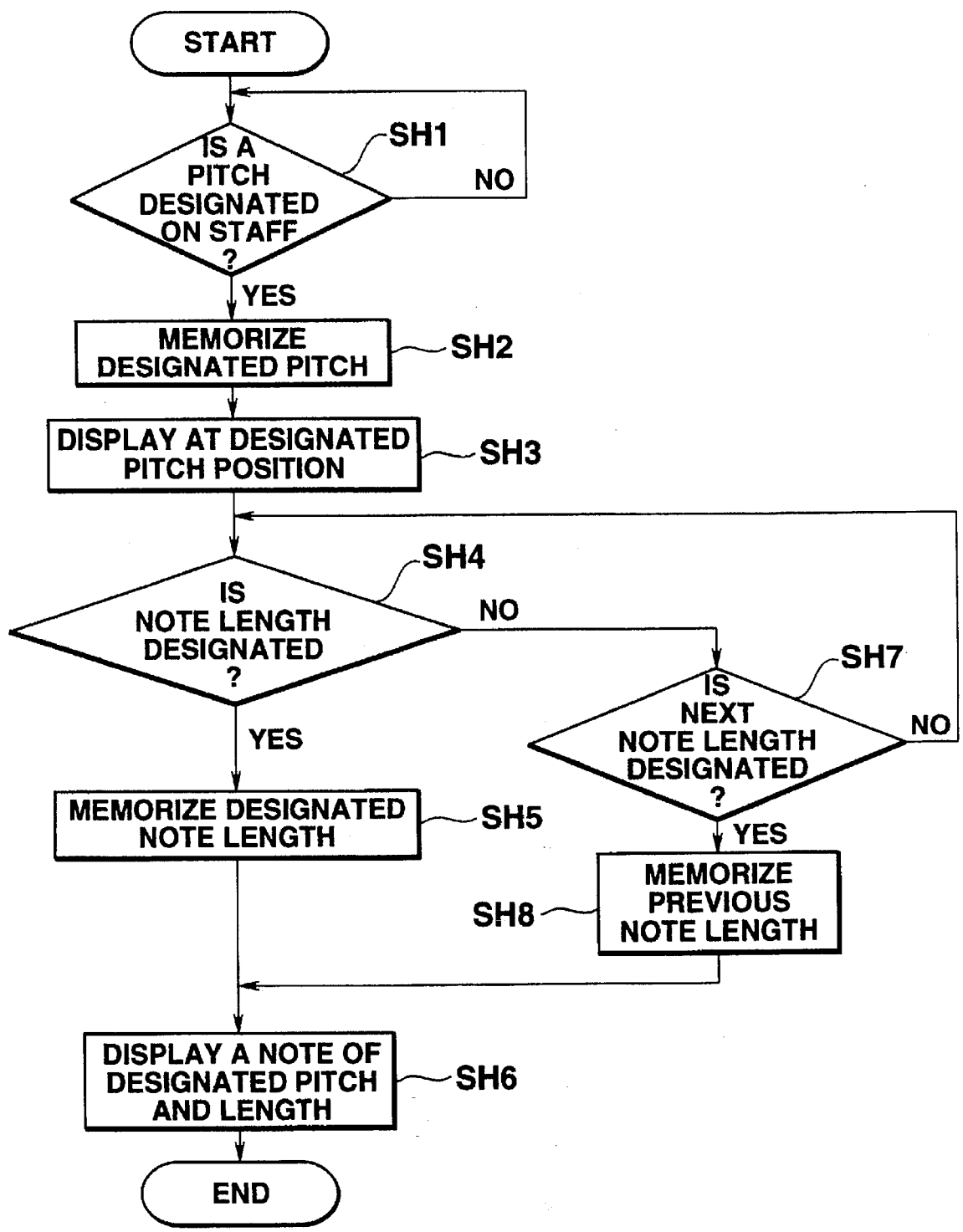
FIG. 22 is a flow chart of a musical note inputting/displaying process in a sixth embodiment of the present invention.
Figure 23A:
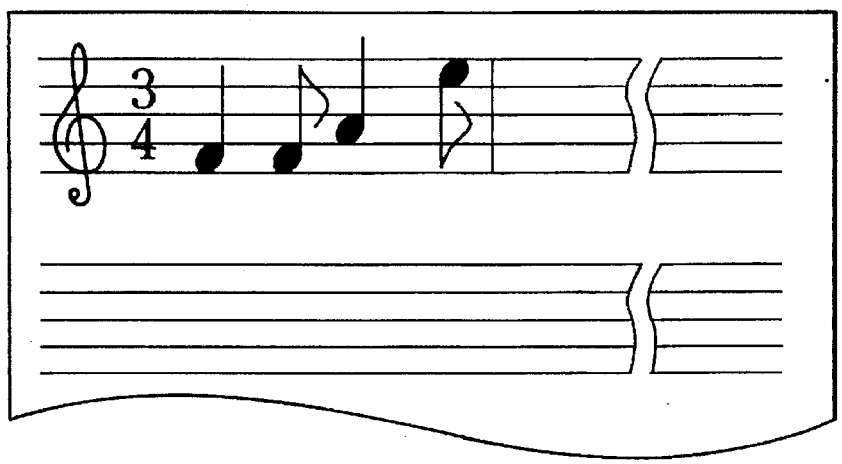
FIGS. 23A–23C are views showing inputting operations of a musical note in the sixth embodiment.

FIG. 22 is a flow chart of operation of a sixth embodiment of the present invention. The sixth embodiment works in accordance with the main flow chart of the first embodiment shown in FIG. 3 except for the note input-operation detecting/displaying process in step SA8. FIG. 22 is a flow chart of a note input-operation detecting/displaying process to be executed in step SA8 by the sixth embodiment. The CPU 1 judges in step SH1 whether a pitch is designated on the indicated staff. When the pitch of a note is designated, the designated pitch of a note is memorized in a predetermined area in the RAM 3 in step SH2. The CPU 1 executes a display operation at a position of the designated pitch in step SH3, and then the CPU 1 judges in step SH4 whether a note length is designated. When a note length is designated, the CPU i memorizes the designated note pitch in the RAM 3 in step SH5. In step SH6, the CPU 1 displays a note to be written, based on the pitch previously memorized in step SH2 and the note length memorized in step SH5. When the pitch designating operation and the note length designating operation are alternatively performed as described above, notes having the designated pitches and the designated note lengths are successively displayed on the staff as shown by way of example in FIG. 23A.

Figure 23B:
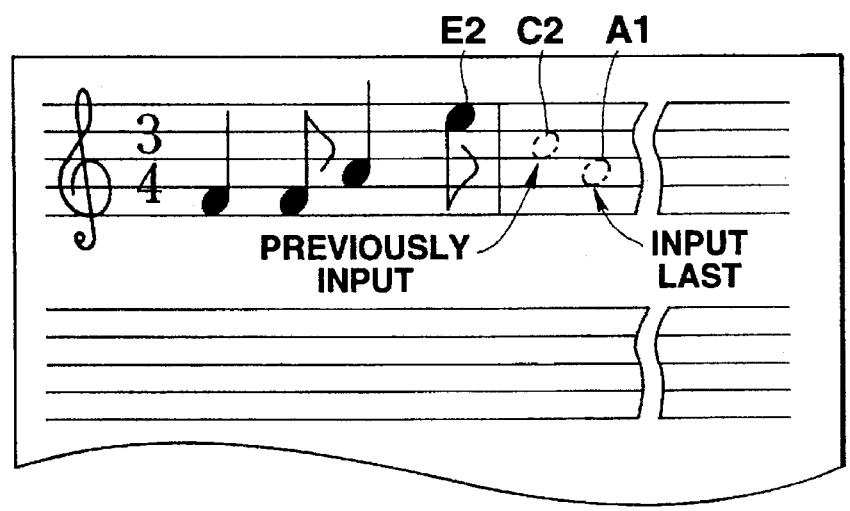

As indicated by broken lines in FIG. 23B, when a pitch C2 is designated, and thereafter a next pitch A4 is designated with no note length designated for the pitch C2, the CPU 1 judges "NO" in step SH4 of the flow chart of FIG. 22. Then, the operation Goes to step SH7, where the CPU 1 judges "YES". Therefore, the previous note length of the eighth note of E2 indicated in FIG. 23B, is retained and memorized in step SH8.

Figure 23C:

In step SH6, the CPU 1 displays the eighth note of a pitch C5, based on the pitch C5 memorized in step SH2 and the note length, i.e., an eighth note, memorized in step SH8. In other words, as shown in FIG. 23C, the eighth note, only the pitch (C5) of which is previously designated, is displayed at the position corresponding to the pitch C5 in the staff in step SH6. In the sixth embodiment, when notes (for example, a first and second notes) of the same note length are successively written, only a pitch of the second note is designated and no note length thereof is designated, and a pitch of the further following note is designated. Then, the second note of the same pitch as the first note is automatically displayed, which simplifies the note input operation.

SEVENTH EMBODIMENT

Figure 24:
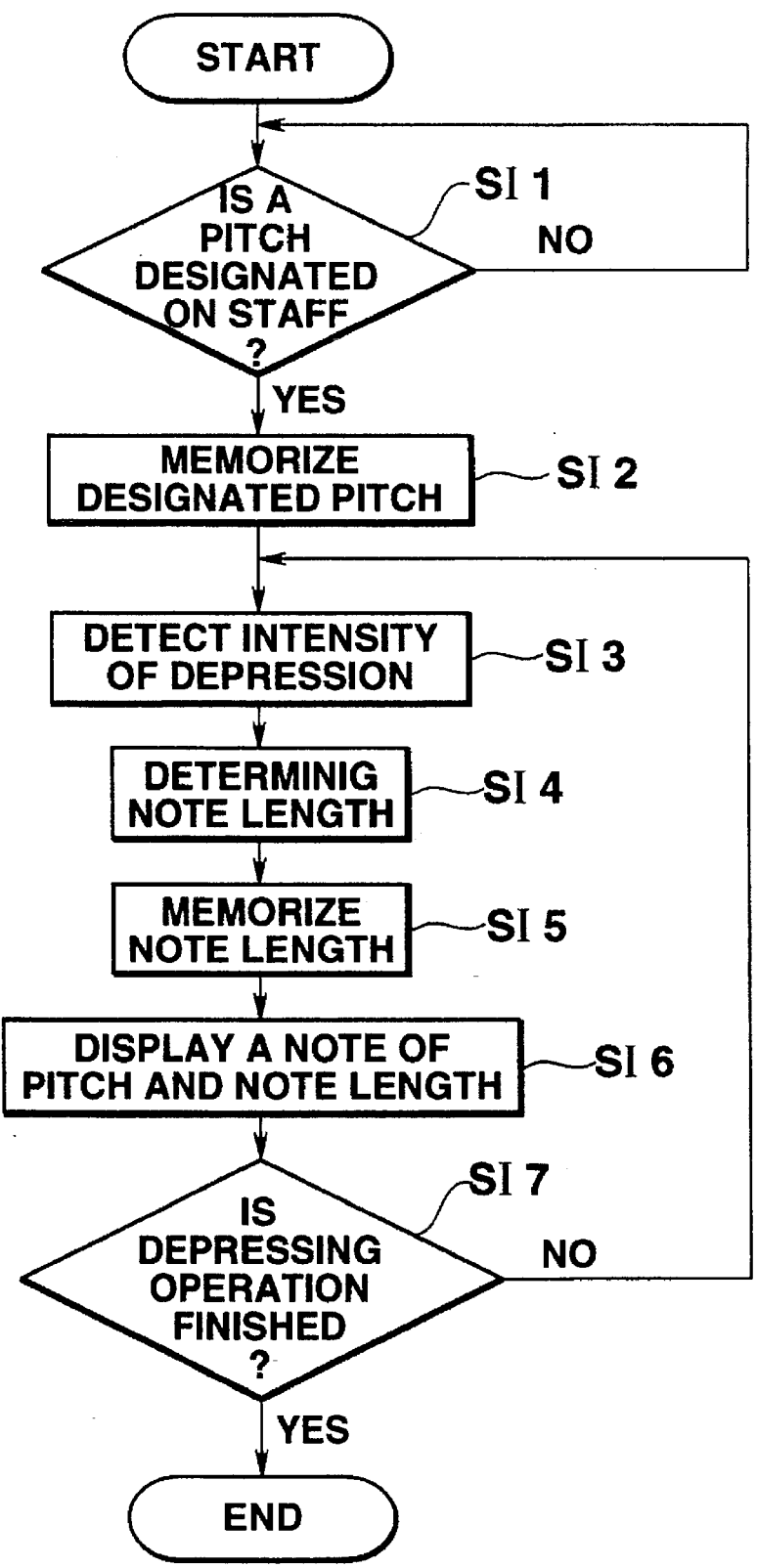
FIG. 24 is a flow chart of a musical note inputting/displaying process in a seventh embodiment of the present invention.

FIG. 24 is a flow chart of operation of a seventh embodiment of the present invention. The seventh embodiment works in accordance with the main flow chart of the first embodiment shown in FIG. 3 except for the note input-operation detecting/displaying process in step SA8. FIG. 24 is a flow chart of a note input-operation detecting/displaying process to be executed in step SA8 by the seventh embodiment. The CPU 1 judges in step SI1 whether a pitch is designated on the indicated staff. When the pitch of a note is designated, the designated note pitch is memorized in a predetermined area in the RAM 3 in step SI2. The CPU 1 detects intensity of depression applied with the pen 17 onto the touch panel 6 of the display surface 12 in step SI3, and determines a note length based on the detected intensity of depression in step SI4.

In the seventh embodiment, depression intensity o the touch panel 6 with the pen 17 and corresponding note lengths are memorized in the ROM 2. When the touch panel 6 is depressed with the pen at a depression intensity corresponding to a note length of a note to be written, the CPU 1 detects the depression intensity applied to the touch panel 6 and determines the corresponding note length. The determined note length is memorized in the RAM 3 in step SI5.

The CPU 1 displays in step SI6 a note of the pitch memorized in step SI2 and the note length memorized in step SI5, and judges in step SI7 whether the depressing operation finishes. When the depressing operation finishes, the operation goes from step SI7 to end, wherein the note indicated in step SI6 is finally decided. Then, a next note inputting operation starts. As long as the depressing operation to the touch panel 6 continues, the processes in steps SI3 and thereafter are repeatedly performed. While such depressing operation continues, a note length of an indicated note is changed every time the depression is altered. As described above, by stopping the depressing operation at the time the note of the desired note length is displayed, a desired note can be displayed.

EIGHTH EMBODIMENT

Figure 25:
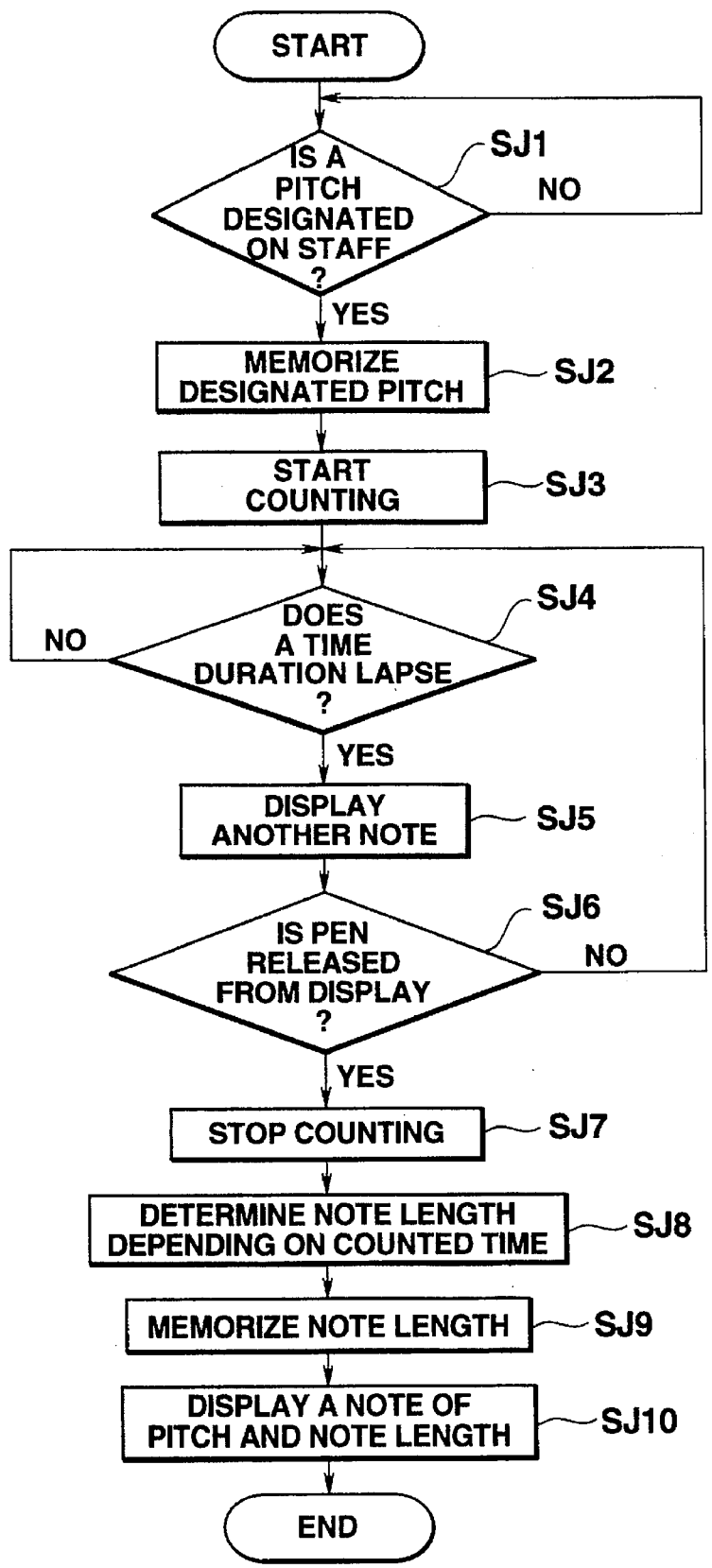
FIG. 25 is a flow chart of a musical note inputting/displaying process in an eighth embodiment of the present invention.

FIG. 25 is a flow chart of operation of an eighth embodiment of the present invention. The eighth embodiment works in accordance with the main flow chart of the first embodiment shown in FIG. 3 except for the note input-operation detecting/displaying process in step SA8. FIG. 25 is a flow chart of a note input-operation detecting/displaying process to be executed in step SA8 by the eighth embodiment. The CPU 1 of the eighth embodiment has a timer function for counting a time. The CPU 1 judges in step SJ1 whether a pitch is designated in the indicated staff. The pitch is designated by touching a position on the staff with the pointed end of the pen 17, a position which corresponds to a pitch of a note to be written in the staff. When the pitch of a note is designated, the designated pitch of a note is memorized in a predetermined area in the RAM 3 in step SJ2. The CPU 1 drives a timer in step SJ3 to start a counting operation, and judges in step SJ4 whether a predetermined time duration has lapsed.

When a predetermined time duration has lapsed, the CPU 1 changes a previously displayed note to another note in step SJ5, and judges in step SJ6 whether the pen 17 is released from the touch panel 6. When not, the processes in steps SJ4, SJ5 and SJ6 are repeatedly performed until the pen 17 is released from the touch panel 6, wherein notes having different note lengths are successively displayed on the display surface 12 in step SJ5 every time the predetermined time lapses. When the pen 17 is released from the touch panel 6 at the time a desired note is displayed on the display surface 12, and a release signal of the pen 17 is generated, the timer stops the counting operation in step SJ7.

The CPU 1 determines in step SJ8 a note length based on the time which is counted by the timer by the time the timer stops the counting operation. More specifically, in the eighth embodiment, in the ROM 2 are memorized time durations during which the pen 17 is depressed onto the touch panel 6 and corresponding note lengths. When the pen 17 is continuously depressed onto the display surface 12 at a position corresponding to a pitch of a note to be written, the CPU 1 detects a time duration during which the pen 17 is kept depressed on the touch panel 6 stacked on the display surface 12, and memorizes the detected time duration in the RAM 3 in step SJ9.

Finally, in step SJ10 a note is displayed on the display surface 12 based on the pitch memorized in step SJ2 and the note length memorized in step SJ9. As described above, in the eighth embodiment, while the pen 17 is kept depressed onto the touch panel 6, note lengths of a note displayed on the display surface 12 are successively changed. When the depressing operation stops at the time a note having a desired note length is displayed, the very note which is displayed at the time is selected.

NINTH EMBODIMENT

Figure 26:
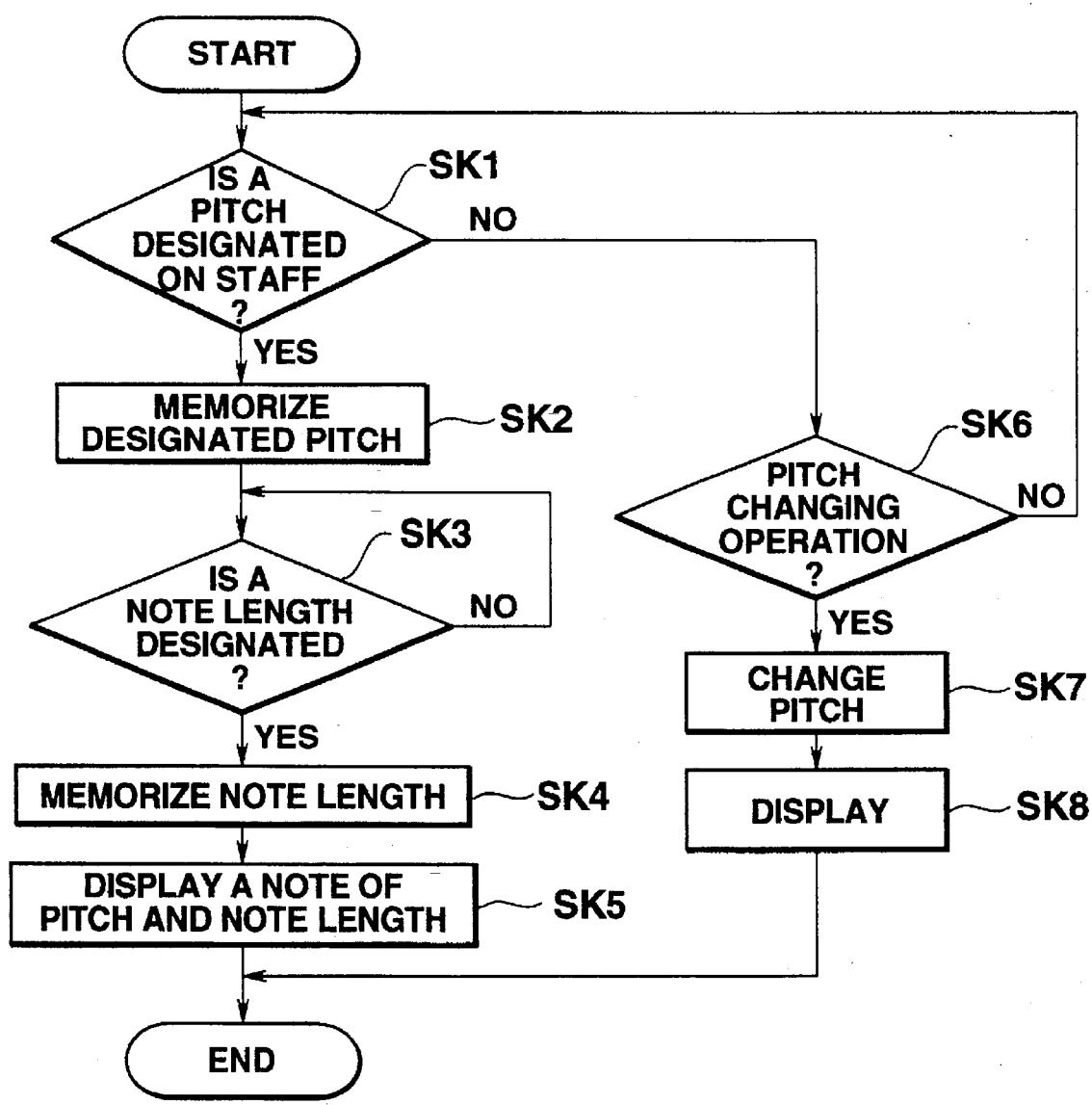
FIG. 26 is a flow chart of a musical note inputting/displaying process in a ninth embodiment of the present invention.

FIG. 26 is a flow chart of operation of a ninth embodiment of the present invention. The seventh embodiment works in accordance with the main flow chart of the first embodiment shown in FIG. 3 except for the note input-operation detecting/displaying process in step SA8. FIG. 26 is a flow chart of a note input-operation detecting/displaying process to be executed in step SA8 by the ninth embodiment. The CPU 1 judges in step SK1 whether a pitch is designated on the indicated staff. When the pitch of a note is designated, the designated note pitch is memorized in a predetermined area in the RAM 3 in step SK2. The CPU 1 judges in step SK3 whether a note length is designated. When the note length is designated, the designated note length is memorized in the RAM 3 in step SK4. A note is displayed in step SK5 based on the pitch memorized in step SK2 and the note length memorized in step SK4. When it is determined in step SK1 that the pitch is not designated in the staff, the CPU 1 judges in step SK6 whether a pitch changing operation is executed to change a pitch. When the pitch changing operation is executed, the pitch is changed in step SK7 and the changed pitch is displayed in step SK8.

Figure 27A:
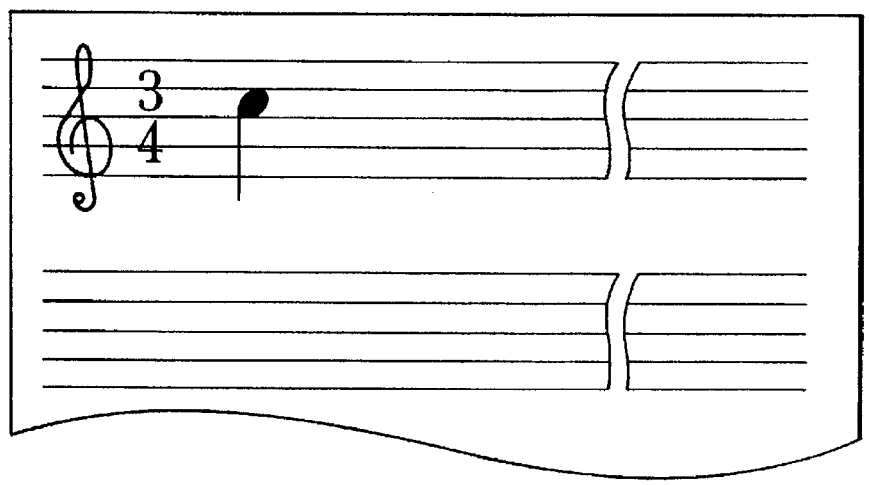
FIGS. 27A–27C are views showing pitch amending operations of in the ninth embodiment.
Figure 27B:
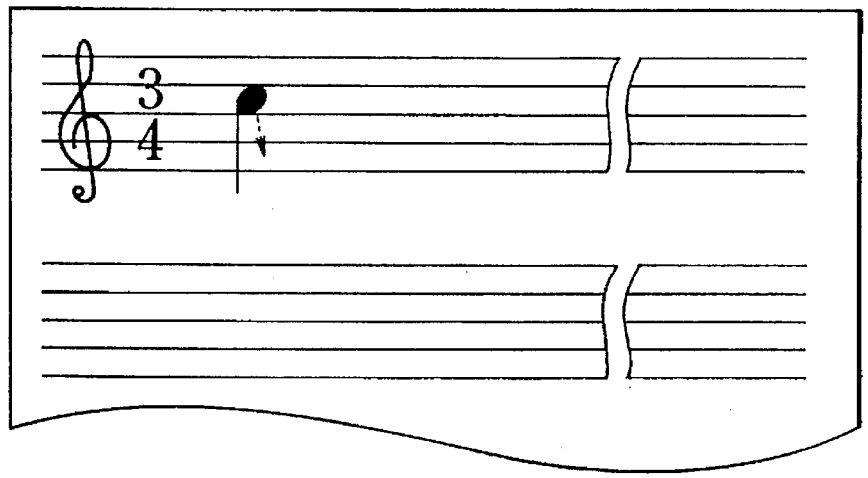
Figure 27C:
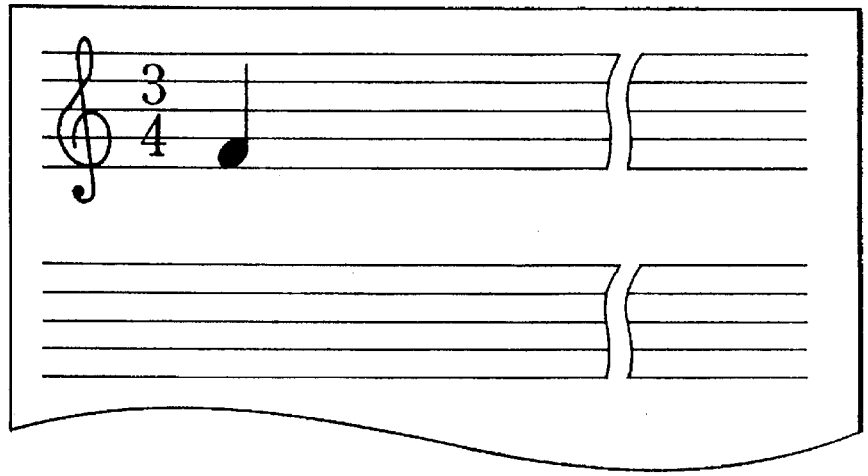

The pitch changing operation is to drag an indicated note to a desired position (a desired pitch position) on the staff displayed on the display surface 12 (FIG. 27A) by pointing the note with the pen 17 and keeping the pen 17 pointing the note while the pen 17 is moved on the display surface 12, as shown by broken lines in FIG. 27B. For example, when a quarter note of C2 is dragged to a position of F1 in the staff with the pen 17, the quarter note is moved and indicated at the position of F1 in the staff as shown in FIG. 27C. That is, a pitch of the indicated note is changed by the pitch changing operation.

Figure 28A:
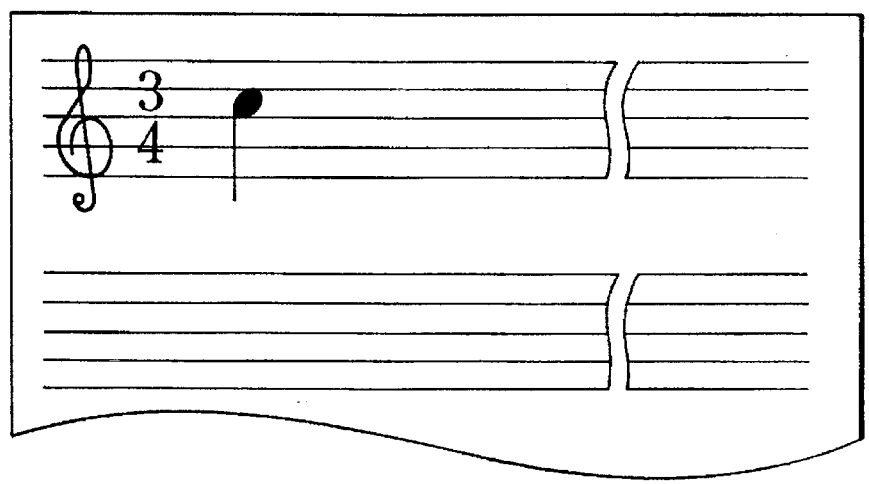
FIGS. 28A–28C are views showing another pitch amending operations of in the ninth embodiment.
Figure 28B:
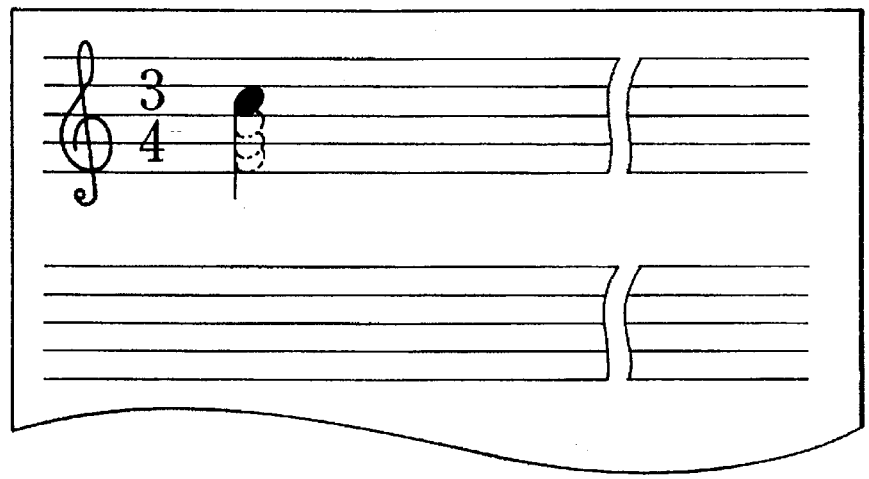
Figure 28C:
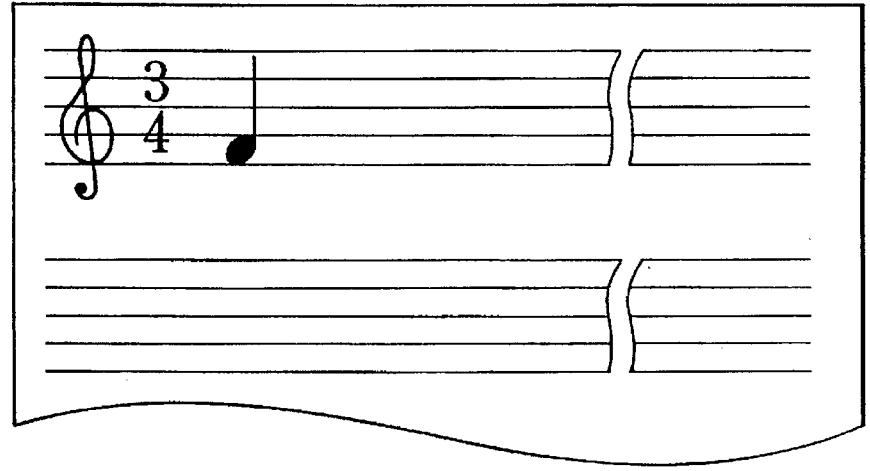

FIGS. 28A–28C are views showing another example of the pitch changing operation in the ninth embodiment. A round portion of a note indicated in the staff of FIG. 8A with the pen 17, and thereafter rounds are successively written at desired pitch positions in the staff with the pen 17 as shown by broken lines in FIG. 28B. In this way, the note, i.e., a quarter note of F1 in this example, is finally indicated at the pitch position where the round is written in last, as shown in FIG. 28C.

When either pitch changing operation described with reference to FIGS. 27A–27C or FIGS. 28A–28C is performed, it is determined in step SK6 that the pitch changing operation has been executed. Therefore, the user can change a note pitch by performing one of the above pitch changing operations, whichever is easier in operation.

TENTH EMBODIMENT

Now, a tenth embodiment will be described. A circuit structure and an external view are substantially the same as the first embodiment shown in FIGS. 1 and 2. In response to ON-operation of the switch 13, the CPU 1 starts performing processes in accordance with a main flow chart of FIG. 29. In step SL1, the CPU 1 reads out image data of a staff from the ROM 2, and controls the LCD controller 4 to display a staff on the LCD unit 4. As a result, the staff is indicated on the display surface 12 is step SL1.

The CPU 1 judges in step SL2 whether a clef inputting operation is executed. The clef inputting operation is executed to write a circle on the indicated staff with the pen 17. When a circle is written on the indicated staff with the pen 17, the touch panel 6 detects a touch of the pen 17, generating a touch signal. The touch signal is supplied to the CPU 1 through the I/O port 7. Upon receipt of the touch signal, the CPU 1 determines that the clef inputting operation has been executed, and reads out image data of a clef from the ROM 2. Further, the CPU 1 controls in step SL3 the LCD controller 4 to display a clef at a position where the circle is written on the staff indicated on the display surface 12.

Figure 32A:
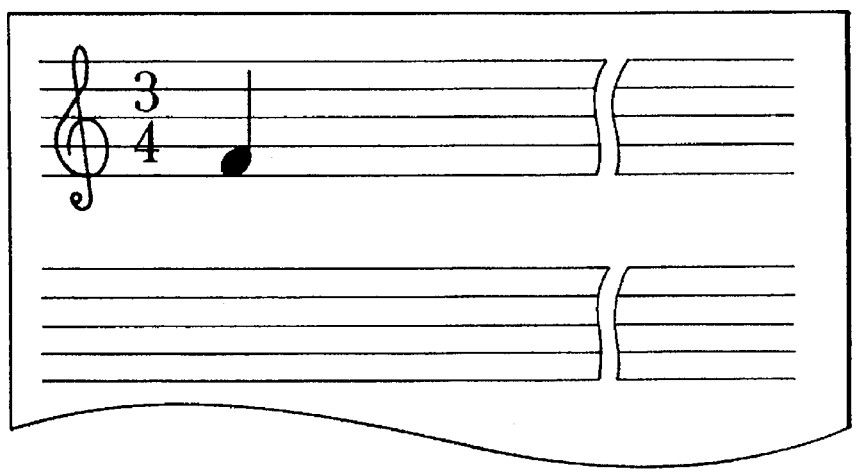
FIGS. 32A–32C are views showing transitional indications in the process 1 of the tenth embodiment.

In step SL4, the CPU 1 judges whether a time inputting operation is executed. The time inputting operation is executed to write a fraction (a numerator, a denominator) representing a time on the indicated staff with the pen 17. More specifically, when for example, the time is ¾, a numeral "4" is written and a numeral "3" is written over the "4". When the time or a fraction is written on the indicated staff with the pen 17, the touch panel 6 detects a touch of the pen 17, generating a touch signal. The touch signal is supplied to the CPU 1 through the I/O port 7. Upon receipt of the touch signal, the CPU 1 recognizes two numerals based on the numeral data memorized in the ROM 2, and determines that the time inputting operation has been executed. Further, the CPU 1 reads out image data corresponding to the recognized numerals from the ROM 2, controls in step SL5 the LCD controller 4 to display a time signature of "¾" on the staff indicated on the display surface 12, as shown in FIG. 32A.

Figure 29:
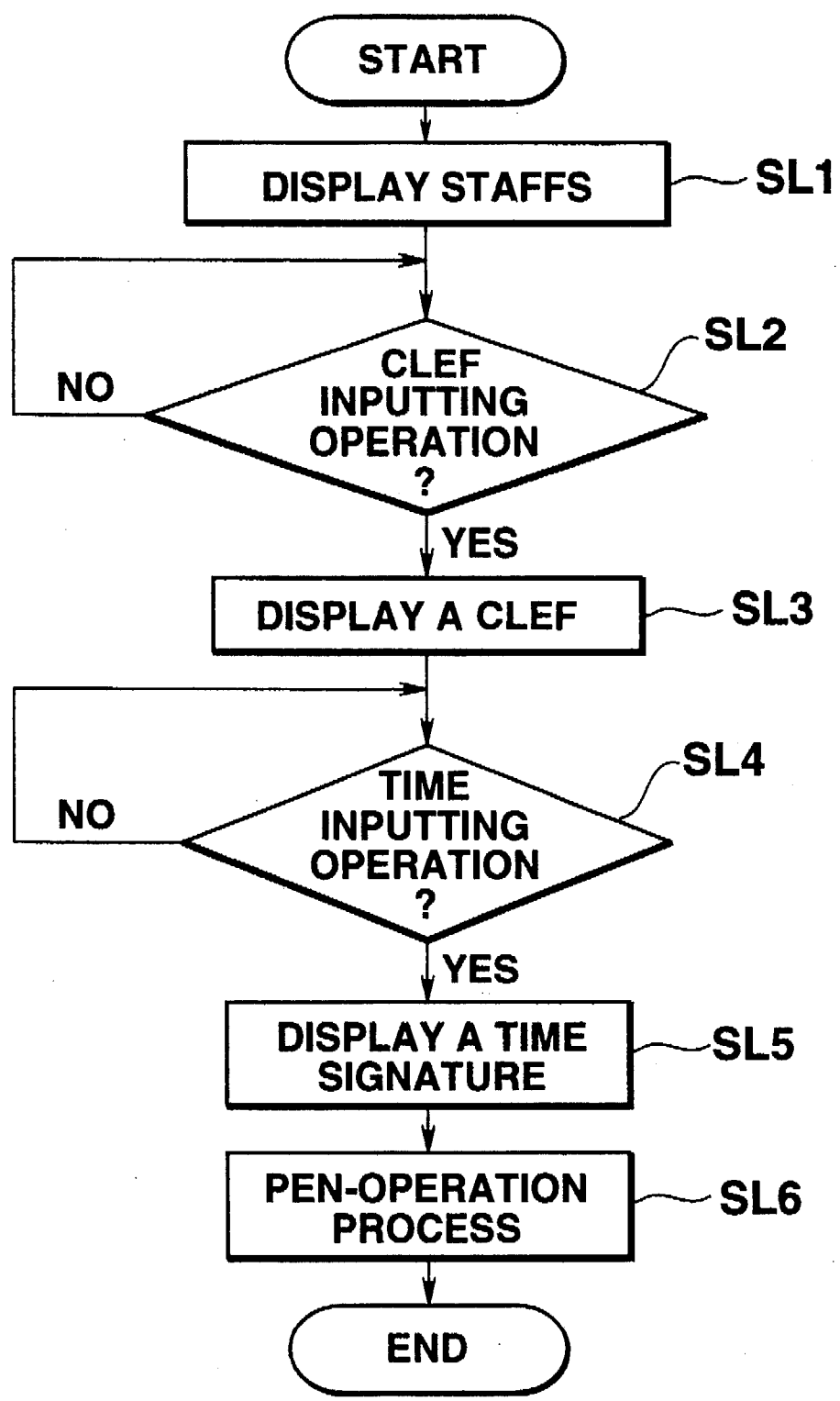
FIG. 29 is a main flow chart of an operation in a tenth embodiment of the present invention.

After executing the processes in steps SL1 to SL5 of FIG. 29, the CPU 1 performs a pen-operation process in step SL6. The pen-operation process of step SL6 is performed in accordance with a flow chart of FIG. 30. In step SM1, the CPU 1 judges what pen operation is performed. That is, the CPU 1 judges in step SM1 which pen operation is performed, a finishing operation, an editing operation or a note inputting operation. The note inputting operation is executed to write in a note on the indicated staff with the pen 17 or is executed to designate a pitch on the staff and then to a note length by inputting a numeral.

When the note inputting operation is executed, a touch signal of the pen 17 is supplied from the touch panel 6 to the CPU 1 through the I/O port 7. The CPU 1 determines it based on the supplied touch signal that the note inputting operation has been performed, and displays an input note in step SM2. Further, the CPU 1 judges in step SM3 whether all the notes to be written in one measure at the designated time have been input. If not, the CPU 1 repeatedly executes a loop process (the processes in steps SM2, SM3) until all the notes to be written in one measure are input. Therefore, input notes are successively displayed every time the note inputting operation is performed on the staff in step SM3. When all the notes to be written in one measure have been input, a bar is automatically drawn next to the last written note in the measure in step SM4.

Further, the CPU 1 judges in step SM5 whether all the notes to be written in one staff have been input. If not, the CPU 1 repeatedly executes a loop process (the processes in steps SM2 to SM5) until all the notes to be written in one staff are input. Therefore, input notes are successively displayed, and when all the notes to be written in one measure have been input, a bar is automatically drawn. When all the notes to be written in one staff have been input, the operation goes from step SM5 to step SM6, where the CPU 1 judges whether a music-completion operation is executed.

The music-completion operation is executed to draw a bar to the lef side and in parallel with the last drawn bar with the pen 17. When the music-completion operation is not yet executed, a next clef and a key signature are automatically indicated in step SM8 and then the processes in steps SM2 to SM6 are executed repeatedly. Therefore, a loop process (processes in steps SM2 to SM8) is repeatedly executed until the music completion operation is executed. While the loop process is repeatedly executed, input notes are successively indicated and bars are indicated when all the notes to be written in one measure are input. Further when all the notes to be written in one staff are input, a next staff is selected and a clef and a time signature are automatically indicated. When the music-completion operation is executed, the operation goes from step SM6 to step SM7, where a cadence bar is indicated.

When it is judged in step SM1 that the editing operation is executed, the operation advances from step SM1 to step SM9. The editing operation is performed to write numerals, to write parentheses ("[]") to define a range, to write a symbol, or to write a character, on the display surface 12 with the pen 17. In step SM9, it is judged what is to be written by the editing operation, and any one of the processes 1–4 (in steps SM10–SM13) is performed depending on the result of the judgement of step SM9.

Figure 31:
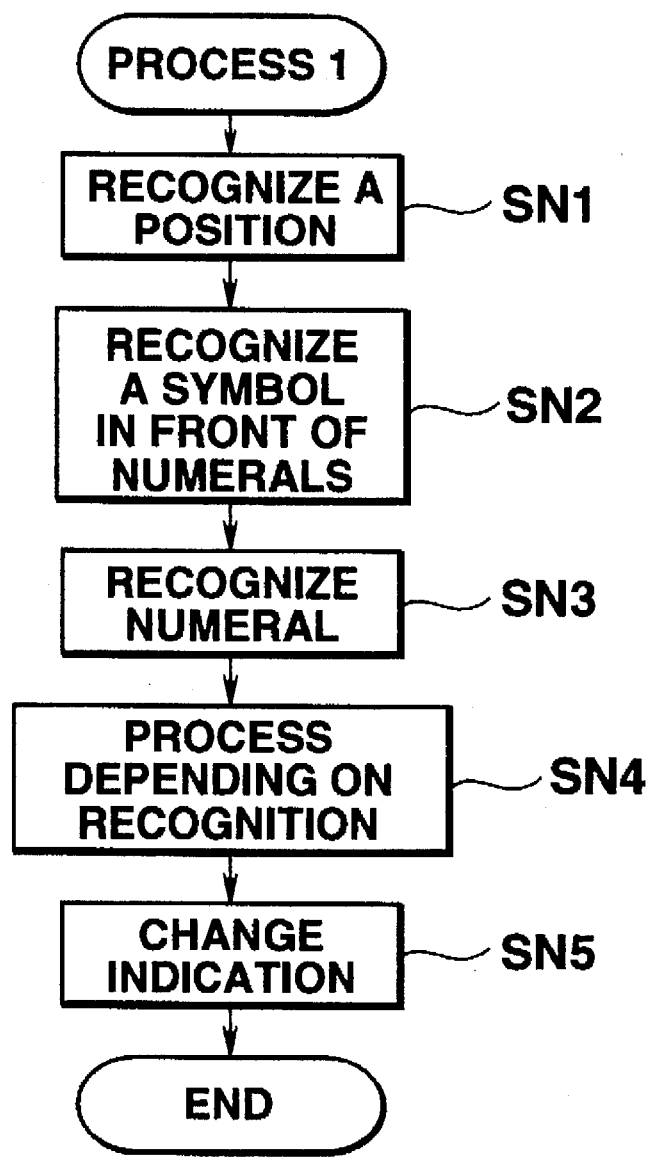
FIG. 31 is a flow chart of a process 1 in the tenth embodiment of the present invention.

When the editing operation is performed to write numerals, the process 1 is executed to write the numerals in step SM10 in accordance with a flow chart of FIG. 31. In step SN1 of FIG. 31, the CPU 1 recognizes a position where a numeral is written in the indicated staff. Further, the CPU 1 recognizes a symbol in front of numerals in step SN2 and numerals in step SN3. Then, recognizing the position, symbol and numerals, the CPU 1 performs a pertinent process to generate display data. Further, in step SN5, the CPU 1 changes the indication based on the generated display data.

Figure 32B:
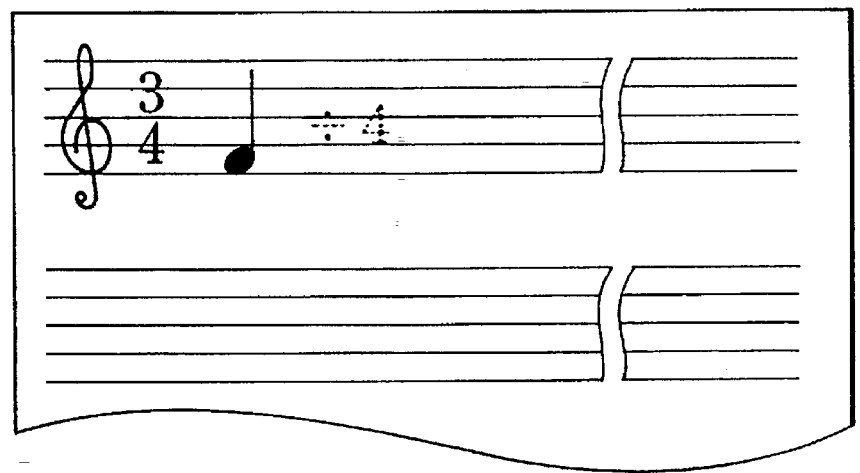
Figure 32C:
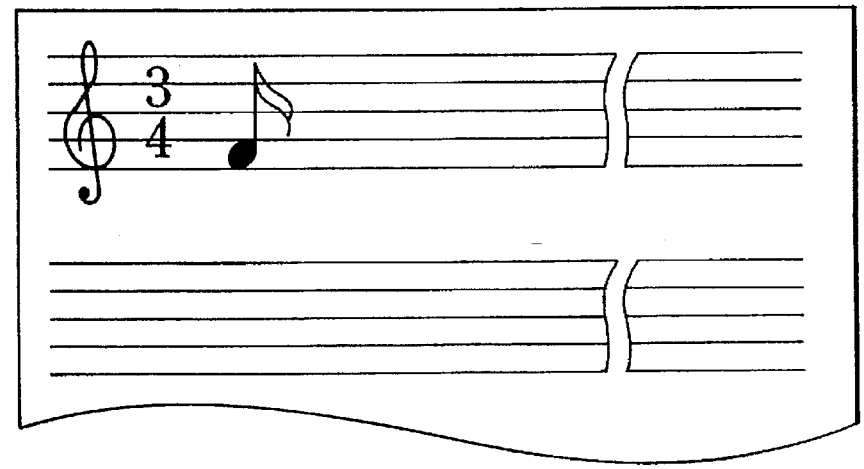

The process 1 mentioned above will be described more specifically. Now, we assume that a quarter note of F1 is indicated as shown in FIG. 32A. When "÷4" are written next to the quarter note of F4 with the pen 17 as shown by broken lines in FIG. 32B, the position where the numeral "4" is written is recognized in step SN1, i.e., it is recognized in step SN1 that the numeral "4" is written next to the quarter note of F4. Then, the CPU 1 recognizes in step SN2 that a symbol "÷" is written in front of the numeral "4", and further recognizes in step SN3 that the numeral "4" is written. In the following step SN4, the quarter note of F4 is divided by "4" based on the recognized results (steps SN1 to SN3), and thereby a sixteenth note of F4 is obtained. In step SN5, the CPU 1 changes the indication based on the obtained sixteenth note, that is, the quarter note of F4 is eliminated from the display surface 12 and the newly obtained sixteenth note of F4 is indicated thereon, as shown in FIG. 32C.

Figure 33A:
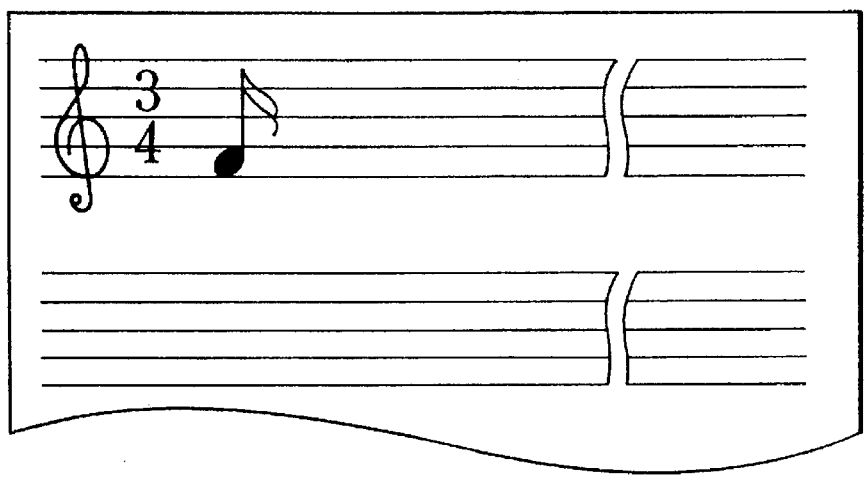
FIGS. 33A–33C are views showing another transitional indication in the process 1 of the tenth embodiment.
Figure 33B:
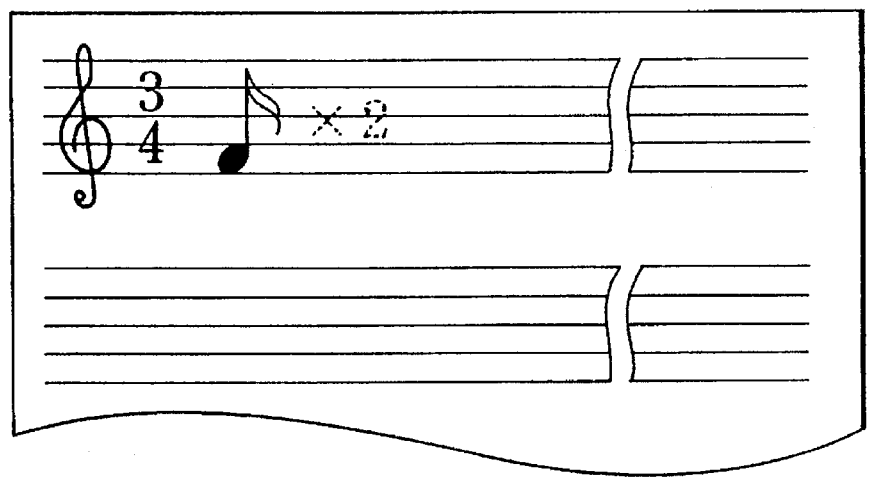
Figure 33C:
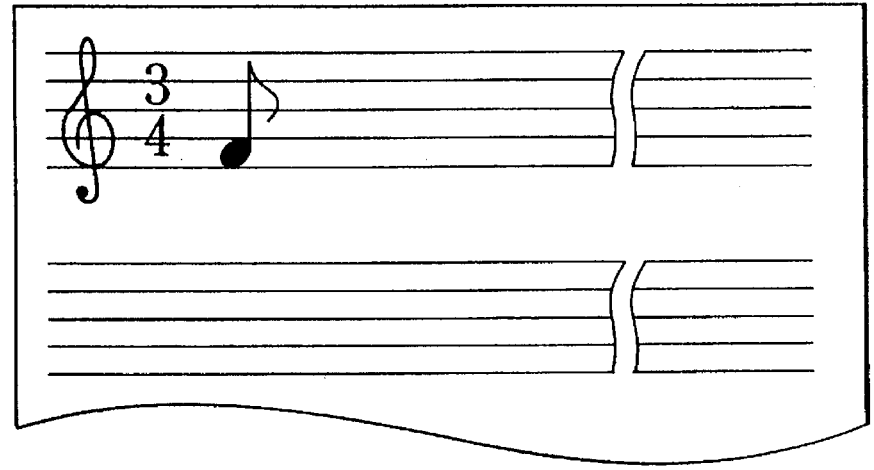

Meanwhile, when, as shown by broken lines in FIG. 33B, "X 2" are written next to the sixteenth note of F4 shown in FIG. 33A with the pen 17, it is recognized in step SN1 the position where the numeral "2" is written, i.e., it is recognized that the numeral "2" is written next to the sixteenth note of F4. Then, the CPU 1 recognizes in step SN2 that a symbol "x" is written in front of the numeral "2", and further recognizes in step SN3 that the numeral "2" is written. In the following step SN4, the sixteenth note of F4 is multiplied by "2" based on the recognized results (steps SN1 to SN3), and thereby an eighth note of F4 is obtained. In step SN5, the CPU 1 changes the indication based on the obtained eighth note, that is, the sixteenth note of F4 is eliminated from the display surface 12 and the newly obtained eighth note of F4 is indicated thereon, as shown in FIG. 33C.

Figure 34A:
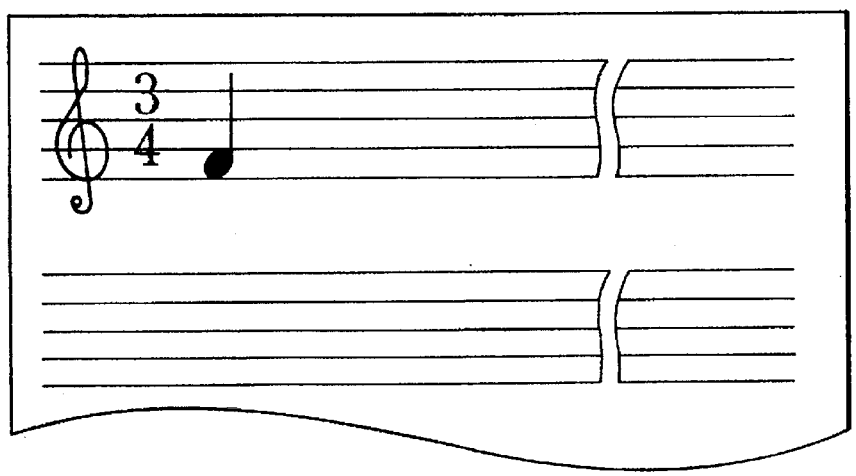
FIGS. 34A–34C are views showing still another transitional indication in the process 1 of the tenth embodiment.
Figure 34B:
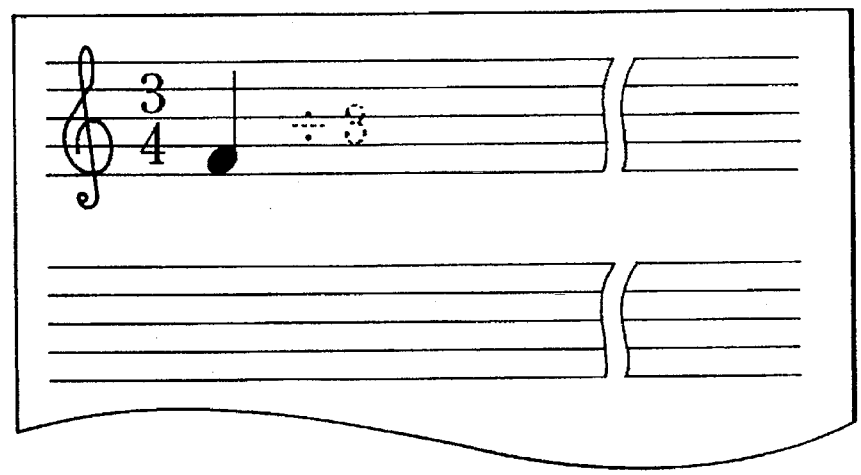
Figure 34C:
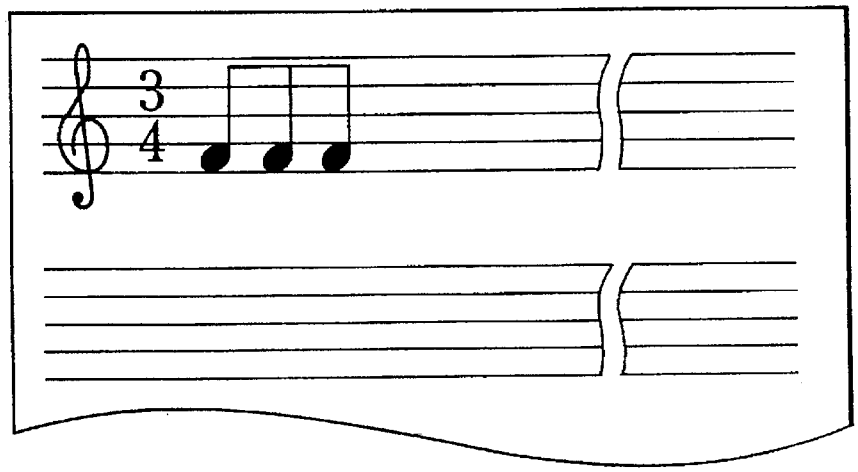

Further, when, as shown by broken lines in FIG. 34B, "÷3" are written next to the quarter note of F4 shown in FIG. 34A with the pen 17, it is recognized in step SN1 the position where the numeral "3" is written, i.e., it is recognized that the numeral "3" is written next to the quarter note of F4. Then, the CPU 1 recognizes in step SN2 that a symbol "÷" is written in front of the numeral "3", and further recognizes in step SN3 that the numeral "3" is written. In the following step SN4, the quarter note of F4 is divided by "3" based on the recognized results (steps SN1 to SN3), and thereby a triplet of F4 is obtained. In step SN5, the CPU 1 changes the indication based on the obtained triplet, that is, the quarter note of F4 is eliminated from the display surface 12 and the newly obtained triplet of F4 is indicated thereon, as shown in FIG. 34C.

Figure 35:
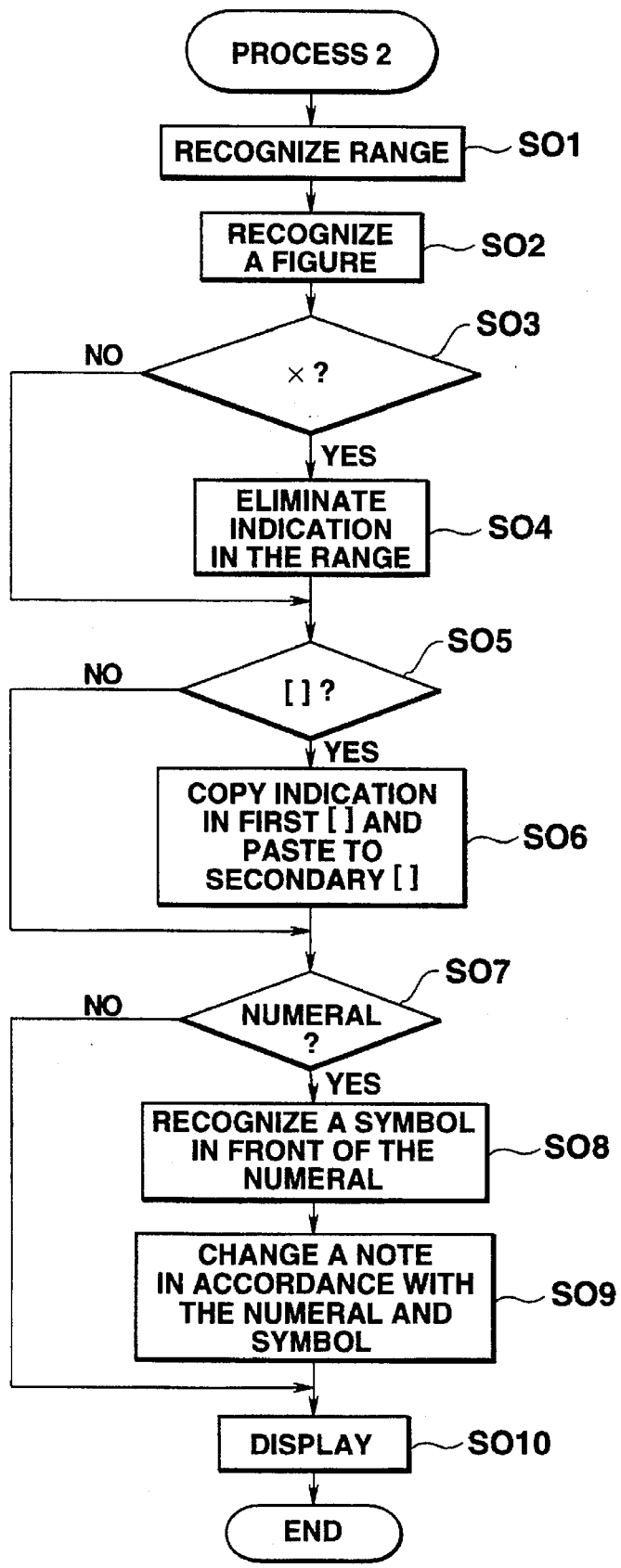
FIG. 35 is a flow chart of a process 2 in the tenth embodiment of the present invention.

When the editing operation is performed to write parentheses, the process 2 is executed to write the parentheses in step SM11 in accordance with a flow chart of FIG. 35. In step SO1 of FIG. 35, the CPU 1 recognizes a range defined by the parentheses ("[]") on the indicated staff. Then, the CPU 1 recognizes a drawn figure in step SO2 to judge whether the figure is "X". When the figure is "X", the indication falling in the range defined by the parentheses ("[]") is eliminated in step SO4. When the drawn figure is not "X", the CPU 1 judges in step SO5 whether the figure is "[]". When the figure is "[]", the indication in the range defined by the first "[]" is copied and is pasted to a position defined by the secondary "[]" in step SO6.

That is, in the case of "YES" in step SO5, the parentheses "[]" have been written twice: the first one is the parentheses ("[]") recognized in step SO1 and the secondary is the figure ("[]") recognized in step SO5. In this case, notes falling in the range defined by the first parentheses "[]" are copied and pasted to a position defined by the secondary parentheses "[]". In the case of "NO" in step SO5 (when the figure is not "[]"), it is judged in step SO7 whether the figure is a numeral. When the figure is a numeral, the CPU 1 recognizes a symbol in front of numeral in step SO8. Then, the notes in the range defined by the first "[]" are changed in accordance with the recognized numeral and symbol in step SO9. In step SO10 are displayed the results obtained in the processes which are performed in steps SO4, SO6 and SO9 respectively.

Figure 36A:
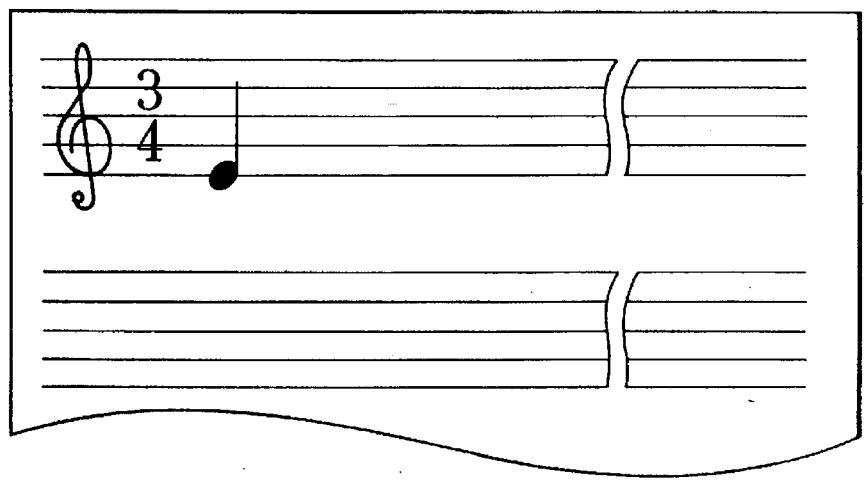
FIGS. 36A–36C are views showing transitional indications in the process 2 of the tenth embodiment.
Figure 36B:
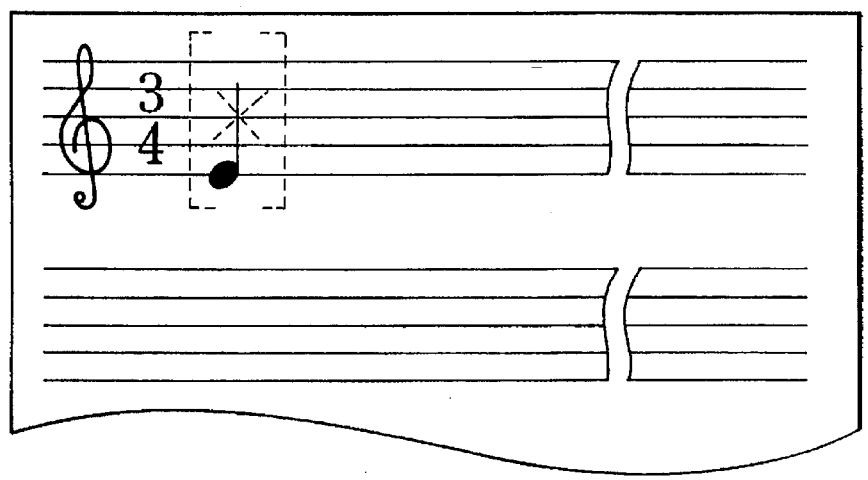
Figure 36C:
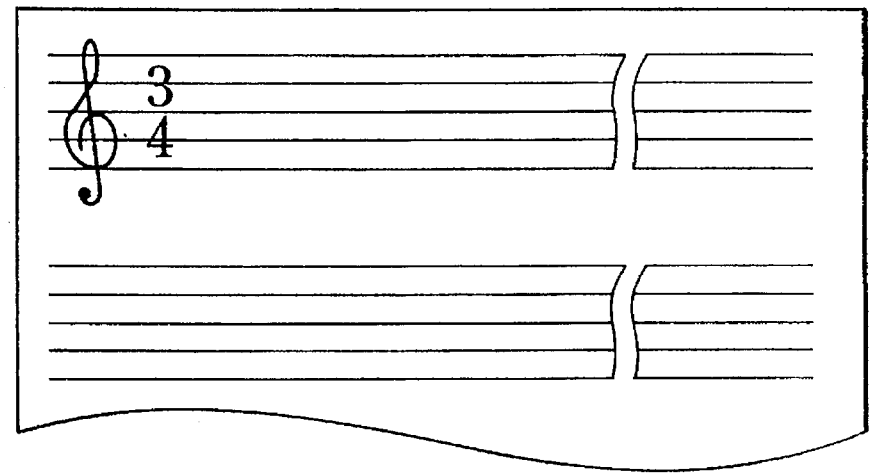

The process 2 mentioned above will be described more specifically. Now we assume that a quarter note of E1 is indicated as shown in FIG. 36A. When the quarter note is defined by parentheses "[]" as shown by broken lines in FIG. 36B, the CPU 1 recognizes the range defined by the parentheses in step SO1. When a symbol of "X" is written in the range, the CPU 1 recognizes the symbol of "X" in steps SO2 and SO3. Then, the note in the range defined by the parentheses is eliminated in step SO4, as shown in FIG. 36C (from which the quarter note of E1 disappears).

Figure 37A:
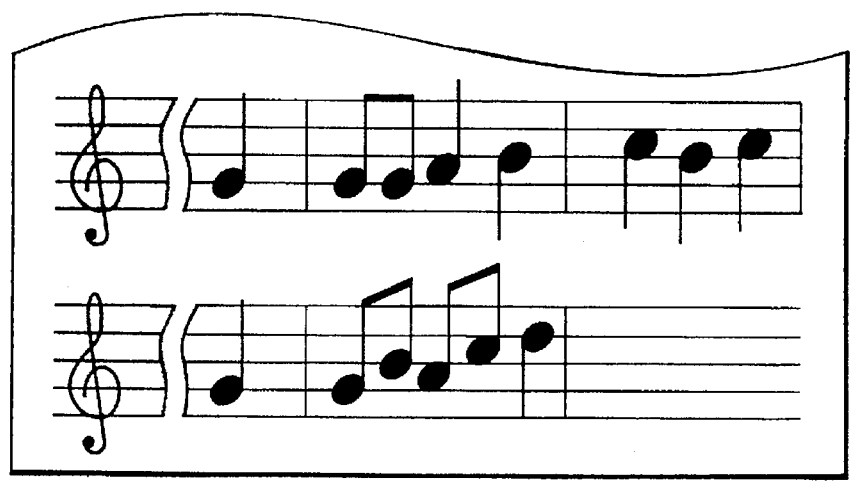
FIGS. 37A–37C are views showing another transitional indication in the process 2 of the tenth embodiment.
Figure 37B:
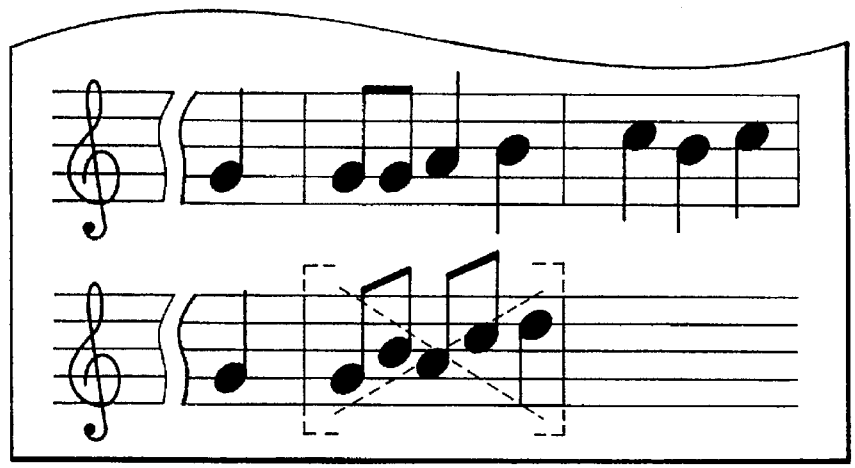
Figure 37C:

When notes are indicated over several measures and plural staffs as shown in FIG. 37A, and when notes in the last measure are defined by parentheses "[]" as shown by broken lines in FIG. 37B, the CPU 1 recognizes the range of one measure defined by the parentheses in step SO1. When a symbol of "X" is written in the range defined by the parentheses, the CPU 1 recognizes the symbol of "X" in steps SO2 and SO3. Then, the notes in the range defined by the parentheses are eliminated in step SO4, as shown in FIG. 37C (from which the notes of one measure disappear).

Figure 38A:
FIGS. 38A–38C are views showing still another transitional indication in the process 2 of the tenth embodiment.
Figure 38B:
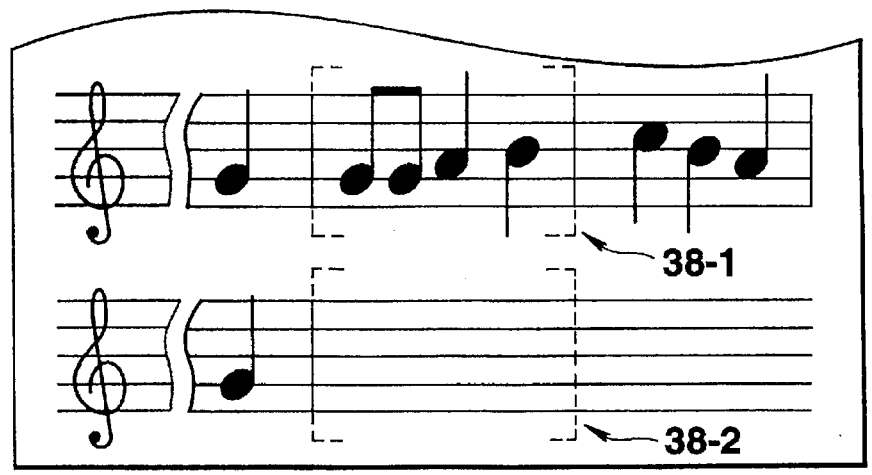
Figure 38C:
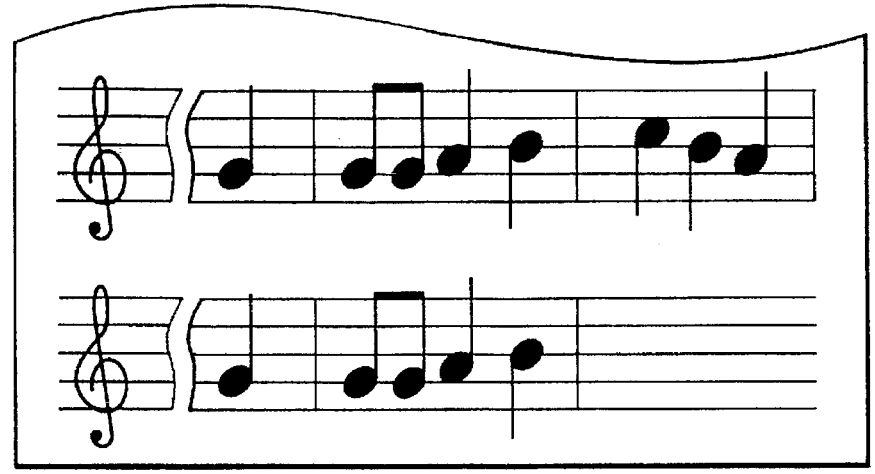

When notes are indicated over several measures and plural staffs as shown in FIG. 38A, and when notes in a measure in the upper staff are defined by first parentheses "[]" 38-1 as shown by broken lines in FIG. 38B, the CPU 1 recognizes the range of one measure defined by the first parentheses 38-1 in step SO1. When a symbol of "X" is not written in the defined range and another range is defined in the lower staff by secondary parentheses 38-2 as shown in FIG. 38B, the CPU 1 recognizes the secondary parentheses 38-2 in steps SO2 and SO5. Then, two eighth notes of G4, a quarter note of A4 and a quarter note of B4 in the range defined by the first parentheses 38-1 are copied and pasted in the range defined by the secondary parentheses 38-2 in step SO6, as shown in FIG. 38C (in which two eighth notes of G4, a quarter note of A4 and a quarter note of B4 are indicated).

Figure 39A:
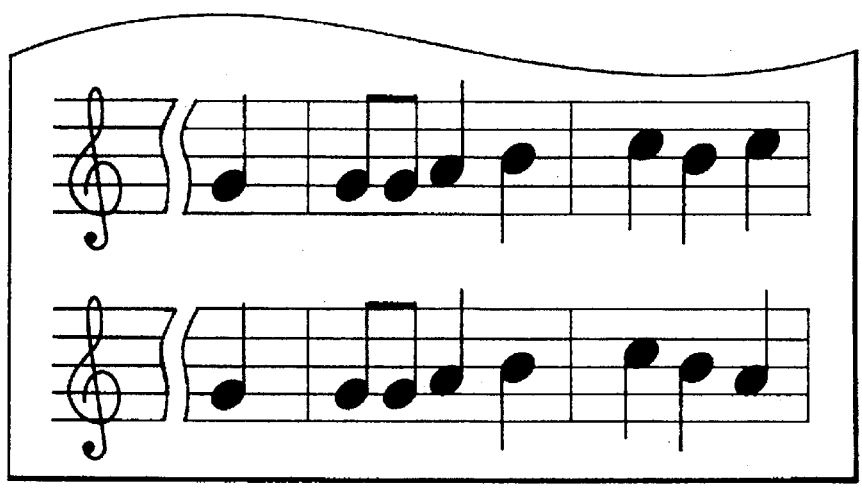
FIGS. 39A–39C are views showing yet another transitional indication in the process 2 of the tenth embodiment.
Figure 39B:
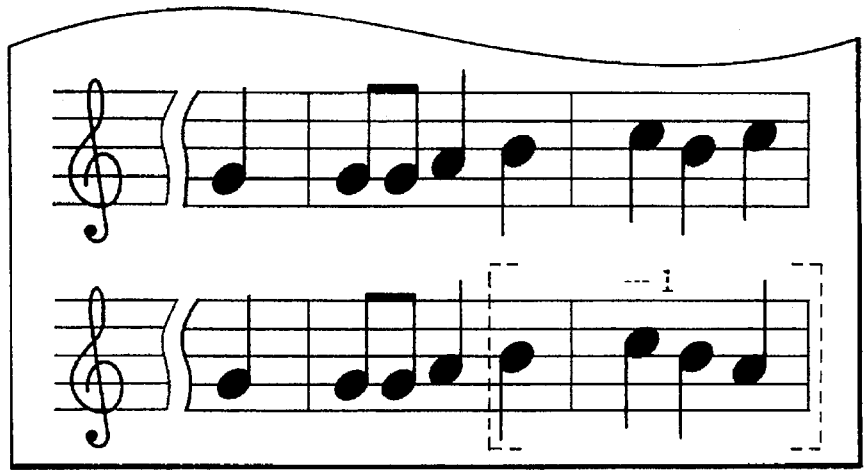
Figure 39C:

When notes are indicated over several measures and plural staffs as shown in FIG. 39A, and when quarter notes of B4, C5, B4 and A4 in the lower staff are defined by parentheses as shown by broken lines in FIG. 39B, the CPU 1 recognizes the range defined by the parentheses in step SO1. When "−1" are written in the defined range as shown in FIG. 39B (in this case neither "X" nor "[]" is written), the CPU 1 recognizes the numeral in steps SO2 and SO7, and further recognizes "−" in step SO8. The notes are changed in accordance with the recognized numeral and symbol ("−1") in step SO9.

More specifically, when the symbol "−" is recognized in step SO8, the notes within the range defined by the parentheses are changed in pitches in step SO9 depending on the numeral recognized in step SO7. In this case, quarter notes of B4, C5, B4 and A4 are lowered by one degree, thereby these notes are changed to quarter notes of A4, B4, A4 and G4. As shown in FIG. 39A, quarter notes of A4, B4, A4 and G4 are indicated in place of quarter notes of B4, C5, B4 and A4, respectively. When the symbol is "+", the pitches of the notes are made higher depending on the recognized numeral.

Figure 40:
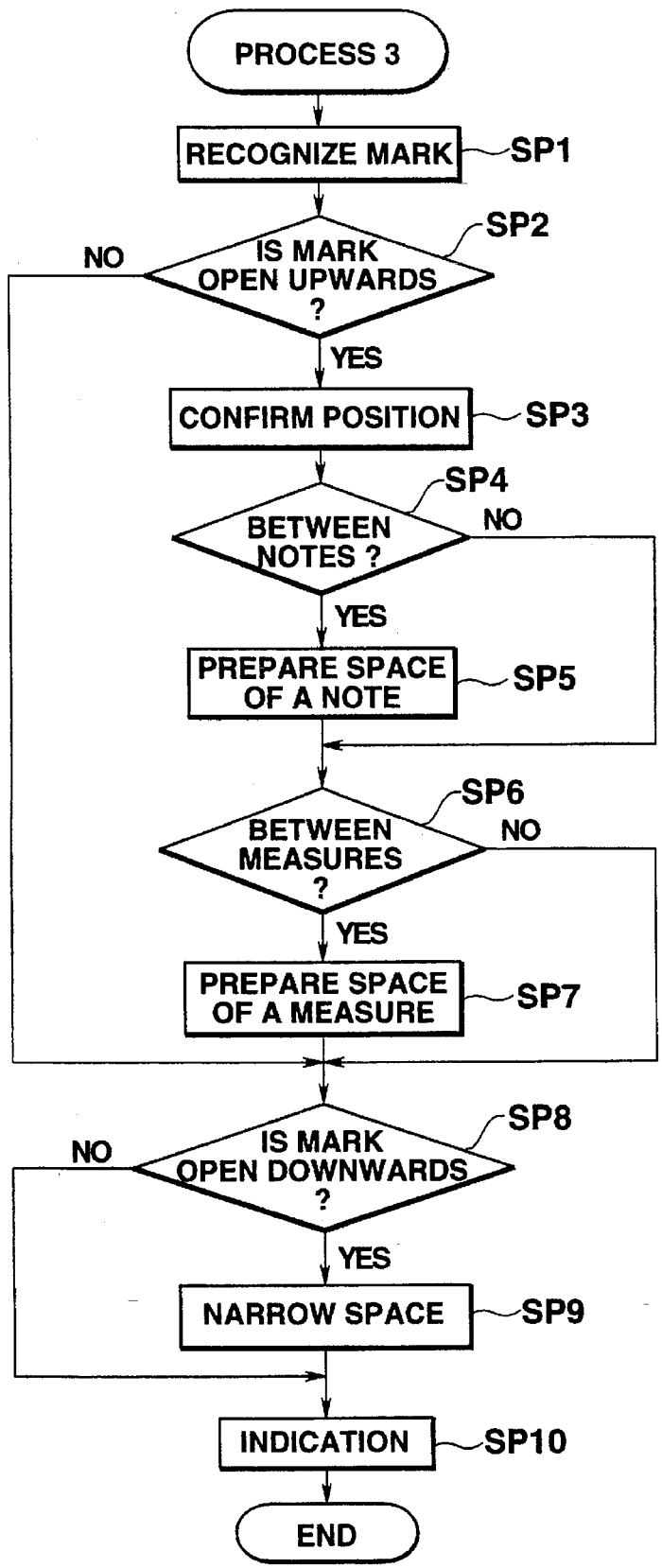
FIG. 40 is a flow chart of a process 3 in the tenth embodiment of the present invention.

When the editing operation is performed to write a symbol, the process 3 is executed to write the symbol in step SM12 in accordance with a flow chart of FIG. 40. In step SP1 of FIG. 40, the CPU 1 recognizes a figure (a mark) written in the indicated staff. Then, the CPU 1 judges in step SP2 whether the mark is open upwards. When "YES", the CPU 1 confirms in step SP3 the position where the mark is written in the staff. Then, the CPU 1 judges in step SP4 whether the mark is written between notes. When the mark is written between notes, a space where one note is to be inserted is prepared between these notes in step SP5. When the mark is not written between notes, the CPU 1 judges step SP6 whether the mark is written between measures. When the mark is written between measures, a space in which a measure is to be inserted in the staff is prepared in step SP7. Meanwhile, the mark is not open upwards, the CPU 1 judges in step SP8 whether the mark is open downwards. When the mark is open downwards, a process is executed to narrow a space in step SP9. In the following step SP10 are displayed the results obtained in the processes which are performed in steps SP5, SP7 and SP9 respectively.

Figure 41A:
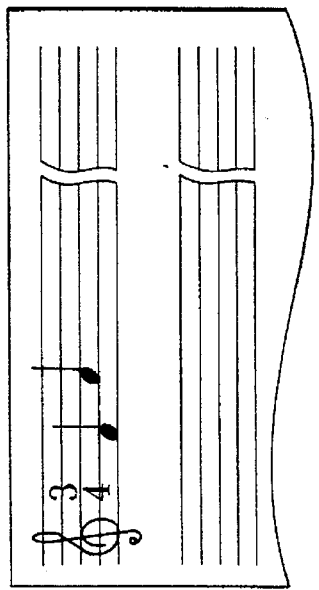
FIGS. 41A–41F are views showing transitional indications in the process 3 of the tenth embodiment.
Figure 41B:
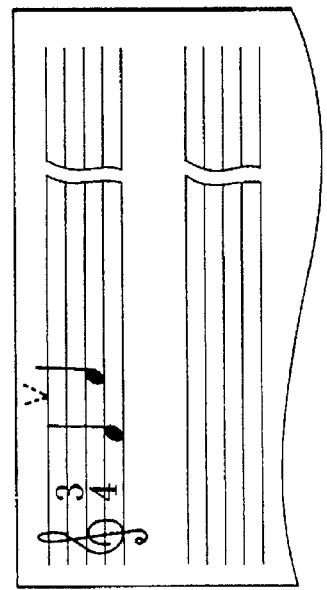
Figure 41C:
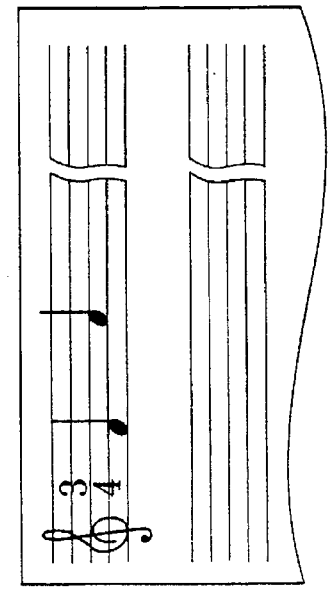
Figure 41D:
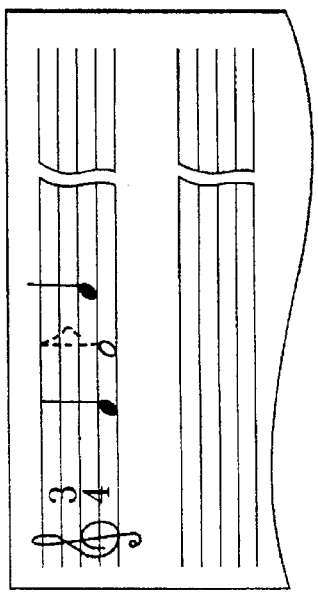
Figure 41E:
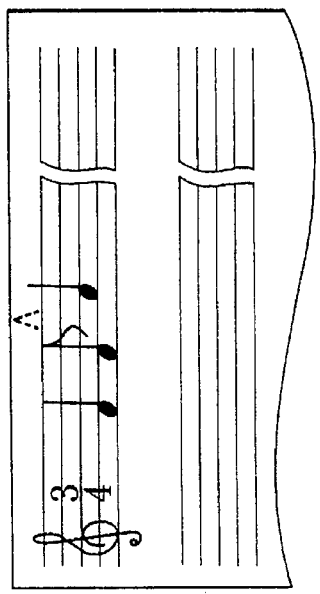
Figure 41F:
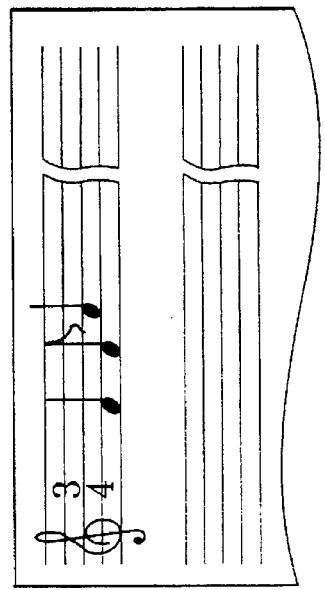

The process 3 mentioned above will be described more specifically. Now, we assume that a quarter note of F4 and a quarter note of A4 are indicated on the display surface 12 as shown in FIG. 41A. When a mark "V" is written between the quarter notes as shown by broken lines in FIG. 41B, the CPU 1 recognizes the mark in step SP1. Further, the CPU 1 recognizes in step SP2 that the mark "V" is open upwards and further recognizes in step SP4 that the mark is written between the quarter notes. A space where a note is to be inserted is prepared in step SP5. When the indication process of step SP10 is executed after the process of step SP5, the indication with the space prepared between the two quarter notes is displayed as illustrated in FIG. 41C. When a mark "∧" is written between the quarter note of F1 and the quarter note of A4 as shown by broken lines in FIG. 41E, the CPU 1 recognizes the mark in step SP1. Further, the CPU 1 recognizes in step SP2 that the mark "∧" is open downwards and narrows the space between the two quarter notes in step SP9. An indication in which the space between the quarter note of F4 and the quarter note of A4 is narrowed in illustrated as shown in FIG. 41F.

Figure 42A:
FIGS. 42A–42C are views showing another transitional indication in the process 3 of the tenth embodiment.
Figure 42B:
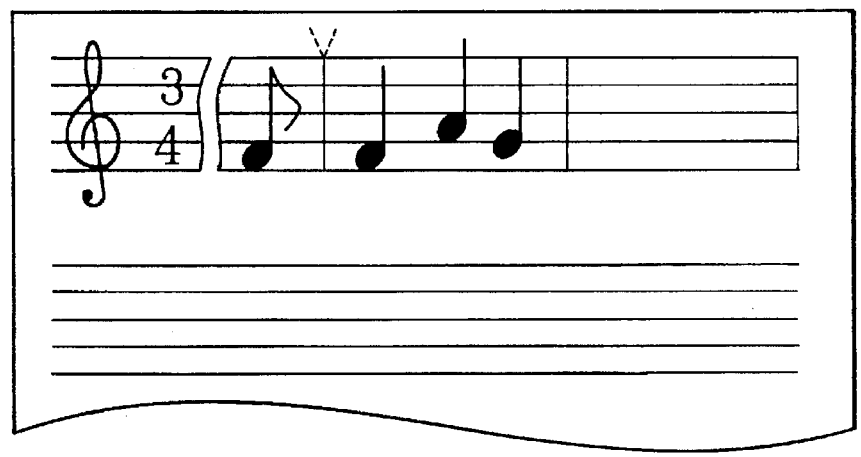
Figure 42C:

Now, we assume that notes are indicated over plural measures as shown in FIG. 42A. When a mark "V" is written between two measures as shown by broken lines in FIG. 42B, the CPU 1 recognizes the mark in step SP1. Further, the CPU 1 recognizes in step SP2 that the mark "V" is open upwards and further recognizes in step SP4 that the mark is written between the two measures. A space of one measure is prepared in step SP7. When the indication process of step SP10 is executed after the process of step SP7, the indication with an empty space of one measure is displayed as illustrated in FIG. 42C.

Figure 43A:
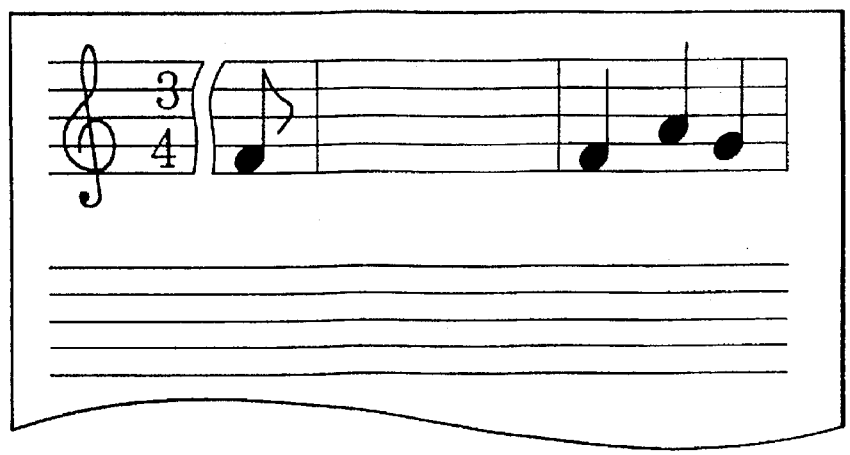
FIGS. 43A–43C are views showing still another transitional indication in the process 3 of the tenth embodiment.
Figure 43B:
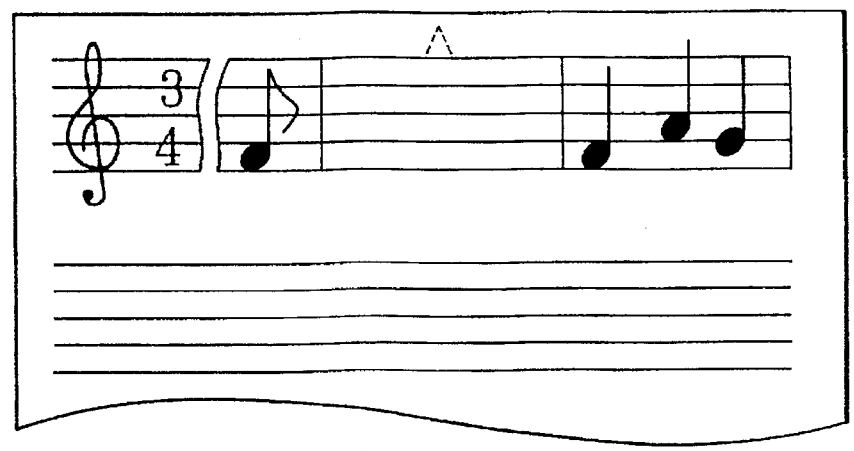
Figure 43C:

We assume that there is an empty space of one measure between two measures as shown in FIG. 43A. When a mark "∧" is written over the empty space as shown by broken lines in FIG. 43B, the CPU 1 recognizes the mark in step SP1. Further, the CPU 1 recognizes in step SP2 that the mark "∧" is open downwards and removes the empty space therefrom in step SP8. A staff with no empty space is illustrated as shown in FIG. 43C.

Figure 44:
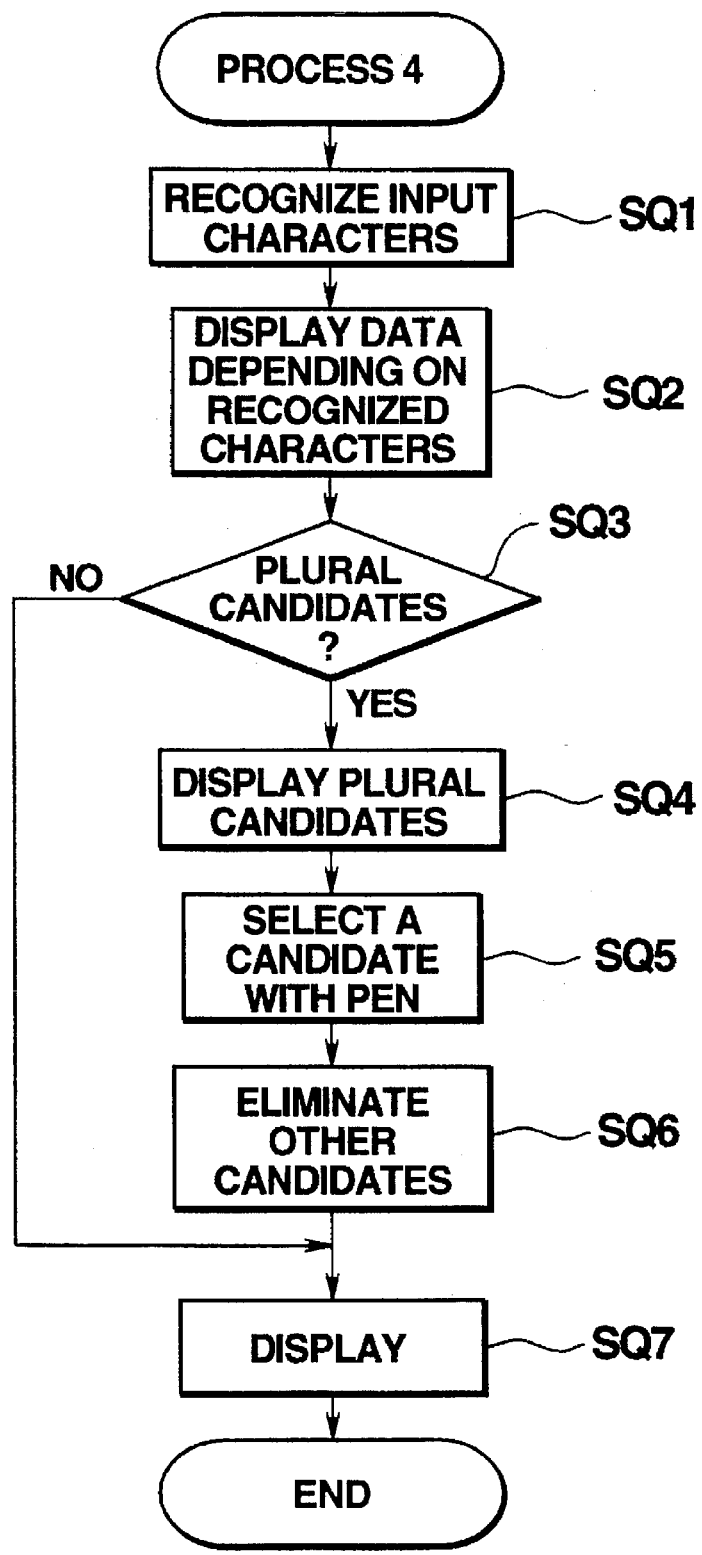
FIG. 44 is a flow chart of a process 4 in the tenth embodiment of the present invention.

When the editing operation is performed to write characters, the process 4 is executed to write the characters in step SM 13 in accordance with a flow chart of FIG. 44. The CPU 1 recognizes input characters in step SQ1, and displays character data representative of tempos, music images and playing methods based on the results of recognition in step SQ2. Further, the CPU 1 judges in step SQ3 whether plural candidates of character data correspond to the results of the recognition. When a single candidate of character data corresponds to the results of recognition, the character data of step SQ2 is kept displayed in step SQ7. When plural candidates of character data correspond to the results of recognition, all the candidates of character data are indicated for selection in step SQ4. When one candidate of character data is selected by pointing with the pen 17, the selected candidate of character data is read in in step SQ5. The candidates of character data other than the selected one are eliminated and only the selected character data is displayed in step SQ6.

Figure 45A:
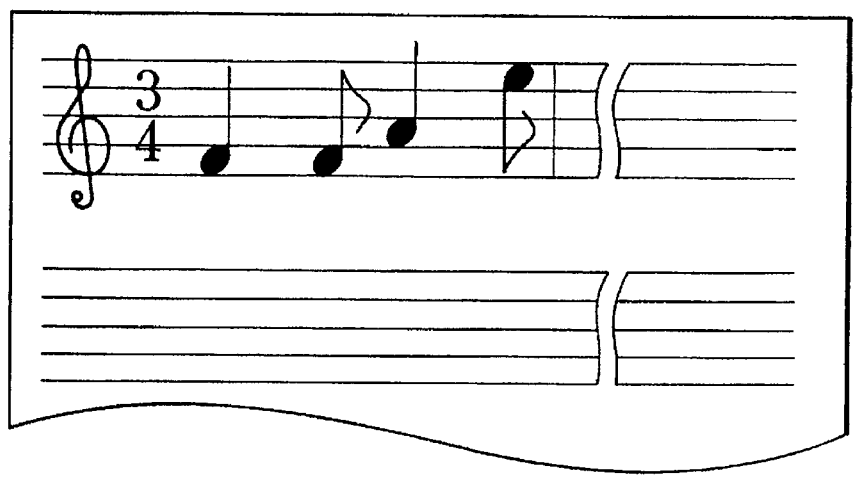
FIGS. 45A–45C are views showing transitional indications in the process 4 of the tenth embodiment.
Figure 45B:
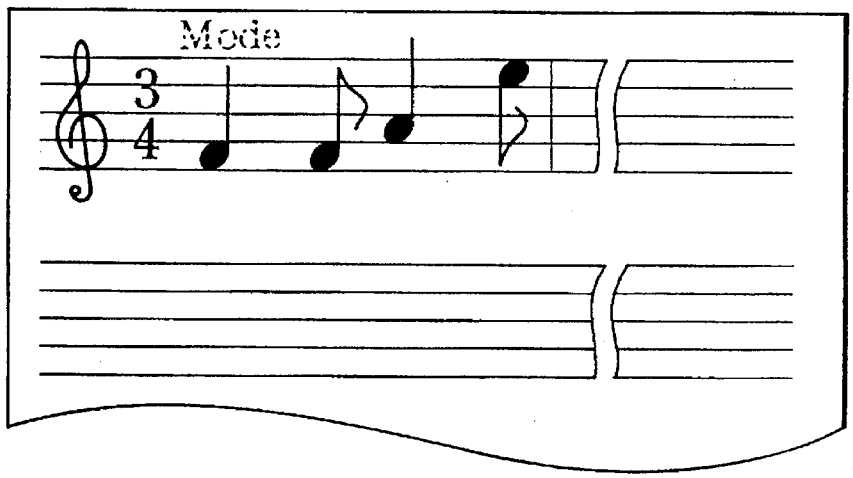
Figure 45C:
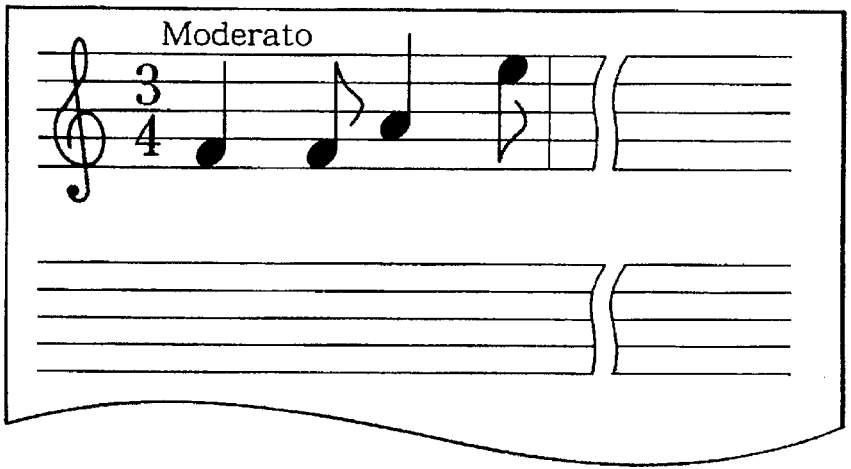

More specifically, we presume that notes are indicated in the staffs as shown in FIG. 45A. When characters "Mode" are input to a position over a desired measure in the staff with the pen 17 as shown by broken lines in FIG. 45B, the. CPU 1 recognizes the input characters "Mode" in step SQ1. Then, character data "Modetaro" corresponding to the recognized input characters "Mode" is indicated in step SQ2, as shown in FIG. 45C. If only the character data "Modetaro" corresponds to the input character data "Mode", the CPU 1 judges "NO" in step SQ3, and then advances directly to step SQ7.

Figure 46A:
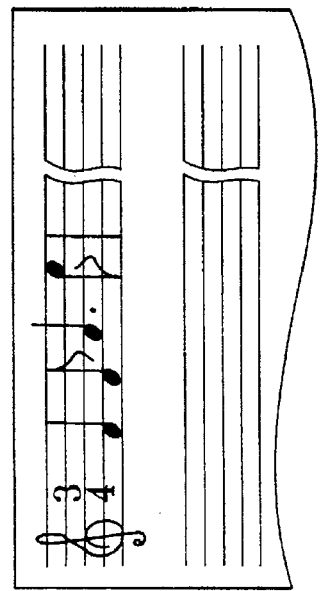
FIGS. 46A–46E are views showing another transitional indication in the process 4 of the tenth embodiment.
Figure 46B:
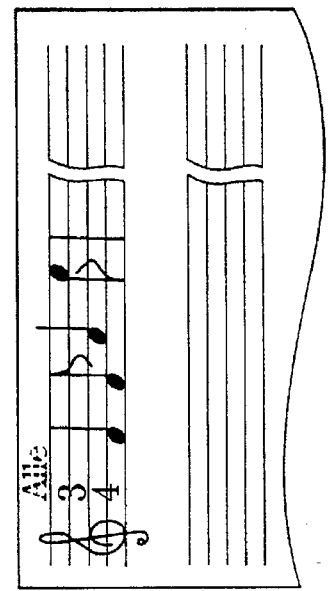
Figure 46C:
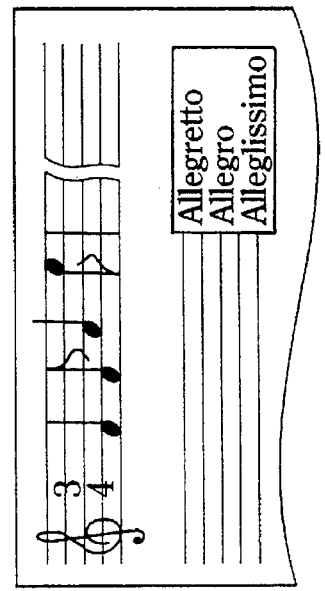

Again, we presume that notes are indicated in the staffs as shown in FIG. 46A. When characters "Alle" are input to a position over a desired measure in the staff with the pen 17 as shown by broken lines in FIG. 46B, the CPU 1 recognizes the input characters "Alle" in step SQ1. When plural candidates correspond to the recognized input characters "Alle", the CPU 1 judges "YES" in step SQ3. Then, the plural candidates such as "Allegretto", "Allegro" and "Allegrissimo" are displayed as shown in FIG. 46C.

Figure 46D:
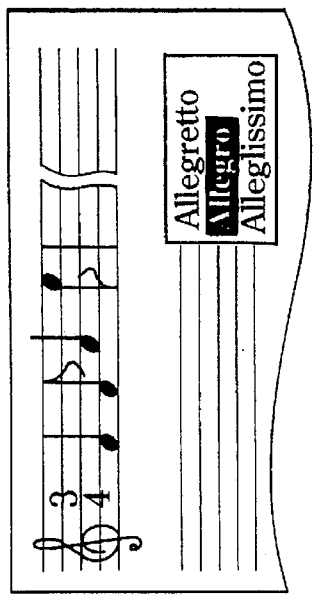
Figure 46E:
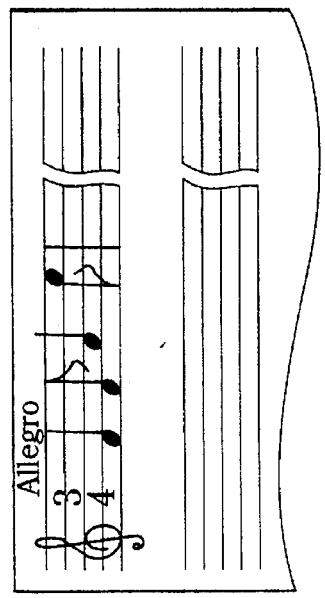

When the candidate "Allegro" is selected by pointing with the pen 17 as shown in FIG. 46D, the selected "Allegro" is read in in step SQ5. Other candidates, "Allegretto" and "Allegrissimo" are eliminated in step SQ6, and only the selected "Allegro" is indicated in step SQ7 at the position where the characters "Alle" are entered, as shown in FIG. 46E.

Figure 30:
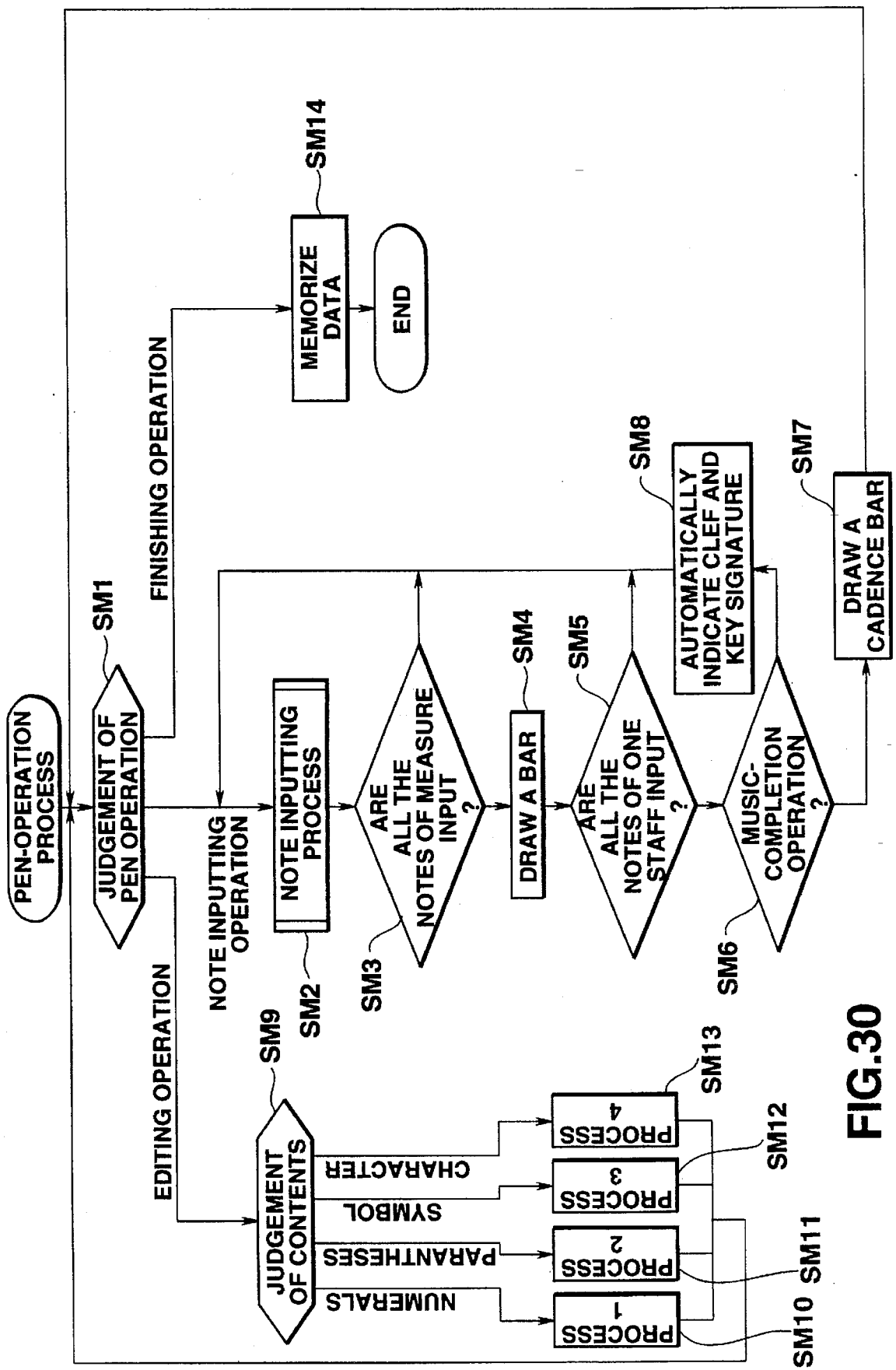
FIG. 30 is a flow chart of a pen operation in the tenth embodiment of the present invention.

As described above, when a desired music has been written by performing the note inputting operations and the editing operations, and when a predetermined finishing operation is performed, the operation advances from step SM1 of FIG. 30 to step SM14, where all the note data included in the written music are stored in the RAM 3. The CPU 1 controls the sound source 8 based on the note data stored in the RAM 3 to audibly output a pertinent music through he speaker 10.

ELEVENTH EMBODIMENT

Now, an eleventh embodiment of the present invention will be described. The external view and whole circuit diagram of the eleventh embodiment are substantially the same as the first embodiment of FIGS. 1 and 2. A CPU 1 of the eleventh embodiment operates in a similar manner to the CPU 1 of the tenth embodiment except for the pen-operation process in step SL6 of FIG. 29.

Figure 47:
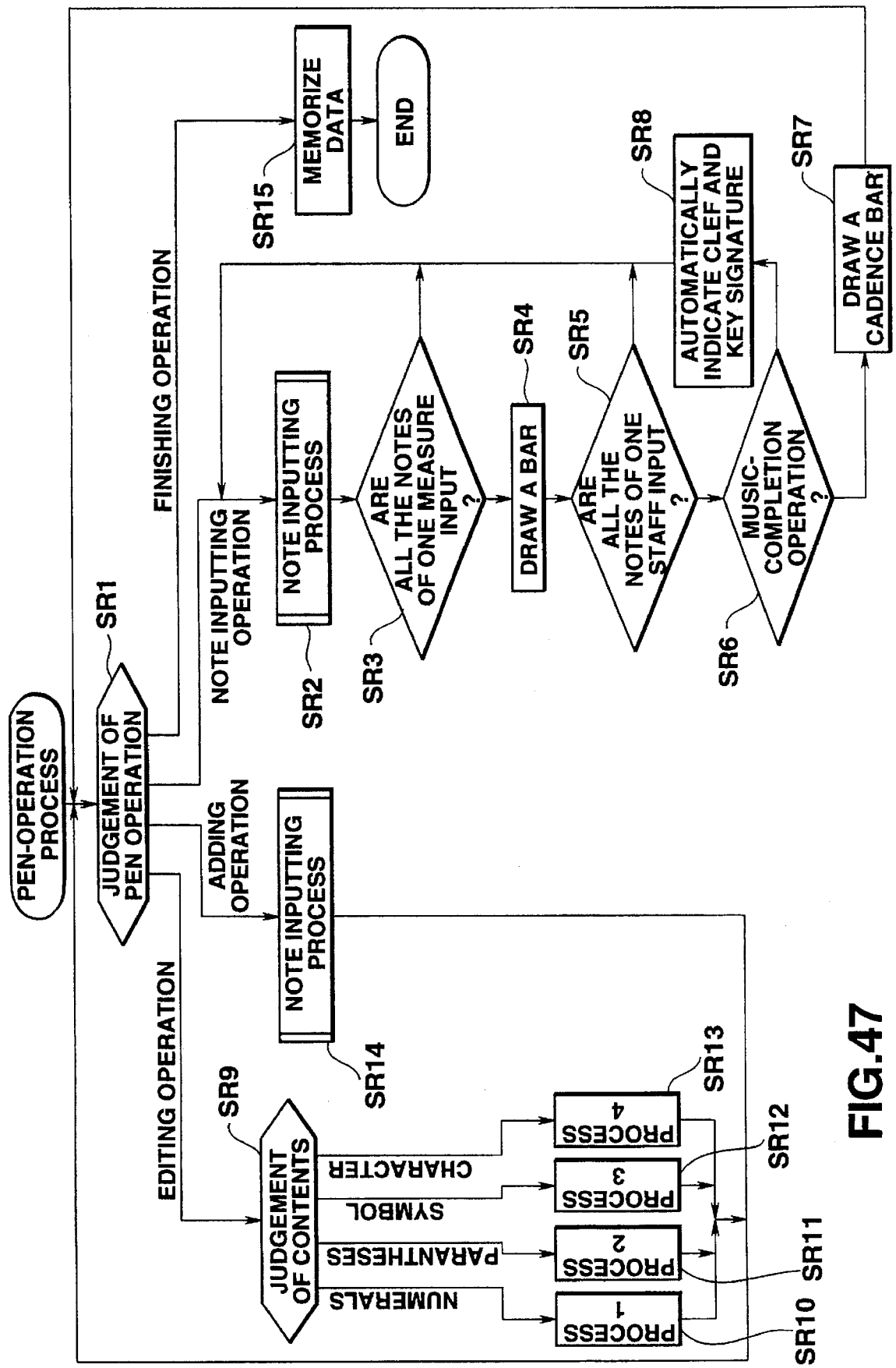
FIG. 47 is a flow chart of a pen operation in an eleventh embodiment of the present invention.

The pen-operation process of the eleventh embodiment will be performed in accordance with a flow chart of FIG. 47. The CPU 1 judges contents of pen operation in step SR1. That is, the CPU 1 judges from the pen operation performed on the display surface 12, in step SR1, which operation is to be performed, "note inputting operation", "adding operation", "editing operation" or "finishing operation".

The "note inputting operation", "editing operation" or "finishing operation" in the eleventh embodiment are the same as the pen-operation process in the tenth embodiment, and the description thereof will be omitted.

Figure 48:
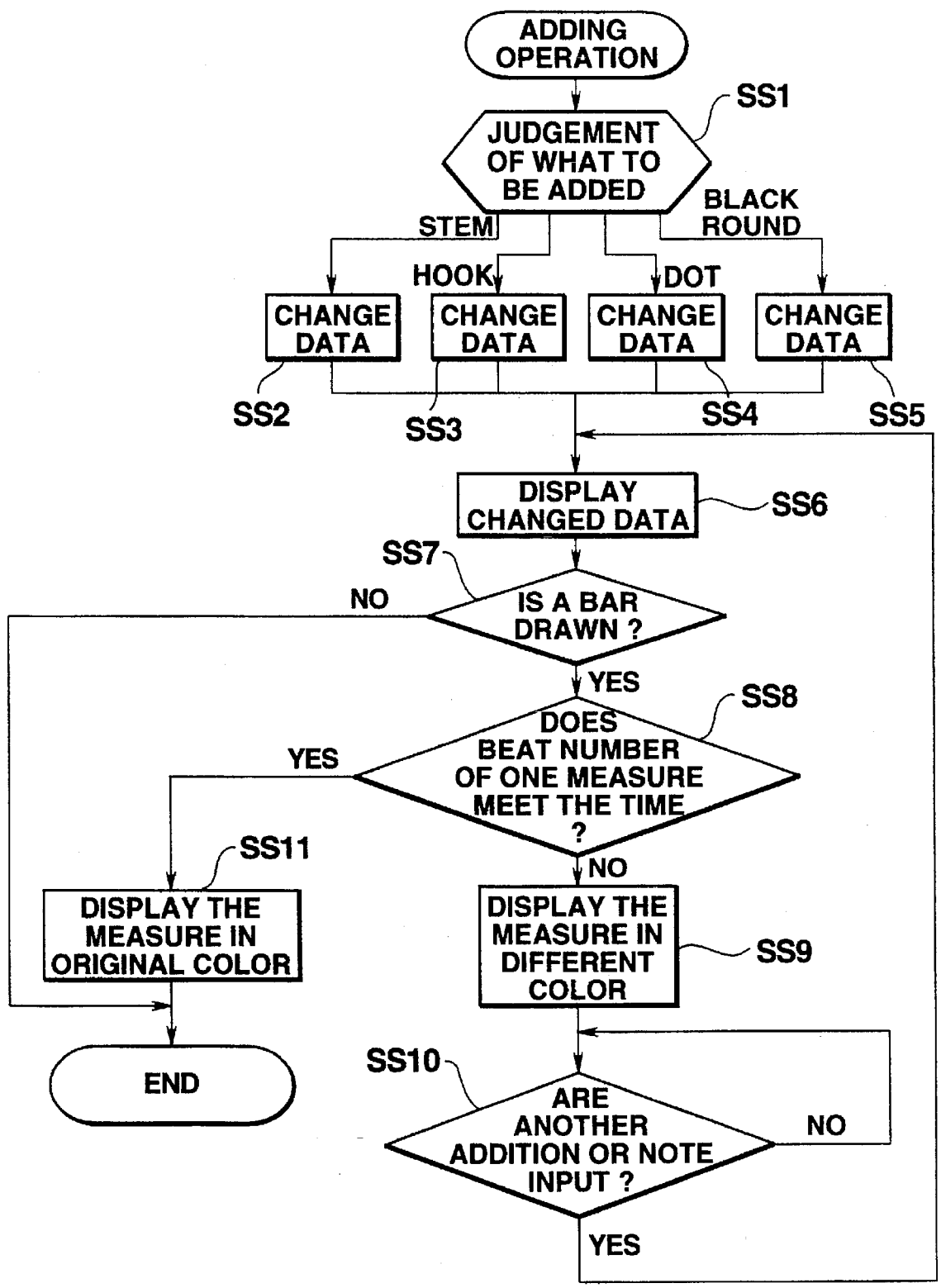
FIG. 48 is a flow chart of an inserting/displaying process in the eleventh embodiment of the present invention.

When it is determined in step SR1 that the "adding operation" is to be performed, the operation advances to step SR14. The adding operation is performed with the pen 17 to add a stem, a hook, and/or a dot to a note indicated on the display surface 12, or to paint black a round portion of the note, in step SR14. To perform the editing operation, the CPU 1 starts the adding operation in accordance with a flow chart of FIG. 48. In step SS1, the CPU 1 judges which is to be added to the indicated note, a stem, a hook, a dot or a black round. The CPU 1 performs the adding operation to change the note depending on the results of the judgement in steps SS2 to SS5.

More specifically, when, for example, a stem is to be added to a whole note, whole note data is changed to half note data. When a hook is to be added to a quarter note, quarter note data is changed to eighth note data. When a dot is to be added to a quarter note, quarter note data is changed to dotted quarter note data. When a black round portion is to be added to a half note, half note data is changed to quarter note data. In step SS6, the changed data is indicated. The note which is to be changed in step SS6 is changed to a note of a pitch corresponding to the note data changed in steps SS2 to SS5.

It is judged in step SS7 whether a bar has been drawn in the staff, i.e., whether one of notes composing a measure has been changed. When it is determined that a note outside the measure has been changed, the operation advances to end, because it does not happen that a number of beats of one measure does not meet a time even though the note is changed. When one of the notes composing a measure has been changed, it can happen that the beat number of one measure does not meet a time.

Therefore, when one of the notes composing one measure has been changed, it is judged in step SS8 whether notes including the changed note within the measure meet the time. When not, the measure is displayed in a different color in step SS9. Then, the CPU 1 waits for another addition or note in step SS10. When another addition or note is input, the CPU 1 performs judging processes in step SS6 and thereafter. When another addition or note is input and the beat number of the measure meets the time, the CPU 1 judges "YES" in step SS8. The operation advances from step SS8 to step SS11, where the CPU 1 displays the measure in original color, and advances to end, thereby finishing the adding operation.

Figure 49D:
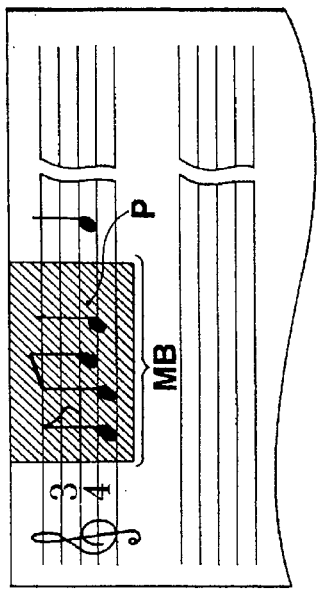
FIGS. 49A–49E are views showing transitional indications in the eleventh embodiment.
Figure 49E:
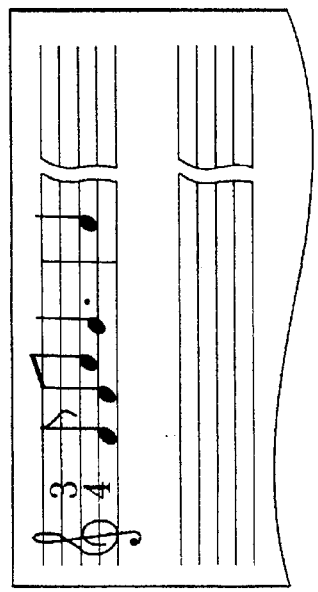
Figure 49A:
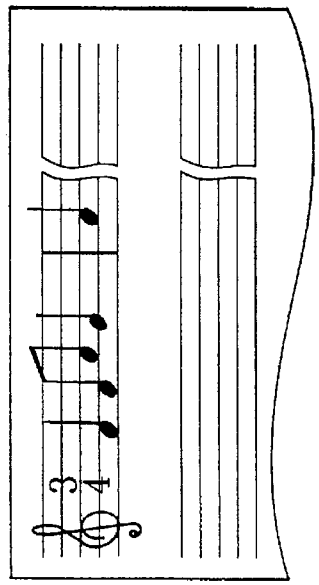
Figure 49B:
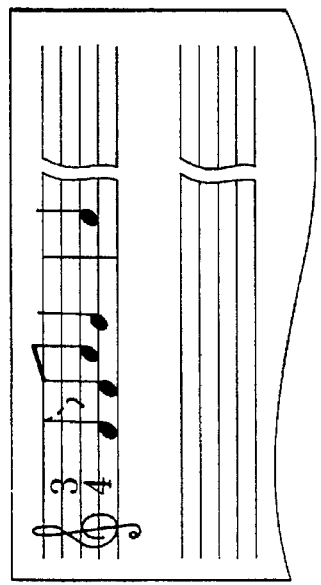
Figure 49C:
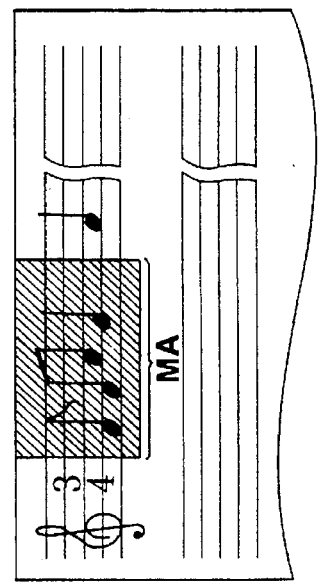

The adding operation will be described more specifically. We now assume that a music is indicated on the display surface 12 as shown in FIG. 49A. When a hook is added to a quarter note of F4 with the pen 17 as shown by a broken line in FIG. 49B, the CPU i determines in step SS1 that a hook is to be added to the quarter note. Then, since a quarter note which is added with a hook will be an eighth note, the CPU 1 changes quarter note data to eighth note data in step SS3. Based on the note data changed in step SS6, the CPU 1 changes the indication on the display surface 12, wherein the quarter note of F4 is changed to an eighth note of F4 as shown in FIG. 49C. Since the above eighth note of F4 should be one of the notes composing one measure MA of FIG. 49C, the CPU 1 judges "YES" in step SS7. The CPU 1 advances to step SS8, where it judges whether beat number of the measure MA meets the time.

Since the time of the indicated music is ¾, the beat number of the measure A is a half beat short to three beats, the CPU 1 judges "NO" in step SS8, and displays the measure A in a different color as shown in FIG. 49C. When a dot P is added to a quarter note of G4 as shown in FIG. 49D, the CPU 1 judges "YES" in step SS10. The CPU 1 further performs the Judging processes in step SS6 and thereafter, and changes the quarter note of G4 to a dotted quarter note of G4.

Since the dotted quarter note has been changed from the quarter note which was one of notes composing one measure MA, the CPU 1 advances from step SS7 to step SS8, where it judges whether the beat number of the measure (MB of FIG. 49D) including the dotted quarter note meets the time of ¾ (three beats). Since the notes in the measure MB have three beats in total and the beat number meets the time of the music, the CPU 1 judges "YES" in step SS8. Then, the measure MB is displayed again in the original color in step SS11, as shown in FIG. 49E. Meanwhile, when the quarter note is not changed to a dotted quarter note and an eighth note is inserted into the measure MA, the newly entered eighth note is indicated in step SS6. Even though the eighth note is inserted into the measure MA, the beat number of the measure (including the eighth note) will meet the time in this case. Therefore, the CPU 1 judges "YES" in step SS8, and displays the measure (including the eighth note) in the original color again (the measure in which the eighth note was not yet inserted was displayed in a different color).

TWELFTH EMBODIMENT

Figure 50:
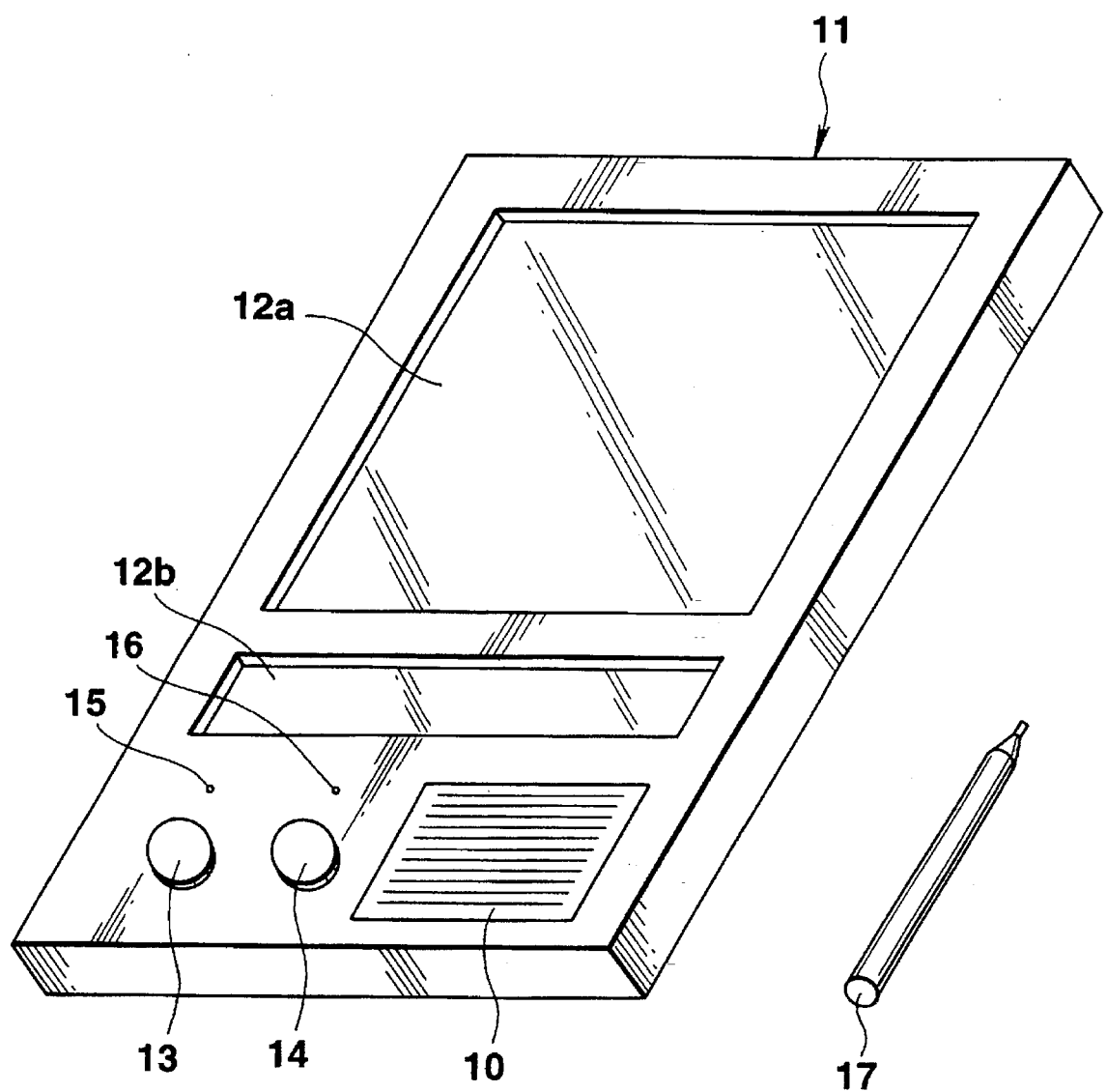
FIG. 50 is an external perspective view of a twelfth embodiment of the musical note inputting apparatus according to the present invention.
Figure 51:
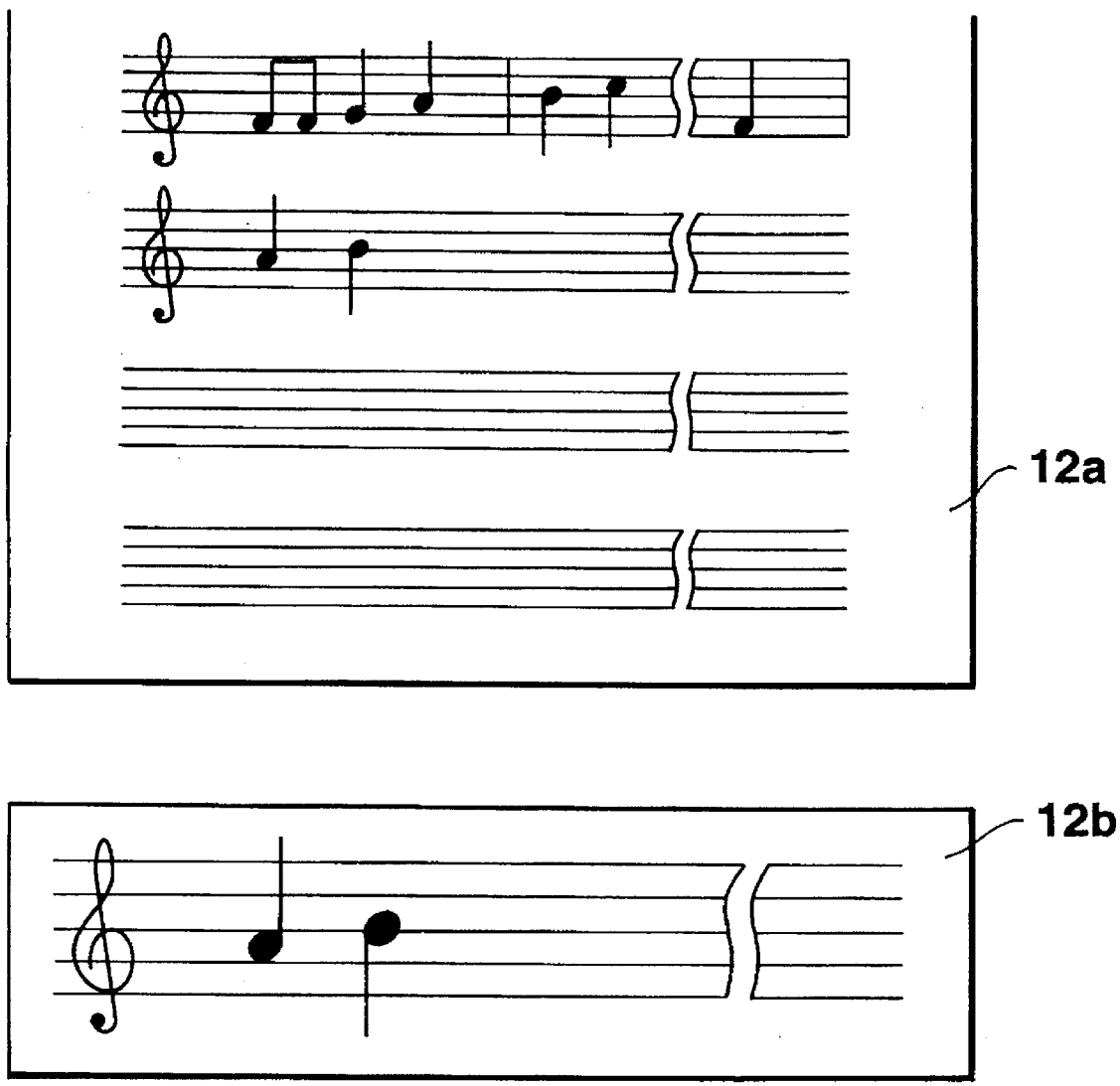
FIG. 51 is a view showing an indication displayed in the twelfth embodiment.

FIG. 50 is an external perspective view of a twelfth embodiment of the present invention. In FIG. 50, like reference numerals represent like elements of the first embodiment and a further description thereof will be omitted. The apparatus body 11 is provided with a main display surface (a parent display surface) 12a and a subsidiary display surface (child display surface) 12b. The main display surface 12a is broad enough to display plural staffs thereon. The subsidiary display surface 12b is prepared for displaying a single enlarged staff. As shown in FIG. 51, music written over plural staffs is displayed on the display surface 12a and an enlarged staff on which notes are to be written is displayed on the subsidiary display surface 12b. The subsidiary display surface 12b is provided for the purpose of easy operations. The subsidiary display surface 12b may be conveniently used by the user to designate a note pitch and a note length and to amend them.

THIRTEENTH EMBODIMENT

Figure 52A:
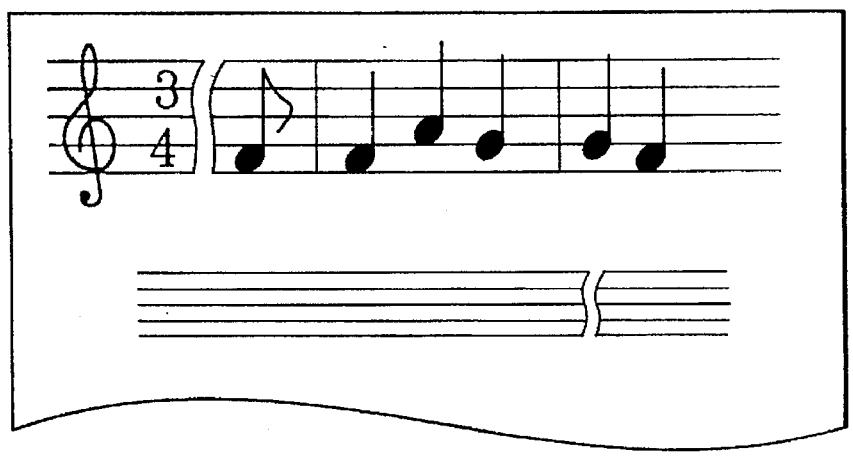
FIGS. 52A–52C are views showing indications in a thirteenth embodiment of the present invention.
Figure 52B:
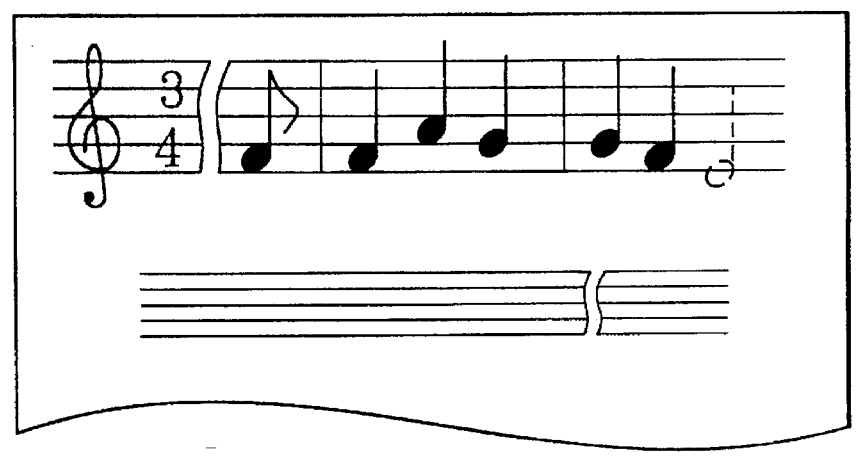
Figure 52C:
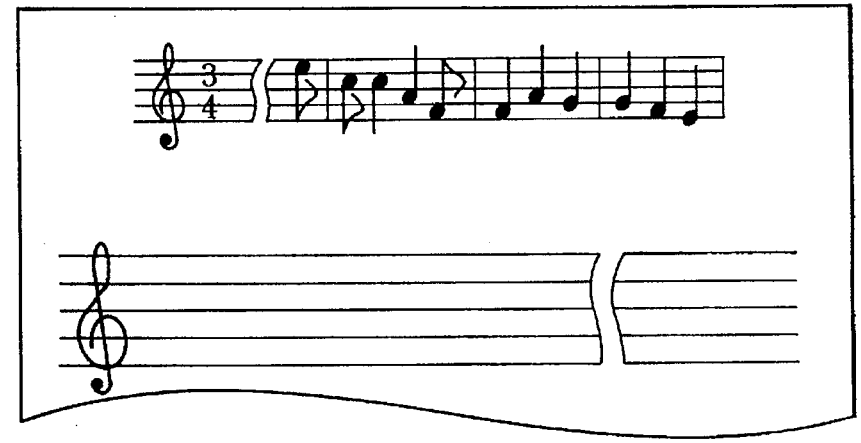

In a thirteenth embodiment, only a staff on which notes are to be written at present is enlarged and displayed on the display surface 12 as shown in FIGS. 52A and 52B. When notes have been written over one staff, the staff is displayed in a reduced size, and a next staff on which a note is to be written is displayed in an enlarged size, as shown in FIG. 52C. In the thirteenth embodiment, there are not provided two display surfaces 12a, 12b as in the twelfth embodiment but a single display surface 12, which will help the user in performing note-inputting operations with ease.

FOURTEENTH EMBODIMENT

Figure 53:
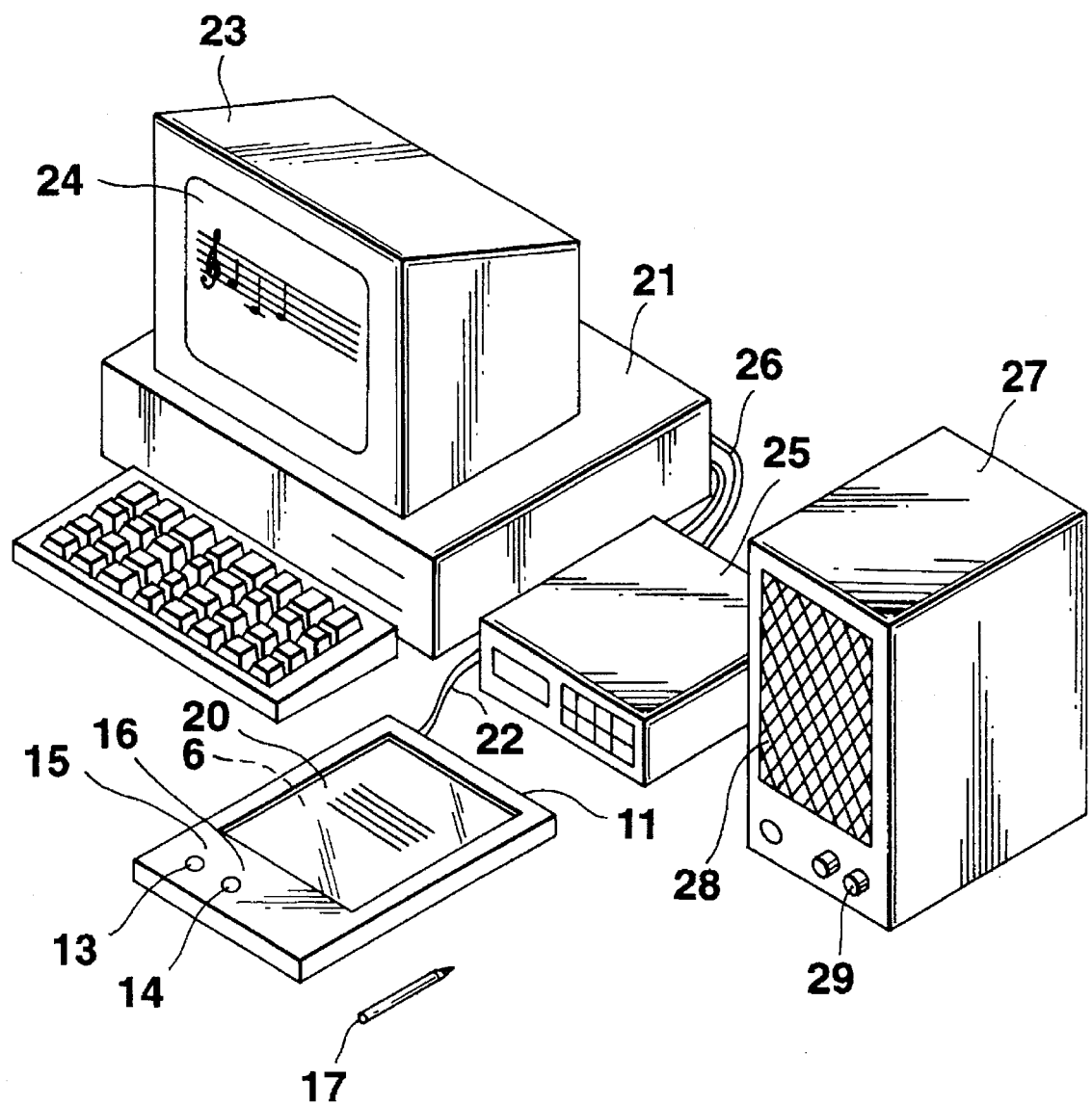
FIG. 53 is an external view of a fourteenth embodiment of the present invention.
Figure 54:
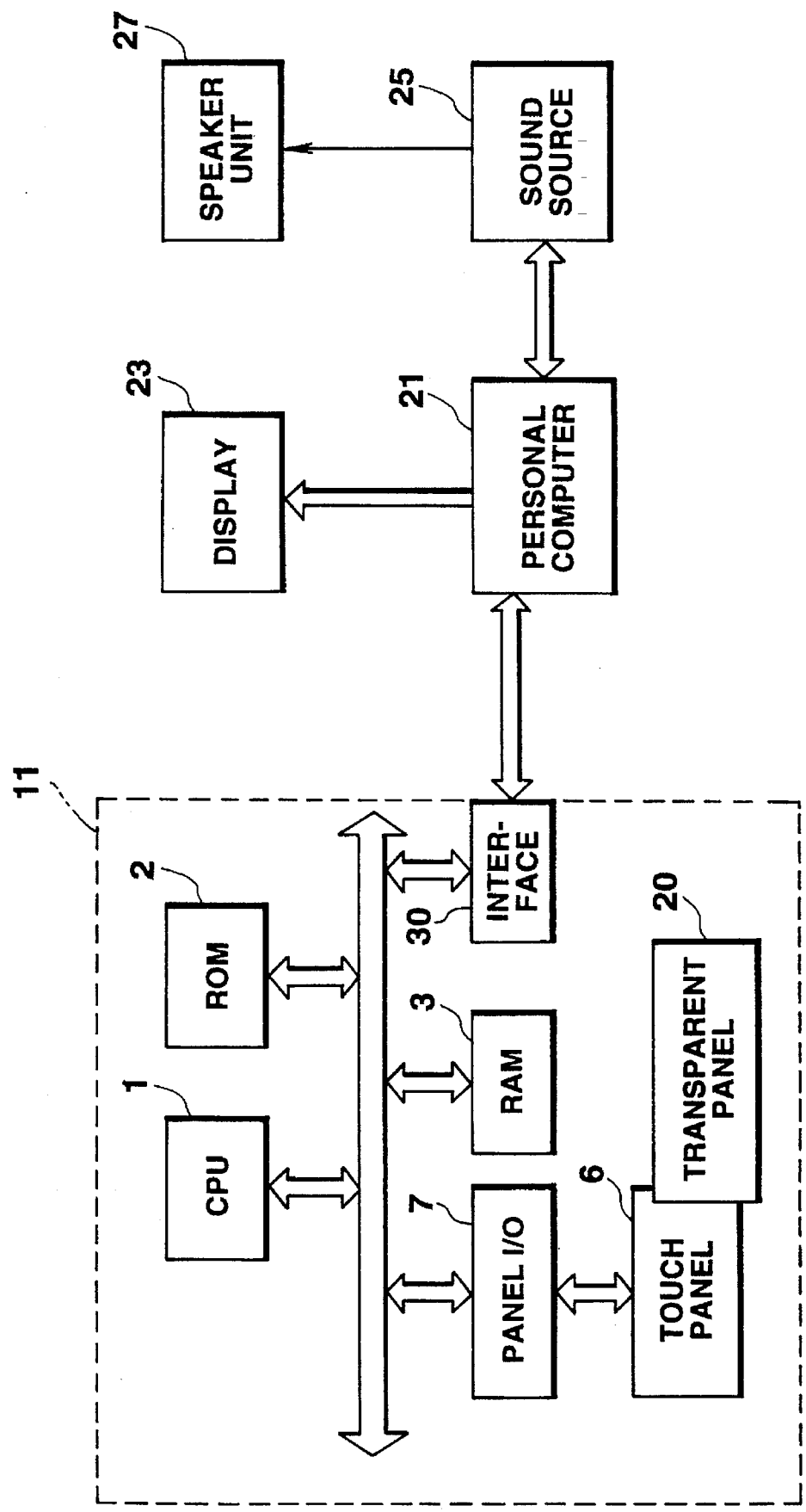
FIG. 54 is view showing a structure of the fourteenth embodiment of the present invention.

FIGS. 53 and 54 are views showing a fourteenth embodiment of the present invention, which is connected to an external apparatus such as a personal computer.

FIG. 53 is an external view of the fourteenth embodiment of the musical data inputting apparatus and the personal computer connected therewith. In FIG. 53, like reference numerals represent like elements of the first embodiment of FIG. 2.

A numeral 11 denotes the musical data inputting apparatus of the fourteenth embodiment. A reference numeral 20 stands for a transparent panel stacked on the touch panel 6. A staff is printed on a surface of the transparent panel 20. Position data is entered through the touch panel 6 and the musical meaning of the position data is judged with reference to the staff printed on the transparent panel 20.

The musical data inputting apparatus 11 is connected to a personal computer 21 through a connecting cord 22. The musical data inputting apparatus 11 transfers musical data entered through the touch panel 6 to the personal computer 21. The personal computer 21 is installed with a memory device therein, in which the musical data are successively memorized and are read out therefrom. The personal computer 21 is further connected with a display device 23, on which music is displayed corresponding to musical data transferred from the musical data inputting apparatus 11 or musical data read out from the memory device, in accordance with an instruction of the personal computer 21.

Further, the personal computer 21 is connected with a sound source 25 through a connecting cord 26. The sound source 25 generates a musical sound signal in accordance with musical data transferred from the personal computer 21.

The sound source 25 is connected to a speaker unit 27 through a connecting cord (not shown). The speaker unit 27 is installed with an amplifier and a speaker 28. The musical sound signal supplied from the sound source 25 is amplified by the amplifier and is audibly output through the speaker. A loudness of the musical sound or gain of the amplifier is controlled by a volume control knob 29.

FIG. 54 is a circuit diagram of the fourteenth embodiment and the external device (the personal computer) connected thereto. In FIG. 54, like reference numerals represent like elements of the first embodiment of FIG. 1.

The touch panel 6 detects a hand-writing operation through the transparent panel 20 with the staff printed. The CPU 1 discriminates musical data such as pitch data of a sound, length data of a sound, tonality data from input data entered through a panel I/O port 7, and successively transfers the musical data in a predetermined data format to the personal computer 21 through an interface circuit 30.

The personal computer 21 memorizes the musical data supplied from the musical data inputting apparatus 11 in the memory device including RAM, and controls the display device 23 to display music including musical notes, and tonality. The personal computer 21 successively reads out a series of musical data from the memory device to drive the sound source 25 so as to execute an automatic performance.

As described above, the sound source 25 generates a musical sound signal in accordance with the musical data supplied thereto, and sends the musical signal to the speaker unit 27. The speaker unit 27 amplifies and audibly outputs the musical signal.

As described above, the fourteenth embodiment of the musical data inputting apparatus can supply an automatic playing system or an automatic playing apparatus with musical data which are entered by simple hand writing operations.

A number of embodiments of the present invention have been described in detail but these embodiments are simply illustrative and not restrictive. The present invention may be modified in various manners. All the modifications and applications of the present invention will be within the scope and spirit of the invention, so that the scope of the present invention should be determined only by what is recited in the present appended claims and their equivalents.

What is claimed is:

1. Musical data inputting apparatus comprising:

operation-receiving means of a non-keyboard type having a two-dimensional surface for receiving a hand-writing operation on said surface, said hand-writing operation being performed without requiring selection of an icon from a list of visible icons;

horizontal line means for providing said two-dimensional surface of said operation-receiving means with a plurality of horizontal lines vertically spaced from one another;

position detecting means for detecting a vertical position of said hand-writing operation on said two-dimensional surface of said operation-receiving means relative to said horizontal lines to obtain pitch data representative of a pitch of a musical note based on said detected vertical position;

operation recognizing means for recognizing said hand-writing operation performed on said two-dimensional surface of said operation-receiving means to obtain time data representative of a length of said musical note based on said recognized hand-writing operation; and musical-sound recognizing means for recognizing musical-sound data based on the pitch data obtained by said position detecting means and the time data obtained by said operation recognizing means.

2. Musical data inputting apparatus according to claim 1, wherein said operation recognizing means includes means for detecting the number of presses applied onto said two-dimensional surface of said operation receiving means during the hand-writing operation to obtain time data representative of a length of a musical note based on said detected number of presses.

3. Musical data inputting apparatus according to claim 1, wherein said operation recognizing means includes means for measuring a time duration of said hand-writing operation during which said operation receiving means is pressed to obtain time data representative of a length of a musical note based on said measured time duration.

4. Musical data inputting apparatus according to claim 1, wherein said operation recognizing means includes means for detecting intensity of pressure applied by said hand-writing operation onto said two-dimensional surface of said operation receiving means to obtain time data representative of a length of a musical note based on the detected intensity of pressure.

5. Musical data inputting apparatus according to claim 1, further comprising:

clef recognizing means for detecting a figure drawn on said two-dimensional surface of said operation receiving means by the hand-writing operation to recognize a clef based on the detected figure;

and wherein musical-sound recognizing means recognizes musical-sound data based on the pitch data obtained by said position detecting means, the time data obtained by said operation recognizing means and the clef recognized by said clef recognizing means.

6. Musical data inputting apparatus according to claim 1, further comprising:

tonality recognizing means for detecting a numeral drawn on said two-dimensional surface of said operation receiving means by the hand-writing operation to recognize a tonality based on the detected numeral;

and wherein musical-sound recognizing means recognizes musical-sound data based on the pitch data obtained by said position detecting means, the time data obtained by said operation recognizing means and the tonality recognized by said tonality recognizing means.

7. Musical data inputting apparatus according to claim 1, further comprising:

display means for displaying a musical note corresponding to the musical-sound data recognized by said musical-sound recognizing means.

8. Musical data inputting apparatus according to claim 7, wherein said operation receiving means comprises a transparent member, and said operation receiving means is stacked on said display, whereby the musical-sound data displayed on said display can be seen through said operation receiving means.

9. Musical data inputting apparatus according to claim 8, further comprising:

position judging means for judging whether a new hand-writing operation is performed at a position on said two-dimension surface of said operation receiving means, said position corresponding to a blank position on said display means, next to a first musical note displayed thereon;

next means responsive to an affirmative judging result from said position judging means for activating said position detecting means, said operation recognizing means and said musical-sound recognizing means to thereby obtain data representative of a second musical note with respect to said new hand-writing operation; and display control means responsive to said next means for controlling said display means to display said second musical note at a position next to said first musical note.

10. Musical data inputting apparatus according to claim 8, further comprising:

position judging means for judging whether a new hand-writing operation is performed on said surface at a position corresponding to or near a musical note displayed on said display means;

note updating means responsive to an affirmative judging result from said position judging means for activating said position detecting means, said operation recognizing means and said musical-sound recognizing means to thereby obtain data representative of an updated musical note with respect to said new hand-writing operation; and display control means responsive to said note updating means for controlling said display means to display said updated musical note in place of said musical note previously displayed.

11. Musical data inputting apparatus according to claim 10, further comprising:

note-length comparing means for judging whether a time length of a measure in which a musical note included therein is replaced with a new musical note is equivalent to a predetermined time length of a measure, when said display control means controls said display means to display a new musical note corresponding to musical sound data newly recognized by said musical-sound recognizing means in place of the previously displayed musical note to replace the previously displayed musical note with the new musical note, and said display control means controls said display means to display the measure in which the musical note included therein is replaced with the new musical note in a different color from an original color, when said note-length comparing means determines that the time length of the measure in which the musical note included therein is replaced with the new musical note is not equivalent to the predetermined time length of a measure.

12. Musical data inputting apparatus according to claim 8, further comprising:

memory means for storing musical-sound data recognized by said musical-sound recognizing means;

range detecting means responsive to said operation-receiving means when said operation-receiving means receives a hand-writing operation thereon that spans musical notes displayed on said display means to thereby define a range for detecting said range;

figure detecting means responsive to said operation receiving means when said operation receiving means receives a hand-writing operation that draws a predetermined figure thereon for detecting said drawn figure; and deleting means responsive to said range detecting means and said figure detecting means for deleting from said memory means musical-sound data corresponding to the musical notes falling within said detected range.

13. Musical data inputting apparatus according to claim 8, further comprising:

range detecting means responsive to said operation-receiving means when said operation-receiving means receives a hand-writing operation thereon that spans musical notes displayed on said display means to thereby define a range for detecting said range;

numeral detecting means responsive to said operation-receiving means when said operation-receiving means receives a hand-writing operation that draws a numeral thereon for detecting said drawn numeral; and changing means responsive to said range detecting means and said numeral detecting means for changing pitches of musical-sound data based on the numeral detected by said numeral detecting means, the musical-sound data corresponding to the musical notes falling within said detected range.

14. Musical data inputting apparatus according to claim 8, further comprising:

symbol detecting means for detecting a symbol drawn on said two-dimensional surface of said operation receiving means by another hand-writing operation; and display control means for controlling said display means to display musical notes with a space therebetween based on the symbol detected by said symbol detecting means.

15. Musical data inputting apparatus according to claim 1, further comprising:

memory means for storing musical-sound data recognized by said musical-sound recognizing means;

and wherein said musical-sound recognizing means recognizes musical-sound data based on the pitch data obtained by said position detecting means and the time data used for recognizing the musical-sound data last stored in said memory means, when no time data is obtained by said operation recognizing means.

16. Musical data inputting apparatus according to claim 1, further comprising:

character detecting means for detecting characters drawn on said two-dimensional surface of said operation-receiving means by the handwriting operation; and tempo determining means for determining a tempo of music based on the characters detected by said character detecting means; and wherein said musical-sound recognizing means recognizes musical-sound data based on the pitch data obtained by said position detecting means, the time data obtained by said operation recognizing means and the tempo of music determined by said tempo determining means.

17. Musical data inputting apparatus according to claim 1, further comprising:

numeral detecting means for detecting a numeral drawn on said two-dimensional surface of said operation-receiving means by the hand-writing operation;

time determining means for determining time of music based on the numeral detected by said numeral detecting means; and wherein said musical-sound recognizing means recognizes musical-sound data based on the pitch data obtained by said position detecting means, the time data obtained by said operation recognizing means and the time of music determined by said time determining means.

18. Musical data inputting apparatus comprising:

operation-receiving means of a non-keyboard type having a two-dimensional surface for receiving a handwriting operation on said surface, said hand-writing operation being performed without requiring selection of an icon from a list of visible icons;

horizontal line means for providing said two-dimensional surface of said operation-receiving means with a plurality of horizontal lines vertically spaced from one another;

position detecting means for detecting a vertical position of a first hand-writing operation on said two-dimensional surface of said operation-receiving means relative to said horizontal lines to obtain pitch data representative of a pitch of a musical note based on said detected vertical position;

numeral detecting means for detecting a numeral drawn on said two-dimensional surface of said operation-receiving means by a second handwriting operation, and for obtaining time data representative of a length of a musical note based on the detected numeral; and musical-sound recognizing means for recognizing musical-sound data based on the pitch data obtained by said position detecting means and the time data obtained by said numeral detecting means.

19. Musical data inputting apparatus comprising:

operation-receiving means of a non-keyboard type having a two-dimensional surface for receiving a handwriting operation on said surface, said hand-writing operation being performed without requiring selection of an icon from a list of visible icons;

horizontal line means for providing said two-dimensional surface of said operation-receiving means with a plurality of horizontal lines vertically spaced from one another;

position detecting means for detecting a vertical position of a first hand-writing operation on said two-dimensional surface of said operation-receiving means relative to said horizontal lines to obtain pitch data representative of a pitch of a musical note based on said detected vertical position;

line detecting means for detecting a length of a line drawn on said two-dimensional surface of said operation-receiving means by a second hand-writing operation, and for obtaining time data representative of a length of a musical note based on the detected length of the line; and musical-sound recognizing means for recognizing musical-sound data based on the pitch data obtained by said position detecting means and the time data obtained by said line detecting means.

20. In a musical data inputting apparatus having operation receiving means of a non-keyboard type having a two-dimensional surface for receiving a hand-writing operation on said surface, said hand-writing operation being performed without requiring selection of an icon from a list of visible icons, a method of inputting musical data comprising the steps of:

providing said two-dimensional surface of said operation receiving means with a plurality of horizontal lines vertically spaced from one another;

receiving a hand-writing operation on said two-dimensional surface of said operation receiving means;

detecting a vertical position of said hand-writing operation on said two-dimensional surface of said operation-receiving means relative to said horizontal lines to obtain pitch data representative of a pitch of a musical note based on said detected vertical position;

recognizing the hand-writing operation performed on said operation receiving means to obtain time data representative of a length of said musical note based on said recognized hand-writing operation; and recognizing musical-sound data based on the obtained pitch data and the obtained time data.

21. Musical data inputting apparatus comprising:

operation-receiving means of a non-keyboard type having a two-dimensional surface for receiving a hand-writing operation on said surface, said hand-writing operation being performed at least once by pressing a point on said surface without requiring selection of an icon from a list of visible icons;

position detecting means for detecting said point of said hand-writing operation on said two-dimensional surface of said operation-receiving means to obtain pitch data representative of a pitch of a musical note based on said detected point;

counting means for counting a number of presses of said hand-writing operation at said point on said two-dimensional surface of said operation-receiving means to obtain time data representative of a length of said musical note based on said counted number of presses; and musical-sound recognizing means for recognizing musical-sound data based on the pitch data obtained by said position detecting means and the time data obtained by said counting means.

22. Musical data inputting apparatus comprising:

operation-receiving means of a non-keyboard type having a two-dimensional surface for receiving a hand-writing operation on said surface, said hand-writing operation being performed by pressing a point on said surface for a time duration without requiring selection of an icon from a list of visible icons;

detecting means for:
  detecting the position of said pressed point on said two-dimensional surface of said operation-receiving means to obtain pitch data representative of a pitch of a musical note based on said detected position of said pressed point, and
  measuring said time duration for which said point was pressed on said two-dimensional surface of said operation-receiving means to obtain time data representative of a length of said musical note based on said measured time duration; and musical-sound recognizing means for recognizing musical-sound data based on the pitch data and the time data obtained by said detecting means.

23. Musical data inputting apparatus comprising:

operation-receiving means of a non-keyboard type having a two-dimensional surface for receiving a hand-writing operation on said surface, said hand-writing operation being performed by pressing a point on said surface with a pressure without requiring selection of an icon from a list of visible icons;

detecting means for:
  detecting the position of said pressed point on said two-dimensional surface of said operation-receiving means to obtain pitch data representative of a pitch of a musical note based on said detected position of said pressed point, and
  detecting the strength of said pressure with which said point was pressed on said two-dimensional surface of said operation-receiving means to obtain time data representative of a length of said musical note based on said detected strength of said pressure; and musical-sound recognizing means for recognizing musical-sound data based on the pitch data and the time data obtained by said detecting means.

24. Musical data inputting apparatus comprising:

operation-receiving means of a non-keyboard type having a two-dimensional surface for receiving hand-writing operations on said surface one at a time, said hand-writing operations being performed without requiring selection of an icon from a list of visible icons and including a first hand-writing operation which is performed by pressing a point on said two-dimensional surface and a second hand-writing operation which is performed by drawing a numeral with writing means on said two-dimensional surface while pressing the writing means against said two-dimensional surface;

detecting means for:
  detecting the position of said pressed point on said two-dimensional surface of said operation-receiving means to obtain pitch data representative of a pitch of a musical note based on said detected position of said pressed point, and
  detecting said numeral drawn by said second hand-writing operation on said two-dimensional surface of said operation-receiving means to obtain time data representative of a length of said musical note based on said detected numeral; and musical-sound recognizing means for recognizing musical-sound data based on the pitch data and the time data obtained by said detecting means.

25. Musical data inputting apparatus comprising:

operation-receiving means of a non-keyboard type having a two-dimensional surface for receiving hand-writing operations on said surface one at a time, said hand-writing operations being performed without requiring selection of an icon from a list of visible icons and including a first hand-writing operation which is performed by pressing a point on said two-dimensional surface and a second hand-writing operation which is performed by drawing a line with writing means on said two-dimensional surface while pressing the writing means against said two-dimensional surface;

detecting means for:
  detecting the position of said pressed point on said two-dimensional surface of said operation-receiving means to obtain pitch data representative of a pitch of a musical note based on said detected position of said pressed point, and
  detecting a length of said line drawn by said second hand-writing operation on said two-dimensional surface of said operation-receiving means to obtain time data representative of a length of said musical note based on said detected length of said line; and musical-sound recognizing means for recognizing musical-sound data based on the pitch data and the time data obtained by said detecting means.

* * * * *